(12) United States Patent
Ikehara et al.

(10) Patent No.: US 6,219,702 B1
(45) Date of Patent: *Apr. 17, 2001

(54) METHOD OF SWITCHING SERVICE PROFILE TO ANOTHER AND TERMINAL APPARATUS FOR UTILIZING THE METHOD

(75) Inventors: Tetsuo Ikehara; Shigeki Gotoh, both of Nagoya (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/631,242

(22) Filed: Apr. 12, 1996

(30) Foreign Application Priority Data

Jun. 20, 1995 (JP) .................................................. 7-153204

(51) Int. Cl.$^7$ .................................................. G06F 15/173
(52) U.S. Cl. .................. 709/224; 370/270; 379/210; 379/219; 709/222
(58) Field of Search .......................... 395/200.57, 200.58, 395/200.59, 187.01, 188.01, 186, 227–229; 380/23, 24, 25, 49; 340/825.34; 379/59, 38, 210, 211, 217, 219, 220, 258; 370/241, 252, 270, 385, 524, 453, 457, 904; 709/224, 238, 222, 228; 38/23–25

(56) References Cited

U.S. PATENT DOCUMENTS

| | | | |
|---|---|---|---|
| 5,012,466 | * | 4/1991 | Buhrke et al. ........................ 370/270 |
| 5,363,425 | * | 11/1994 | Mufti et al. ............................. 379/38 |
| 5,493,692 | * | 2/1996 | Theimer et al. ....................... 380/23 |
| 5,502,757 | * | 3/1996 | Bales et al. ............................. 379/58 |
| 5,550,896 | * | 8/1996 | Chavez, Jr. ............................. 379/59 |
| 5,581,708 | * | 12/1996 | Iijima .................................... 395/831 |
| 5,715,241 | * | 2/1998 | Glass, III et al. .................... 370/252 |
| 5,742,668 | * | 4/1998 | Pepe et al. ............................. 379/58 |
| 5,742,905 | * | 4/1998 | Pepe et al. ........................... 455/461 |
| 5,781,863 | * | 7/1998 | Bales et al. .......................... 455/456 |
| 5,805,570 | * | 9/1998 | Fields et al. ......................... 370/241 |

FOREIGN PATENT DOCUMENTS

| | | |
|---|---|---|
| 4-180392 | 6/1992 | (JP) . |
| 6-232867 | 8/1994 | (JP) . |

* cited by examiner

*Primary Examiner*—Mehmet B. Geckil
(74) *Attorney, Agent, or Firm*—Helfgott & Karas, P.C.

(57) ABSTRACT

This relates to a method of switching service profiles of a terminal apparatus from one to another and the terminal apparatus itself. The method easily switches service profiles of the terminal apparatus from one to another even from a remote place according to switching conditions such as a switching time. A terminal apparatus is connected to a network 8. The terminal apparatus has a service-state detector 1, a call controller 2, an initialization unit 3, a memory 4, a timer 5, a data registration unit 6, a card reader 7, and an I/O controller 9. The memory 4 stores service profile identifiers (SPIDs) and switching conditions such as a switching time. When the switching conditions are met, a present SPID is switched to a given one, the terminal apparatus is reset, and an end point initialization request is made to the network 8. An end point is initialized, and a service profile for the given SPID is allocated to the terminal apparatus.

6 Claims, 85 Drawing Sheets

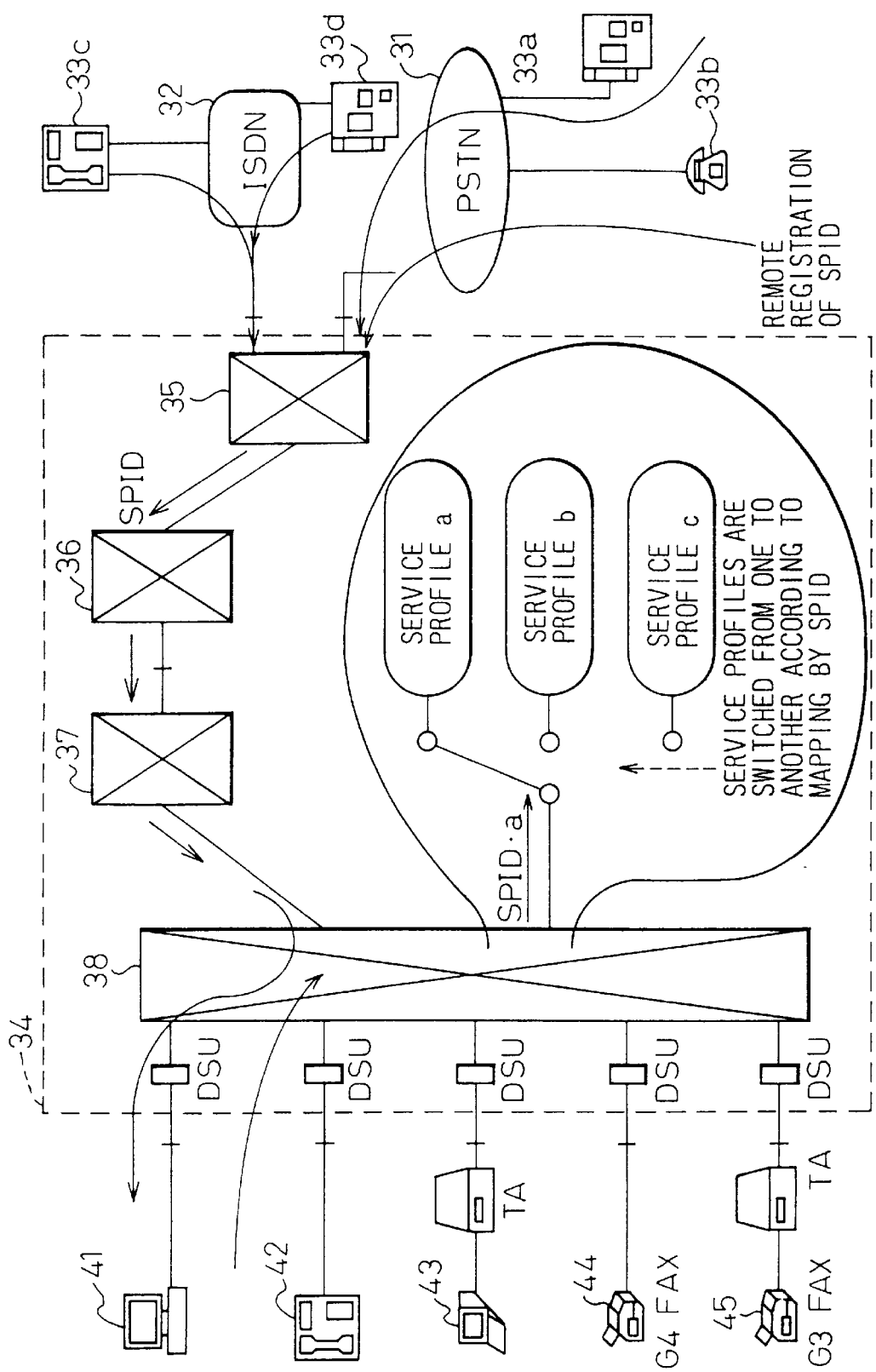

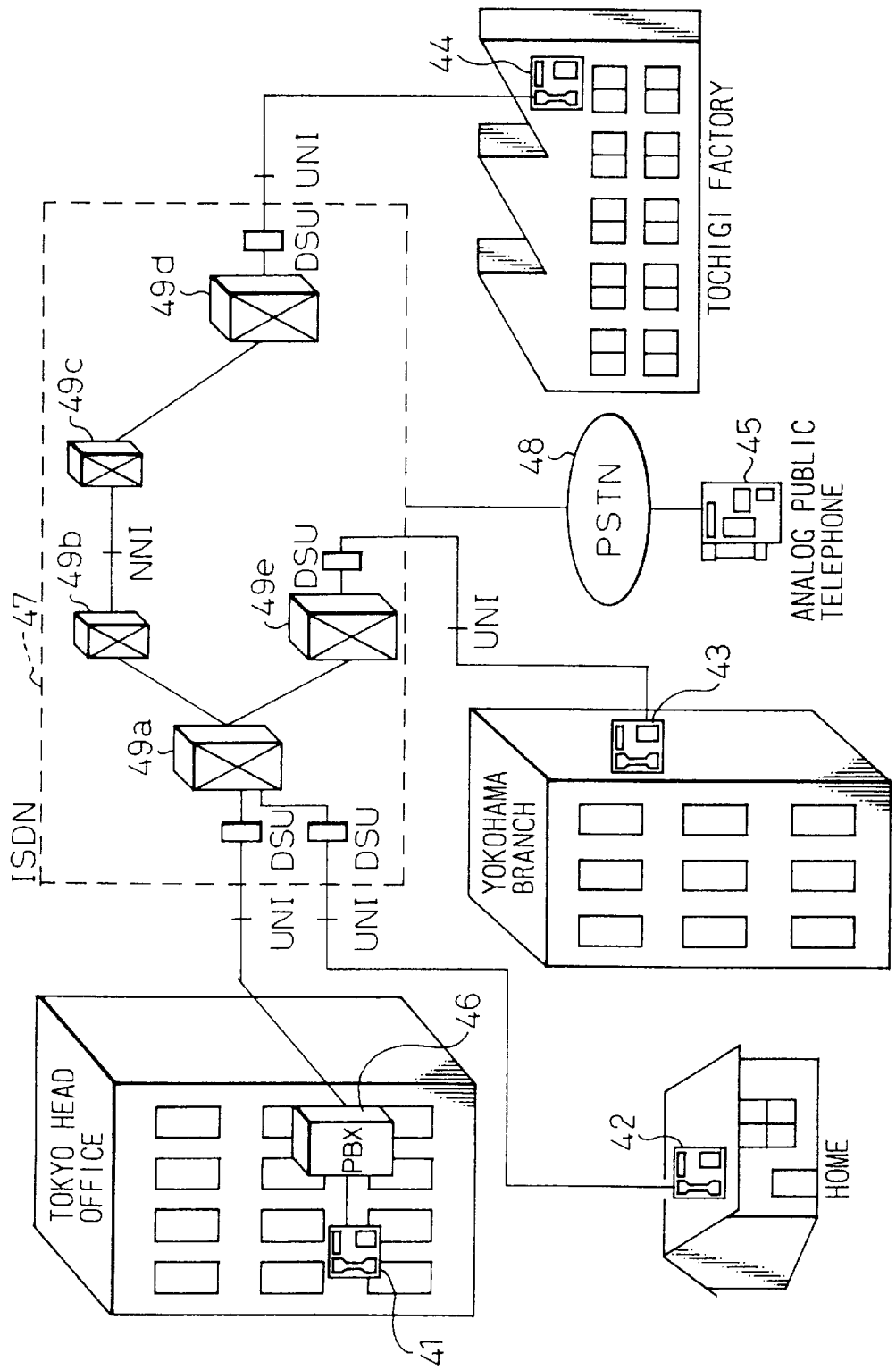

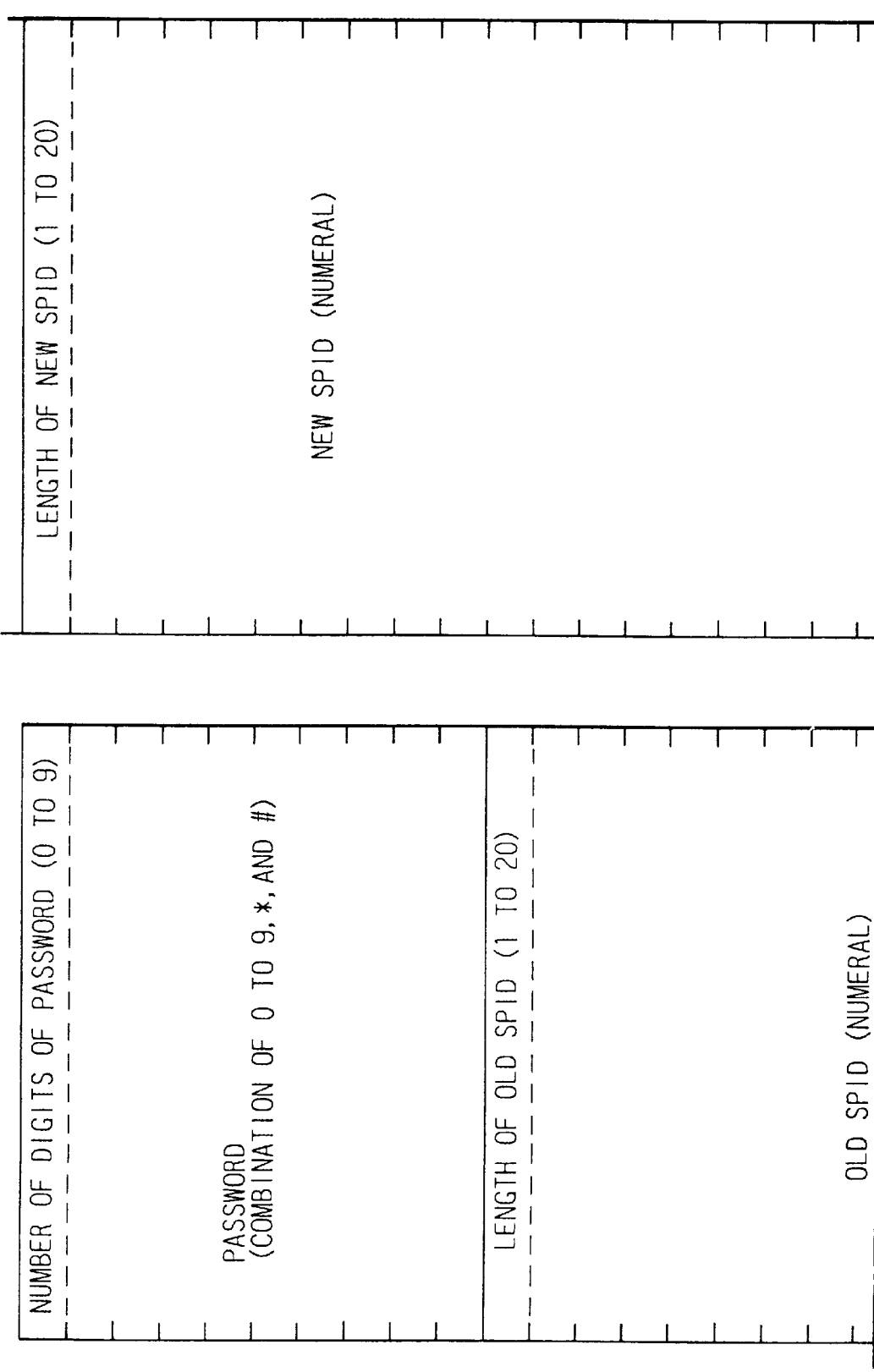

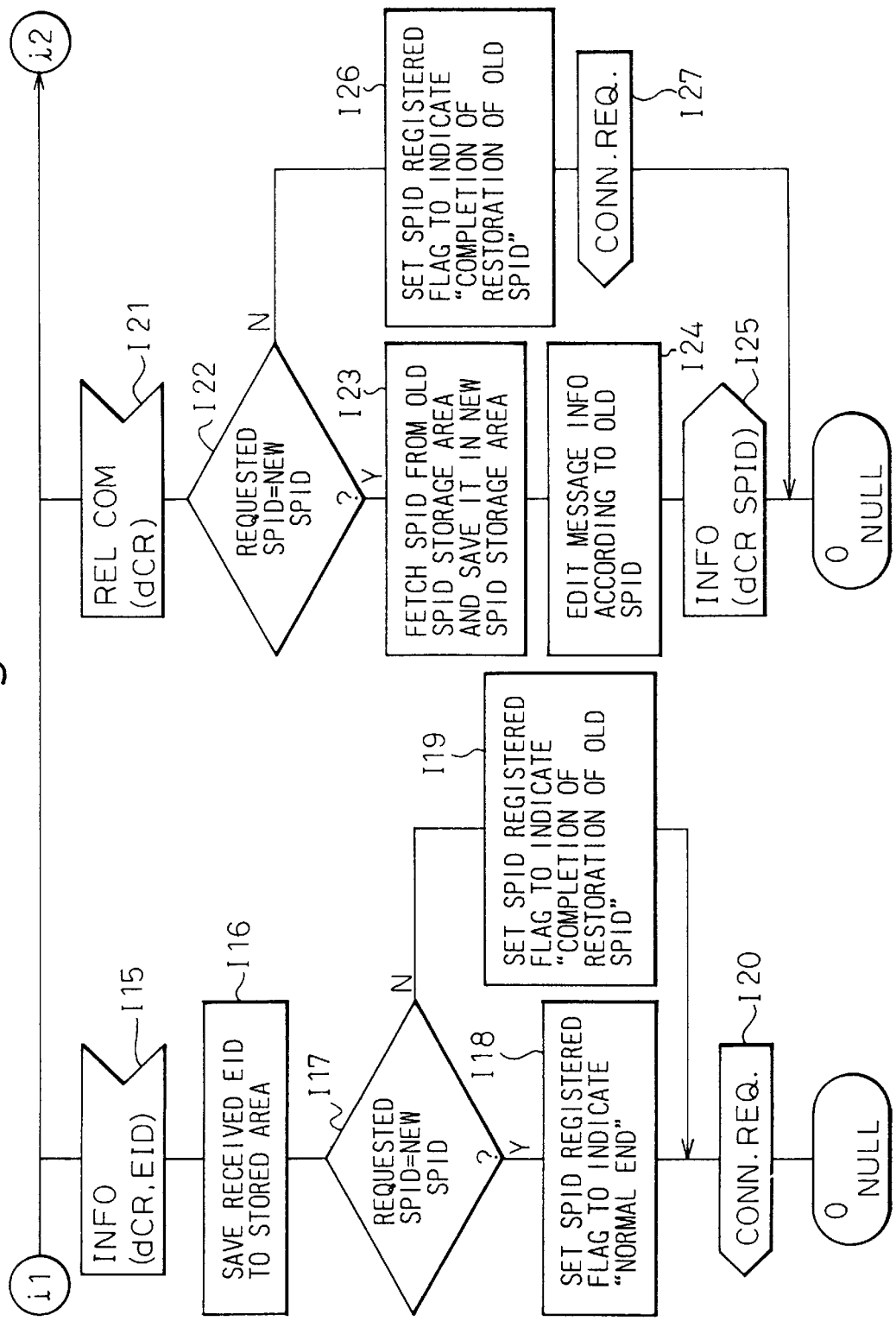

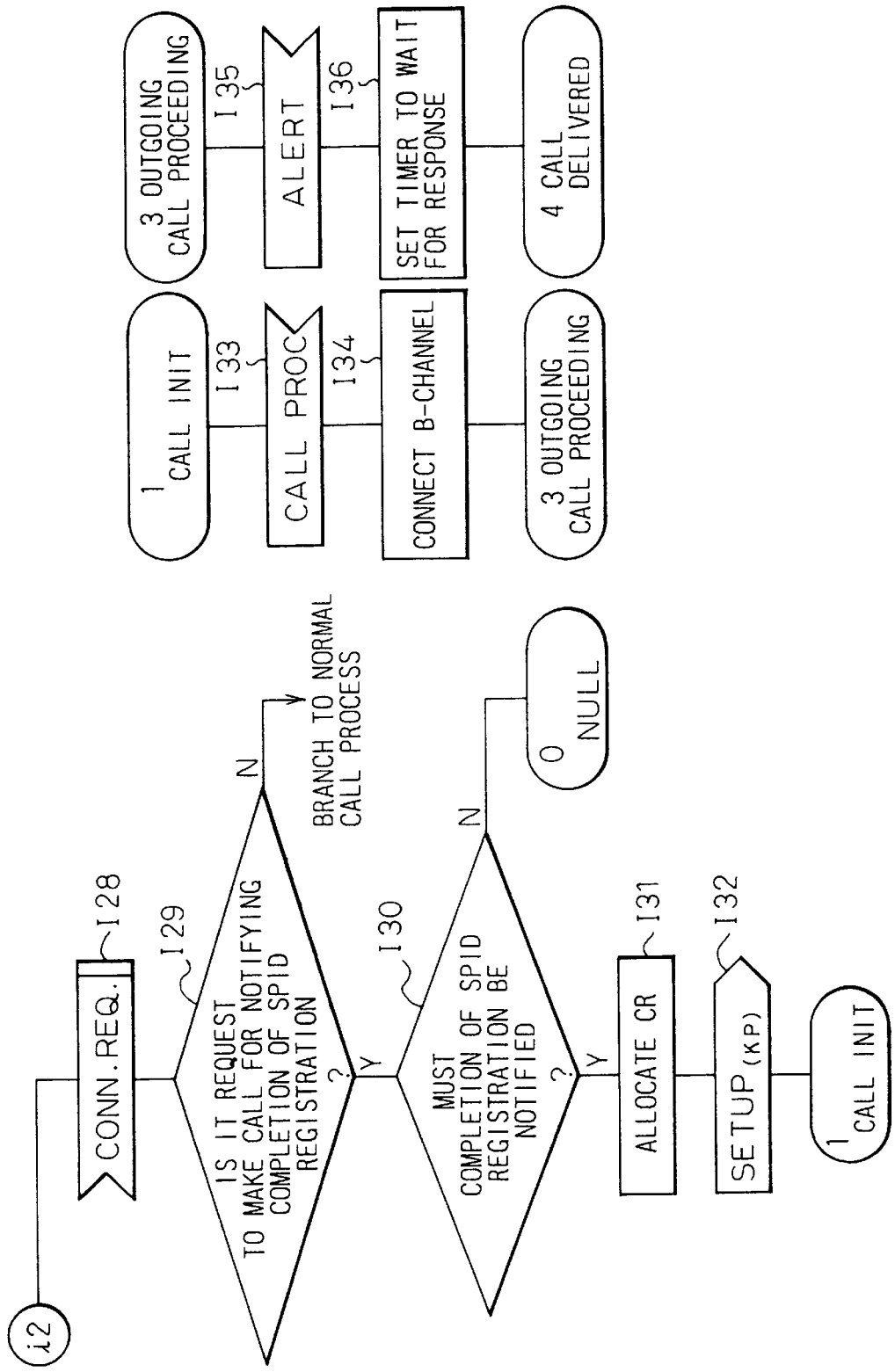

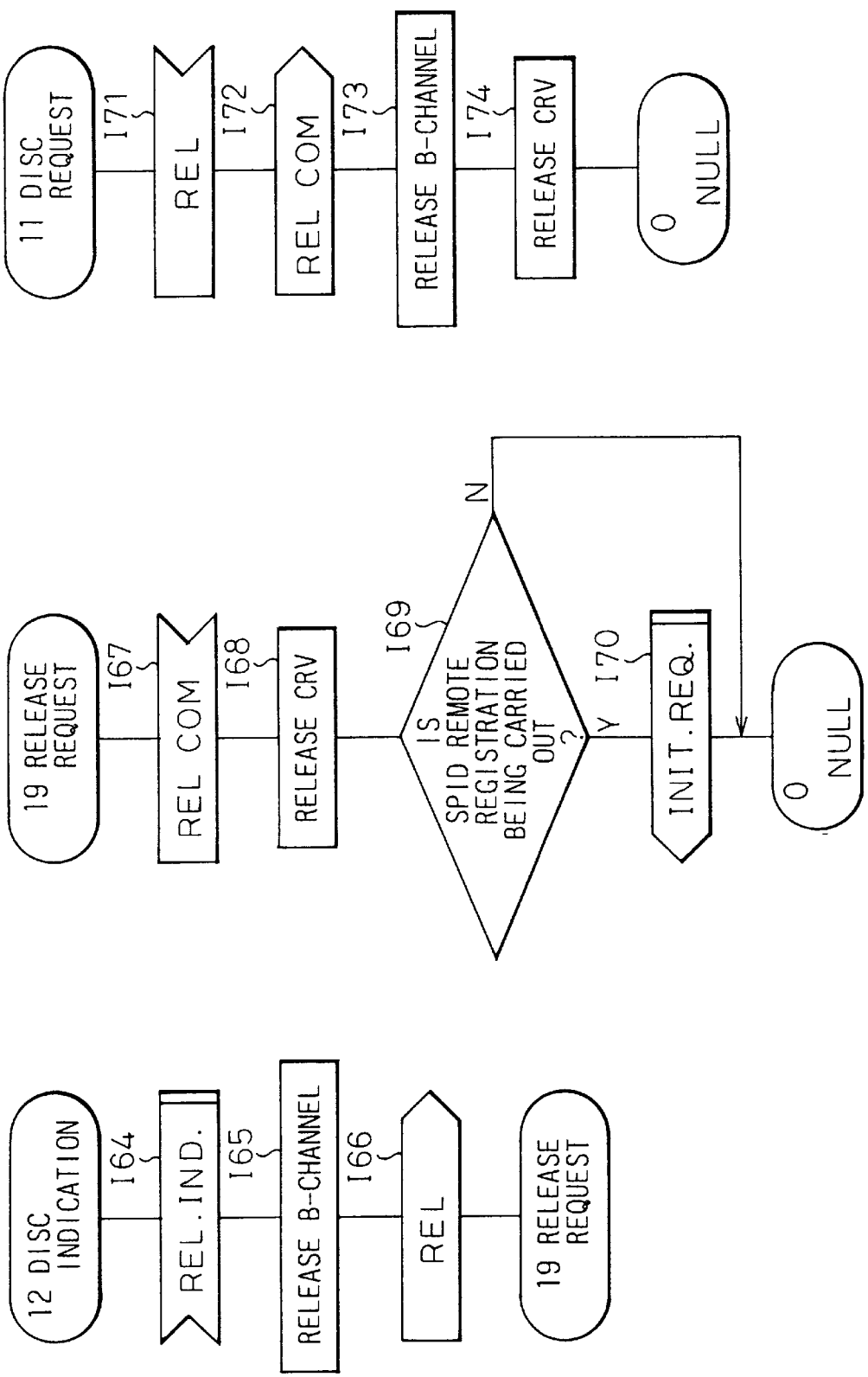

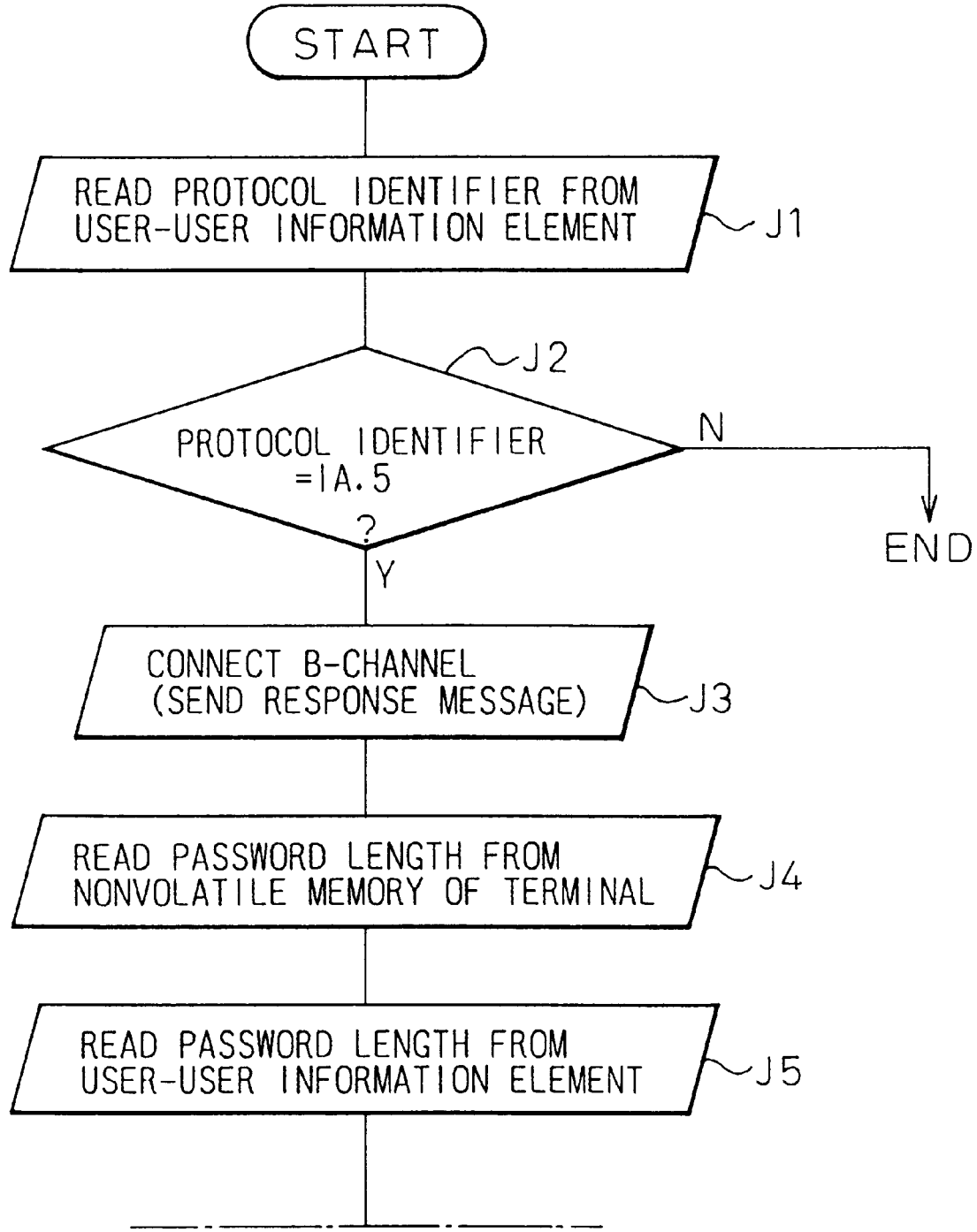

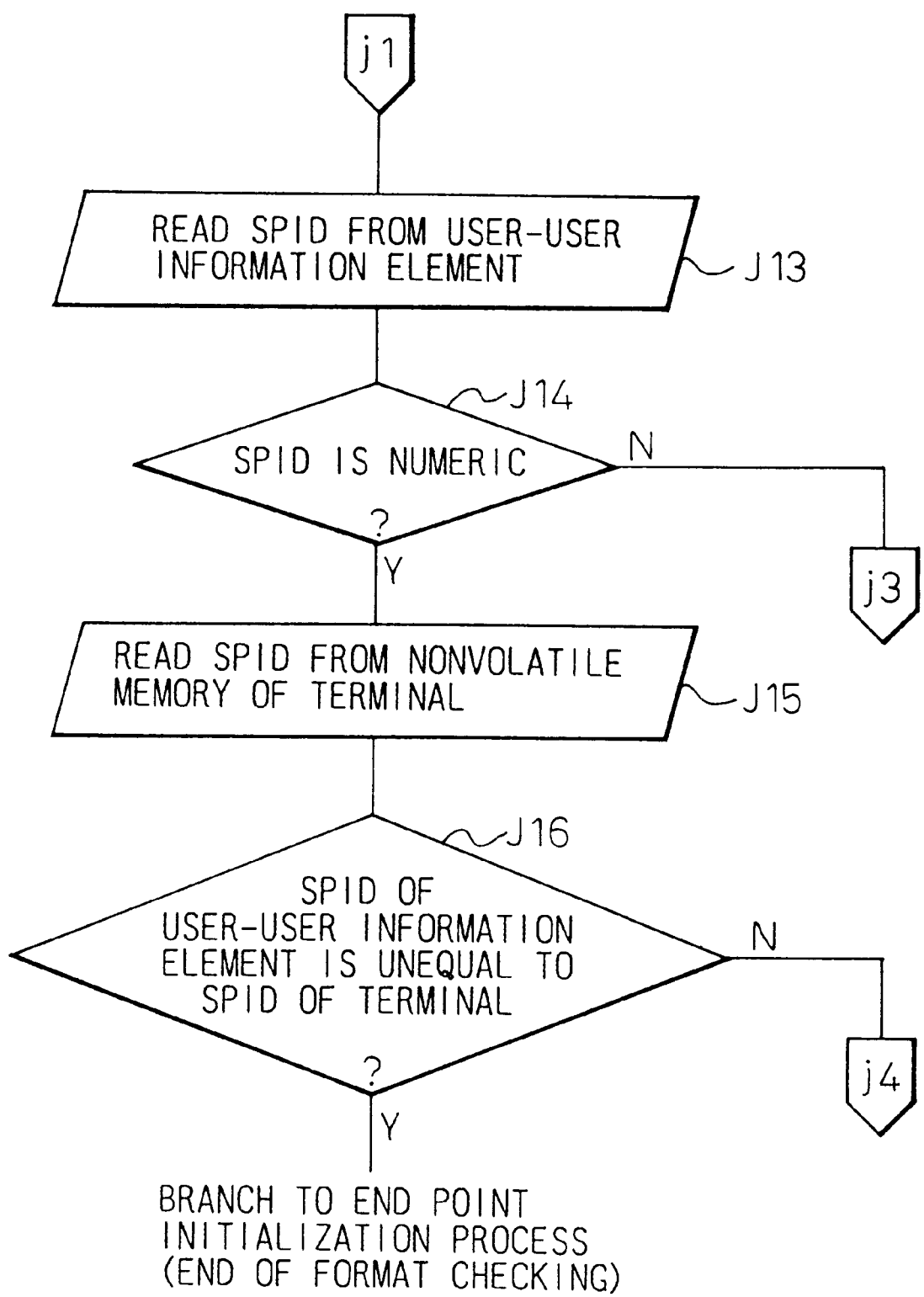

Fig. 43A

OPERATIONS OF CALLER AT CALLING SIDE

HEAR ANNOUNCEMENT AND RECOGNIZE THAT ENTERED SPID WAS CORRECTLY RECEIVED
↓
PUT DOWN HANDSET
↓
RELEASE CALL

→ DISCONNECT CALL (RELEASE LOOP)

PSTN

← SET CALL

ACTIVATE RINGER
↓

LIFT HANDSET → CONNECT CALL (FORM LOOP)

↓

PUT DOWN HANDSET → DISCONNECT CALL (RELEASE LOOP)

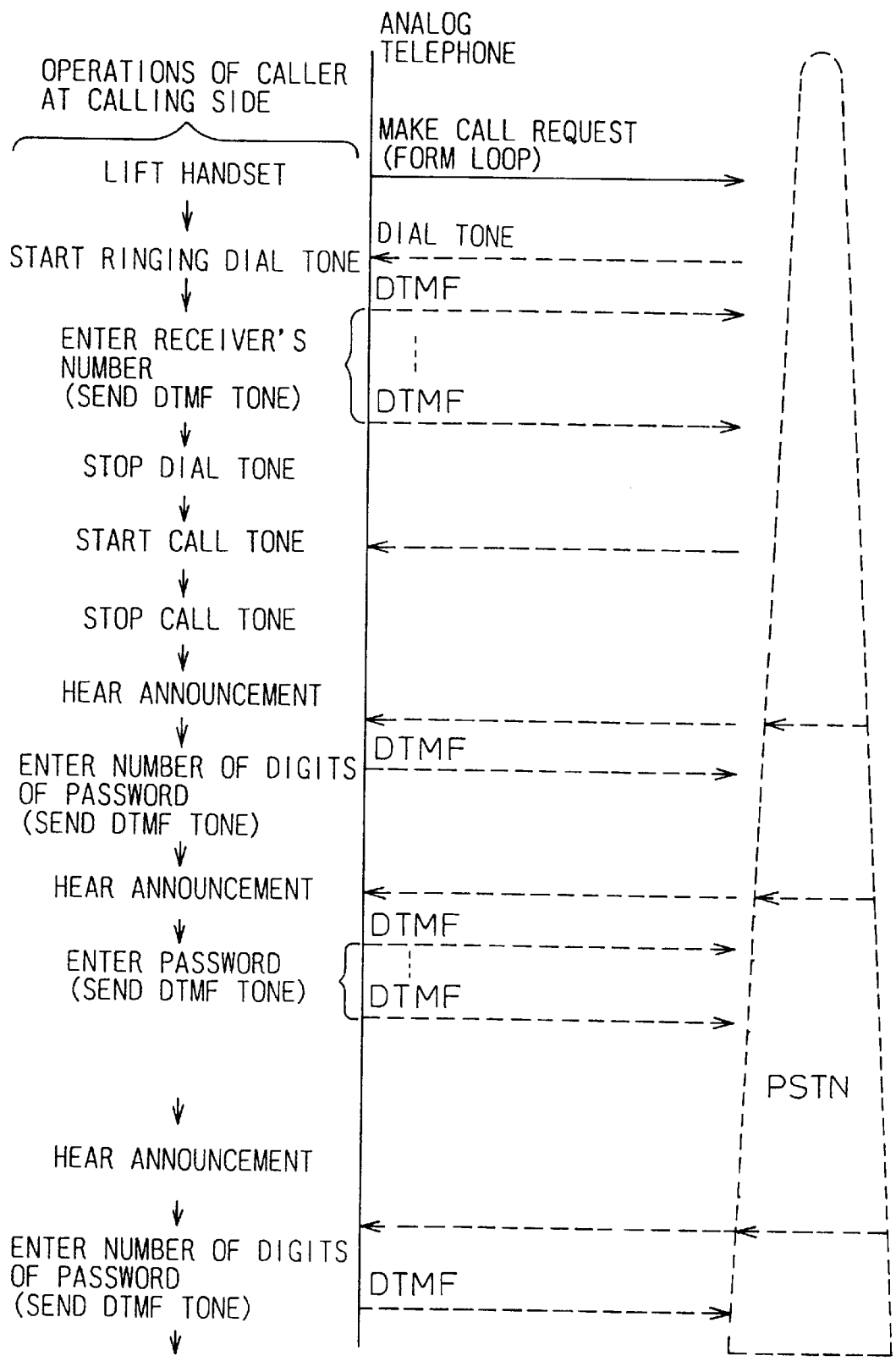

Fig. 45A

OPERATIONS OF CALLER AT CALLING SIDE

- HEAR ANNOUNCEMENT
- ↓
- ENTER PASSWORD (SEND DTMF TONE) — DTMF ... DTMF
- ↓
- HEAR ANNOUNCEMENT
- ↓
- ENTER NUMBER OF DIGITS OF PASSWORD (SEND DTMF TONE) — DTMF
- ↓
- HEAR ANNOUNCEMENT
- ↓
- ENTER PASSWORD (SEND DTMF TONE) — DTMF / DTMF
- ↓
- HEAR ANNOUNCEMENT
- ↓
- PUT DOWN HANDSET — DISCONNECT CALL (RELEASE LOOP)

PSTN

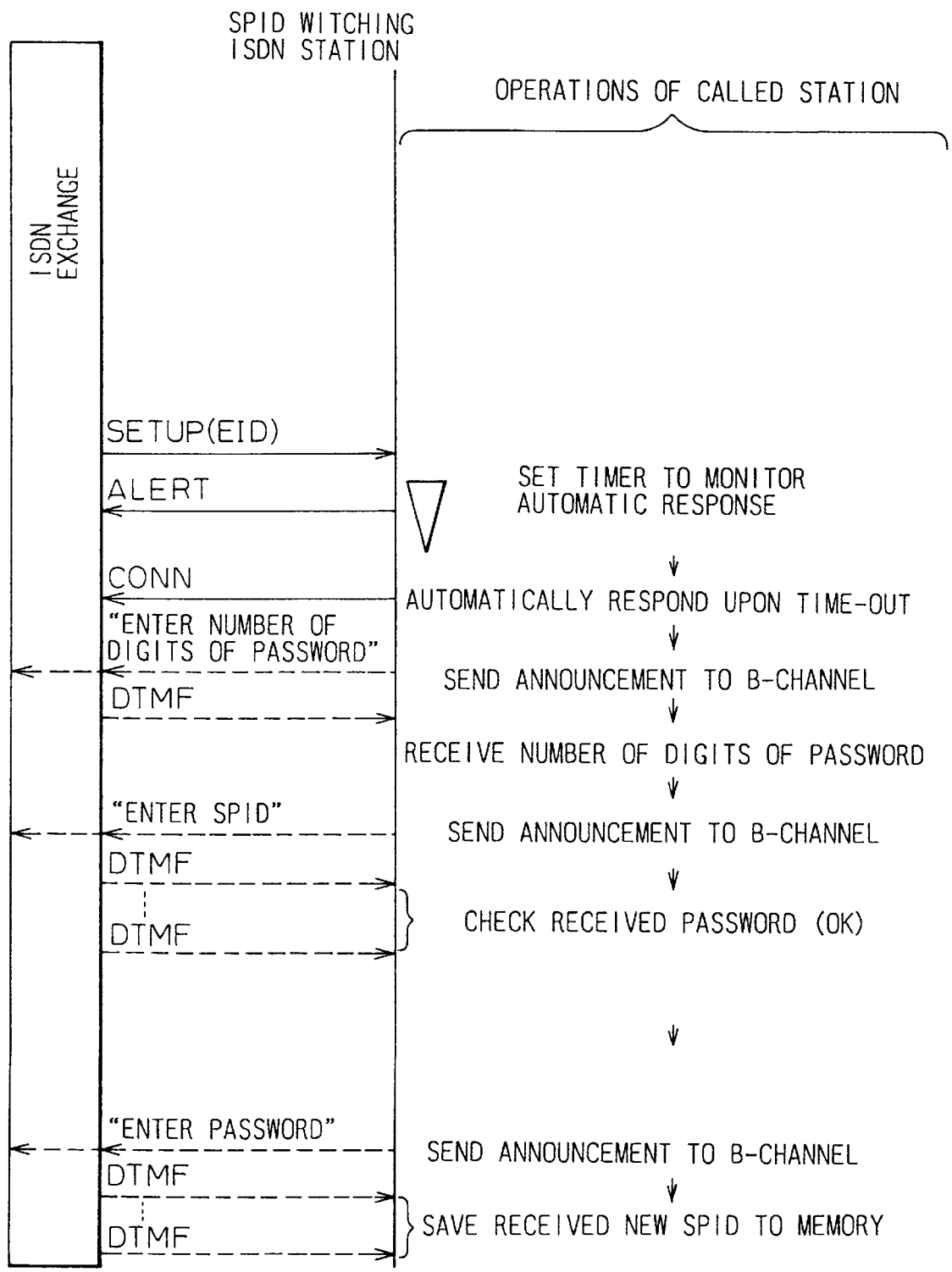

Fig. 47A

OPERATIONS OF CALLER
AT CALLING SIDE

HEAR ANNOUNCEMENT
AND RECOGNIZE THAT
ENTERED SPID WAS
CORRECTLY RECEIVED
↓
PUT DOWN HANDSET
↓
RELEASE CALL

DISCONNECT CALL
(RELEASE LOOP)

PSTN

↓

ACTIVATE RINGER

SET CALL

↓

PUT DOWN HANDSET

CONNECT CALL
(FORM LOOP)

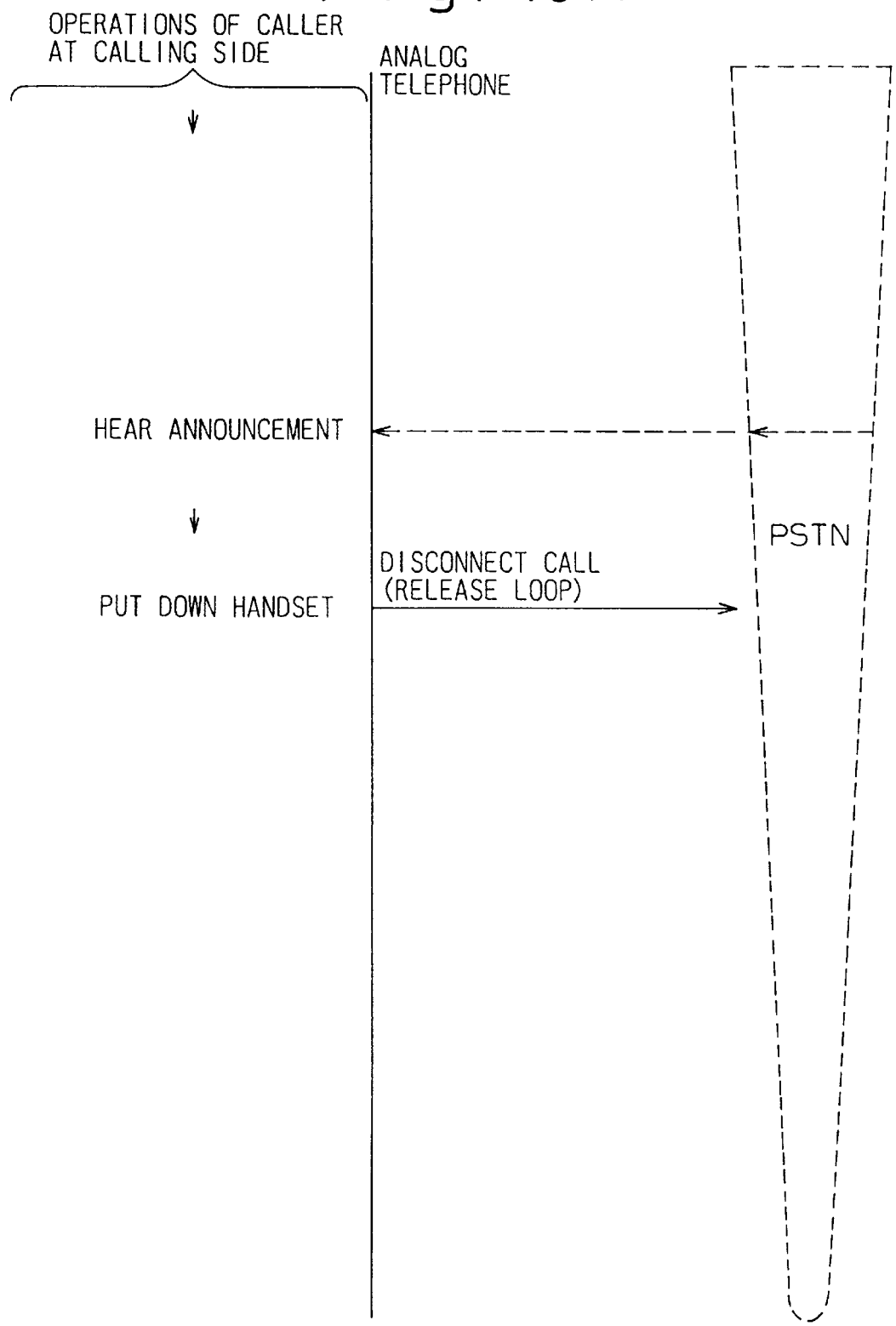

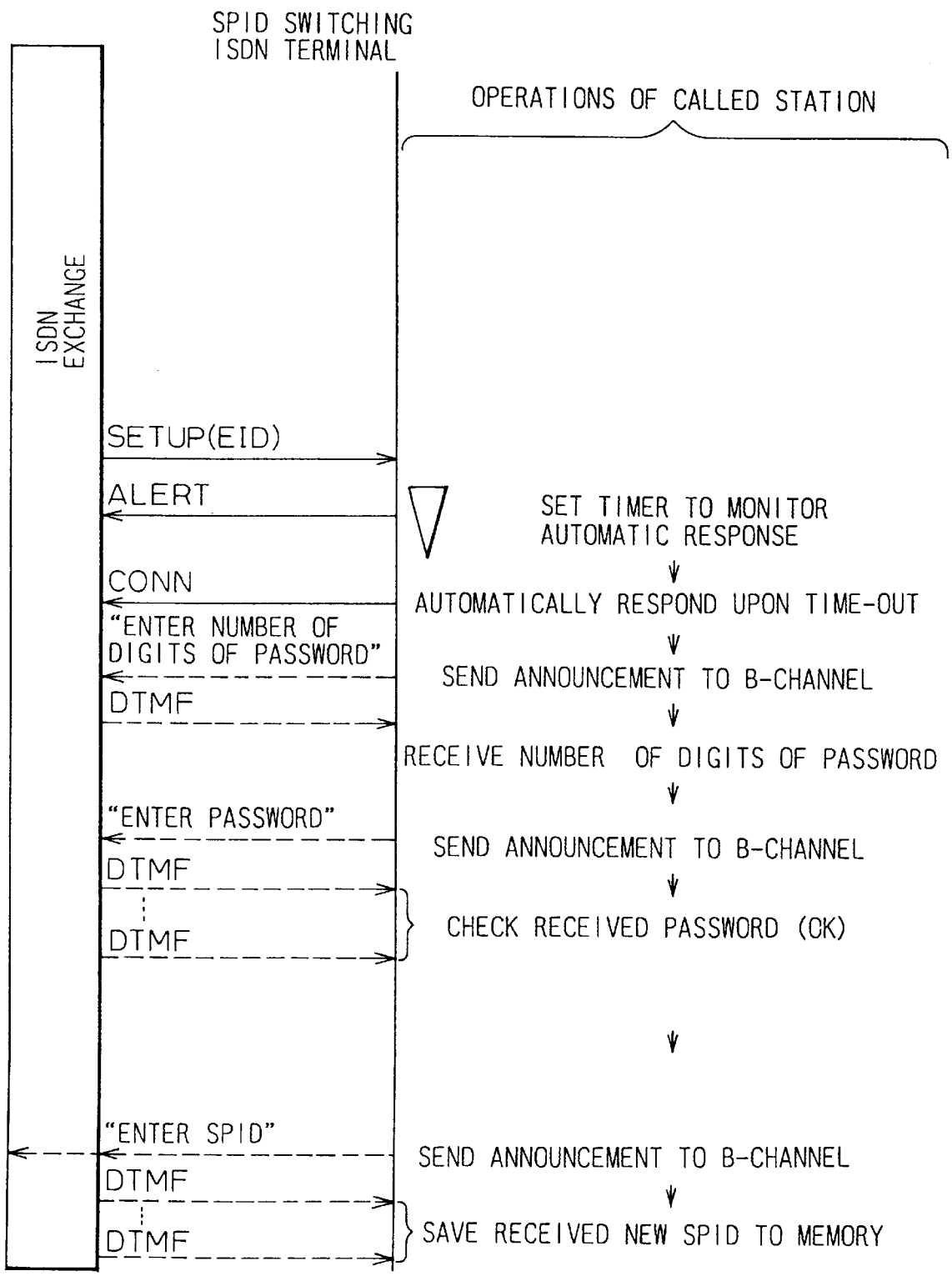

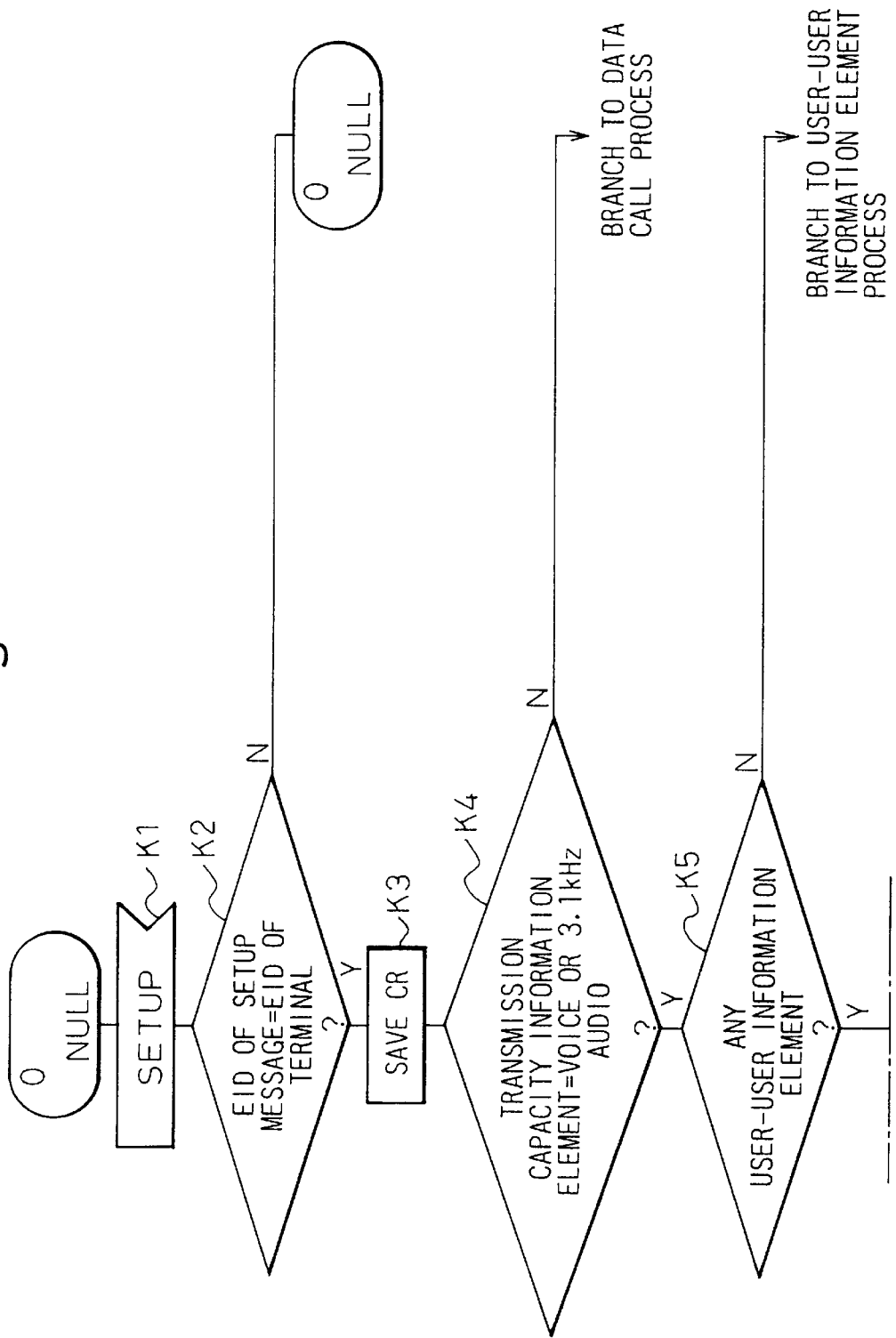

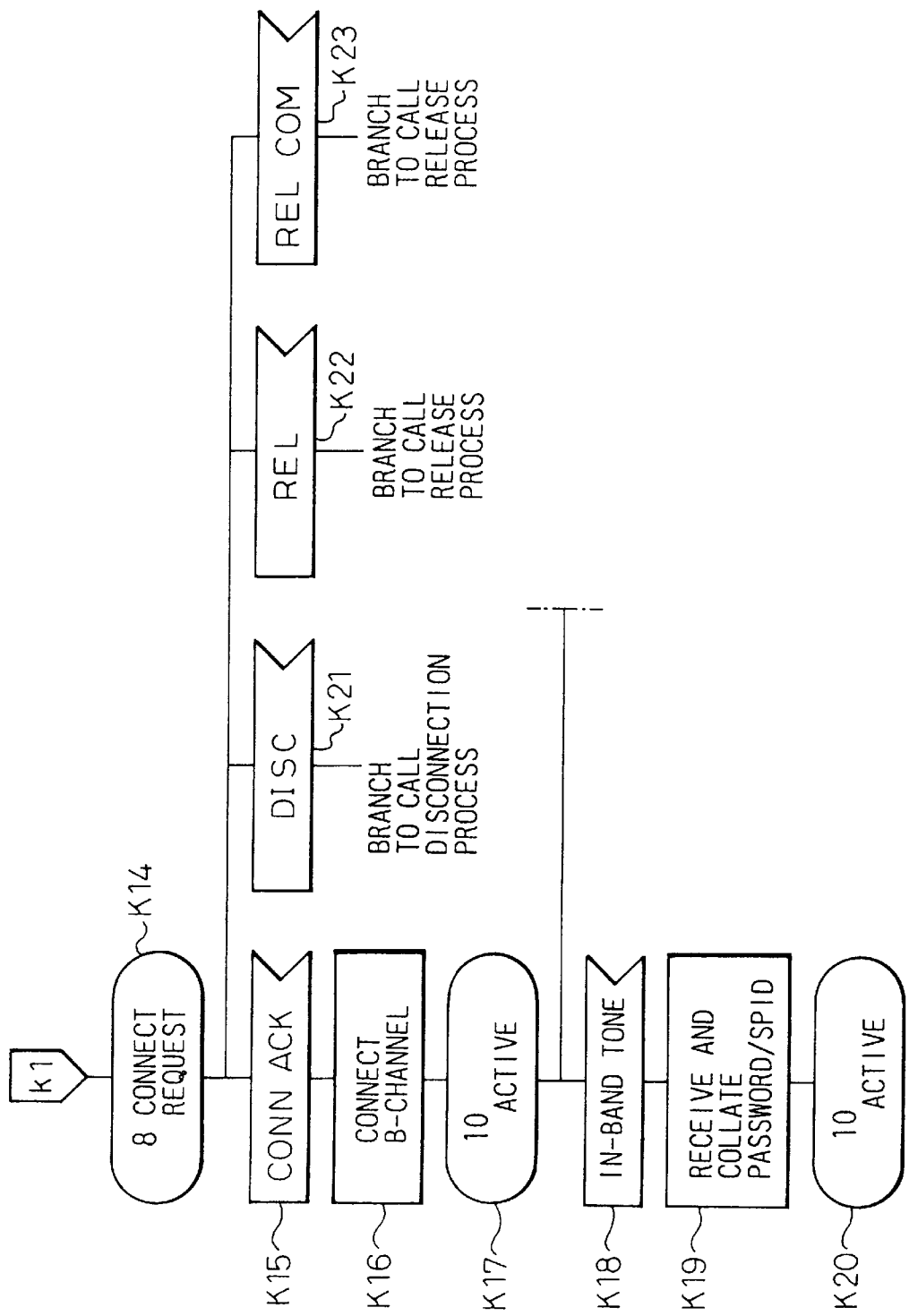

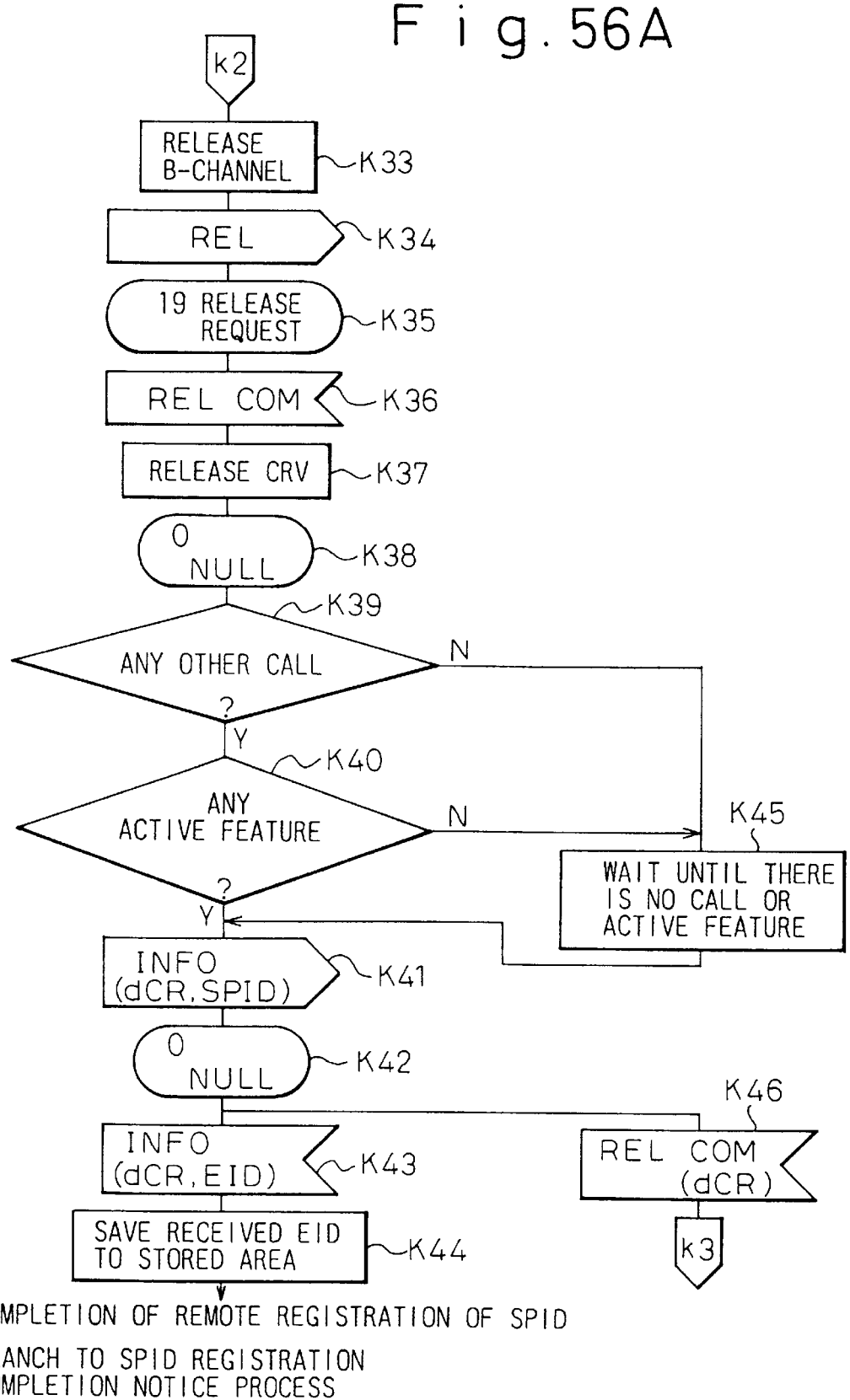

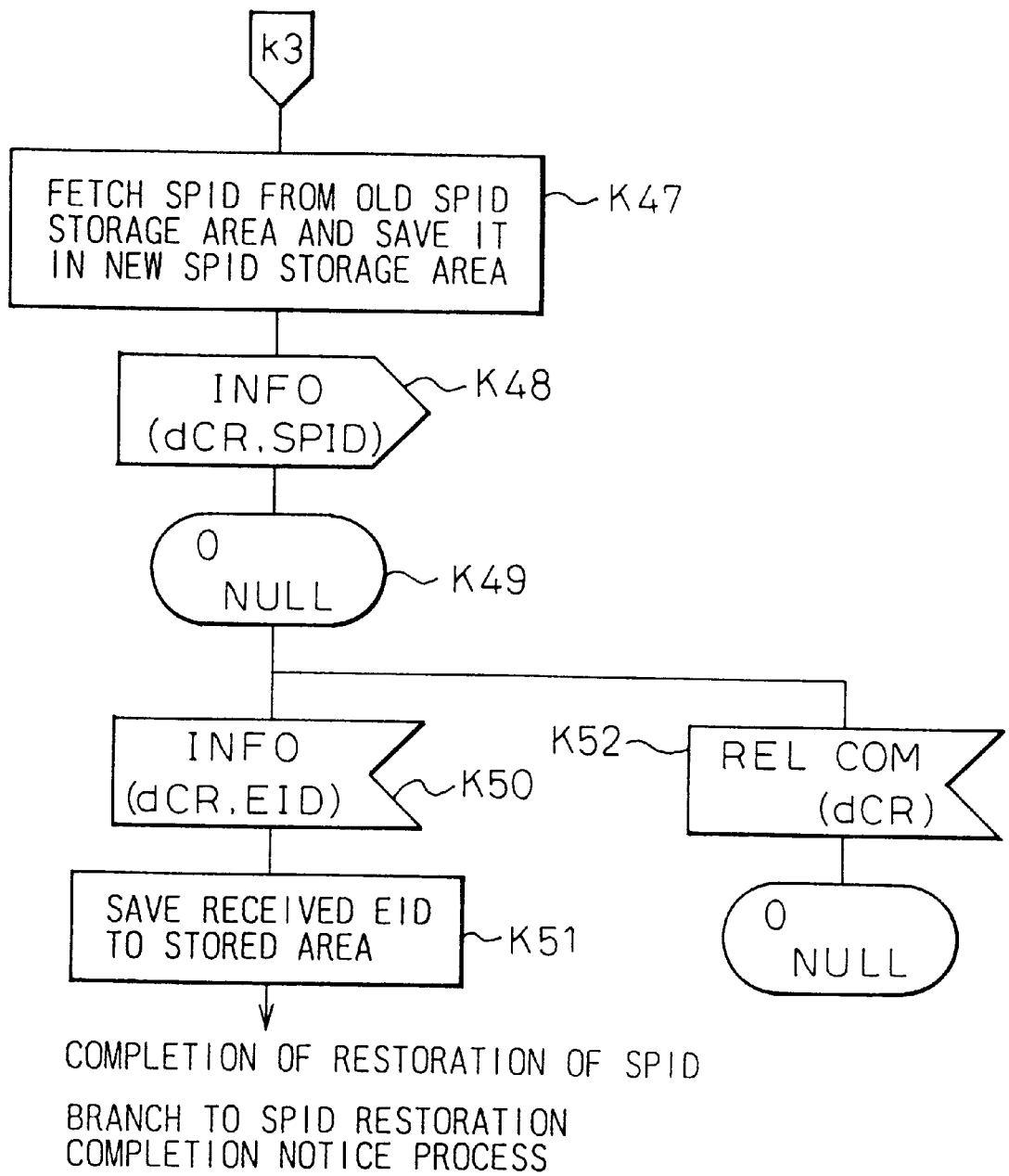

METHOD OF SWITCHING SERVICE PROFILE TO ANOTHER AND TERMINAL APPARATUS FOR UTILIZING THE METHOD

BACKGROUND OF THE INVENTION

1. Field of the Invention

The present invention relates to a method of switching service profiles of a remote terminal from one to another according to a given condition, and a terminal apparatus for utilizing the method.

2. Description of the Related Art

An ISDN (integrated services digital network) manages service profiles, which are information pieces including user telephone numbers and services given to users. A service is supplied to a user's terminal apparatus according to a service profile identifier (SPID) that is transmitted from the terminal apparatus to the network when a layer-2 link is established between them. The service profiles and end-point initialization are specified in ITU-T Recommendation Q.932. It should be easy to switch the service profiles from one to another, in order to expand the range of use of the service profiles.

According to a prior art, a service profile identifier (SPID) for specifying a service profile in an ISDN must directly be registered to a terminal apparatus. The terminal apparatus requests the network to initialize an end point according to the SPID. Whenever a different user uses the terminal apparatus, the user must register its own SPID to the terminal apparatus.

When the terminal apparatus requests the network to initialize the end point according to an SPID, the network allocates a service profile to the terminal apparatus and transmits information related to the service profile to the terminal apparatus. The terminal apparatus downloads the information and allocates functions to physical keys according to the downloaded information. At this time, a feature corresponding to the service profile is newly activated even if the feature has been activated previously.

A terminal apparatus of an ISDN is used in various ways. It may be used by different users. In this case, each user must enter its own SPID whenever the user uses the terminal apparatus. When the terminal apparatus is used at predetermined hours or on predetermined days by a specific user, the SPID must be entered into the terminal apparatus each time. This is troublesome.

Each SPID must be unique in the network. Namely, terminal apparatuses are not allowed to use the same SPID at the same time. If a second terminal apparatus sends an SPID, which is already registered in a first terminal apparatus, to the network, the network rejects the request to initialize an end point of the second terminal apparatus according to the SPID.

In this case, the user of the second terminal apparatus calls the user of the first terminal apparatus and asks him or her to delete the registered SPID and release a service profile for the SPID. Thereafter, the user of the second terminal apparatus the SPID to the second terminal apparatus so that the service profile for the SPID is allocated to the second terminal apparatus. If no user is present at the first terminal apparatus, it will be impossible for the user of the second terminal apparatus to use the service profile at the second terminal apparatus.

When a first service profile of a terminal apparatus is switched to a second service profile, information related to the second service profile is transmitted from the network to the terminal apparatus. Until the information is completely downloaded, the terminal apparatus is incapable of starting communication. According to the downloading information, functions are allocated to physical keys of the terminal apparatus. This function assignment is sometimes inconvenient for the user, and therefore, the user must reallocate the functions to the keys. Every time information is downloaded, this kind of confusion occurs.

SUMMARY OF THE INVENTION

An object of the present invention is to solve the problems of the prior art and automatically switch service profiles from one to another even from a remote place.

A method of switching service profiles from one to another at a terminal apparatus according to the present invention will be explained with reference to FIG. 1 as follows:

The method of switching service profiles from one to another at a terminal apparatus according to the present invention will be explained with reference to FIG. 1. (1) A method of switching service profiles controlled by a network 8 from one to another includes the steps of selecting one of service profile identifiers (SPIDs) stored in a memory 4 of a terminal apparatus according to switching conditions and switching a present service profile to one for the selected SPID.

Further, the method may include the steps of storing SPIDs and temporal information as a switching condition in the memory 4, monitoring time with a timer 5 of the terminal apparatus, and switching a present service profile to one for an SPID selected according to the temporal information.

The method may include the steps of storing, in the memory 4, SPIDs, service profile switching conditions, and retry conditions such as the number of retry actions related to the switching conditions, selecting one of the SPIDs according to the switching conditions, switching a present service profile to one for the selected SPID, and if the switching operation is unsuccessful, repeating the switching operation according to the retry conditions.

The method may include the steps of storing SPIDs and a given period in the memory 4 and releasing a present service profile when the unused period of the service profile exceeds the given period.

The method may include the steps of storing SPIDs and a frequency of use in the memory 4 and releasing a service profile when the frequency of use of the service profile is below the stored frequency of use.

The method may include the steps of storing downloaded information corresponding to the SPIDs, respectively, in the memory 4, determining whether or not information for a selected SPID is in the memory 4, and only when the information is not in the memory 4, downloading the information.

The method may include the step of allocating functions to physical keys of the terminal apparatus according to information downloaded from the network 8, wherein a given function is allocated to a given physical key in advance.

The method may include the steps of storing a feature activated for one or all of the SPIDs into the memory 4, switching a service profile to a given service profile, retrieving a feature corresponding to the given service profile from the memory 4 if it is stored therein, and activating the retrieved feature.

The method may include the steps of registering an SPID to the terminal apparatus from a remote place through a line, or selecting one of the service profiles stored in the terminal apparatus from the remote place through the line, to thereby switch a service profile of the terminal apparatus to one for the registered or selected SPID.

The method may include the steps of transferring an SPID as user—user information with a call setup message from the remote placed to the terminal apparatus and setting the SPID in the terminal appratus.

The method may include the steps of transferring an SPID with an in-band multifrequency signal (DTMF) through an established path from the remote place to the terminal apparatus and setting the SPID in the terminal apparatus.

The method may include the steps of transferring an SPID with a password whose number of digits is determined according to the degree of security, from the remote place to the terminal apparatus and setting or choosing the transferred SPID at the terminal apparatus only when the password is identical to one stored in the terminal apparatus.

The method may include the steps of determining that it is an illegal service profile switching request if the request is repeated for a predetermined number of times with a password that is different from the password stored in the terminal apparatus, and recording a caller number related to the request.

The method may include the step of informing the remote place of a result of the setting or choosing of the SPID requested by the remote place as well as a result of initialization of an end point carried out according to the set or chosen SPID.

The method may include the step of initializing the end point according to the preceding SPID if an initialization of the end point according to the requested SPID fails.

On the other hand, a terminal apparatus for switching service profiles controlled by a network 8 from one to another consists of a call controller 2 connected to the network 8, a memory 4 for storing SPIDs and corresponding switching conditions, a data registration unit 6 for registering data including an SPID in the memory 4, and an initialization unit 3 for initializing an end point according to an SPID registered in the memory 4 or one of the SPIDs stored in the memory 4 and selected according to the switching conditions.

The memory 4 has areas for storing the SPIDs. Each of the area stores a switching condition that is a period for which an unused state of a service profile may last or the number of times of use of the service profile, as well as downloaded information. The apparatus may have a timer 5 for monitoring an unused period, or a use-state detector 1 for monitoring the number of times of use of a service profile.

The terminal apparatus may have a card reader for entering an SPID.

The terminal apparatus may have a reception unit, which receives, from the network 8, a request for registering or selecting an SPID and controls the memory 4 accordingly. The terminal apparatus may have a password collation unit for collating a password sent with the request with a reference password.

The mode of operation in a method and an apparatus according to the present invention are explained below.

The method of switching service profiles from one to another stores SPIDs and switching conditions such as a switching time in the memory 4. One of the SPIDs is selected according to the switching conditions. The selected SPID is used to request the network 8 for initializing an end point. In this way, a service profile is switched to another according to the switching conditions.

When the switching conditions specify a time, the timer 5 monitors the time to switch a service profile to another. If the switching of service profiles fails, the switching operation is repeated according to a recorded retry condition. If the switching operation fails after a registered number of retry actions, the switching operation ends incompletely, or the preceding service profile is restored according to the preceding SPID.

If an unused period of a service profile exceeds a set period, or if the number of times of use of the service profile is below a registered number, it is determined that the service profile is used only temporarily, and the service profile is released. An SPID corresponding to the released service profile may be entered from another terminal apparatus.

If the memory 4 has information related to a requested service profile, the information will not be downloaded repeatedly. This eliminates a time for holding a line for downloading the information. Functions are assigned to physical keys according to the information. Specific functions may be assigned to specific physical keys in advance for the sake of user's convenience. This prevents the functions of the specific keys from being changed whenever information is downloaded. The memory 4 is checked to automatically activate a feature corresponding to a service profile started.

A remote terminal may register an SPID to or select one of SPIDs stored in the terminal apparatus through the network 8. An SPID registered to the terminal apparatus may be deleted therefrom from the remote terminal, and then, the SPID can be registered to the remote terminal. Namely, the remote terminal can switch the service profiles of the terminal apparatus from one to another.

The remote terminal may transfer an SPID as user—user information with a call setup message to the terminal apparatus, to set the SPID in the terminal apparatus. The remote terminal may transfer an SPID with an in-band multifrequency signal DTMF through an established path to the terminal apparatus, to set the SPID in the terminal apparatus. The number of digits of a password for an SPID is determined according to the degree of security. A service profile switching request is accepted by the terminal apparatus only when the password agrees with a registered one. If the password disagrees with the registered one for a predetermined number of consecutive trials, it is determined that the entered password is illegal and a call number contained in the corresponding call setup message is recorded. If the same call is made again, it will be rejected from the beginning.

With respect to a service profile switching request from a remote terminal, the terminal apparatus informs the remote terminal of whether or not a requested SPID has been accepted, or whether or not a service profile has successfully been switched to another. According to the information, the user of the remote terminal may enter the SPID into the remote terminal. If the network 8 rejects an end point initialization for the requested SPID, or if the end point initialization is incomplete due to a line failure, another end point initialization request is made with the preceding SPID, to restore the preceding service profile.

The terminal apparatus has the use-state detector 1, call controller 2, initialization unit 3, memory 4, timer 5, data registration unit 6, card reader 7, and I/O controller 9. The I/O controller 9 and card reader 7 are used to register SPIDs into the memory 4. Also registered are switching conditions such as temporal information including day and time and information whether or not a switching request from a remote terminal is permitted. The initialization unit 3 activates the call controller 2 to request the network 8 to initialize an end point according to an SPID. The network 8 allocates a service profile corresponding to the SPID to the terminal apparatus. Information related to the service profile is downloaded from the network and stored in the memory 4 under the control of the data registration 6.

The memory 4 may store, for each SPID, temporal information for switching a service profile to another, a period in which an unused state is allowed, a switching condition such as the number of times of use, downloaded information, a password, etc. An SPID is switched to another according to the switching conditions, and an end point initialization request for the new SPID is made to the network 8, which switches a service profile to another accordingly.

BRIEF DESCRIPTION OF THE DRAWINGS

FIG. 18 shows a remote control operation according to an embodiment of the present invention;

FIG. 19 shows a network for registering an SPID from a remote terminal according to an embodiment of the present invention;

FIGS. 20A and 20B show an essential part of a memory;

FIG. 35 is a continuation of the flowchart of FIGS. 34A and 34B;

FIG. 36 is a continuation of the flowchart of FIG. 35;

FIG. 39 is a continuation of the flowchart of FIGS. 38A and 38B;

FIGS. 40A and 40B are a flowchart showing the steps of checking user—user information according to an embodiment of the present invention;

FIGS. 41A and 41B are a continuation of the flowchart of FIGS. 40A and 40B;

FIGS. 43A and 43B show a continuation of the sequence of FIGS. 42A and 42B;

FIGS. 44A and 44B show a sequence of handling an incorrect password according to an embodiment of the present invention;

FIGS. 45A and 45B show a continuation of the sequence of FIGS. 44A and 44B;

FIGS. 46A and 46B show a sequence of restoring an old SPID according to an embodiment of the present invention;

FIGS. 47A and 47B show a continuation of the sequence of FIGS. 46A and 46B;

FIGS. 48A and 48B show a continuation of the sequence of FIGS. 47A and 47B;

FIGS. 49A and 49B show a sequence of handling a failure of restoration of an old SPID according to an embodiment of the present invention;

FIGS. 54A and 54B are a flowchart showing the steps of registering and SPID to a remote terminal according to an embodiment of the present invention;

FIGS. 55A and 55B are a continuation of the flowchart of FIGS. 54A and 54B; and FIGS. 56A and 56B are a continuation of the flowchart of FIGS. 55A and 55B.

PREFERRED EMBODIMENTS OF THE INVENTION

Figure 1:
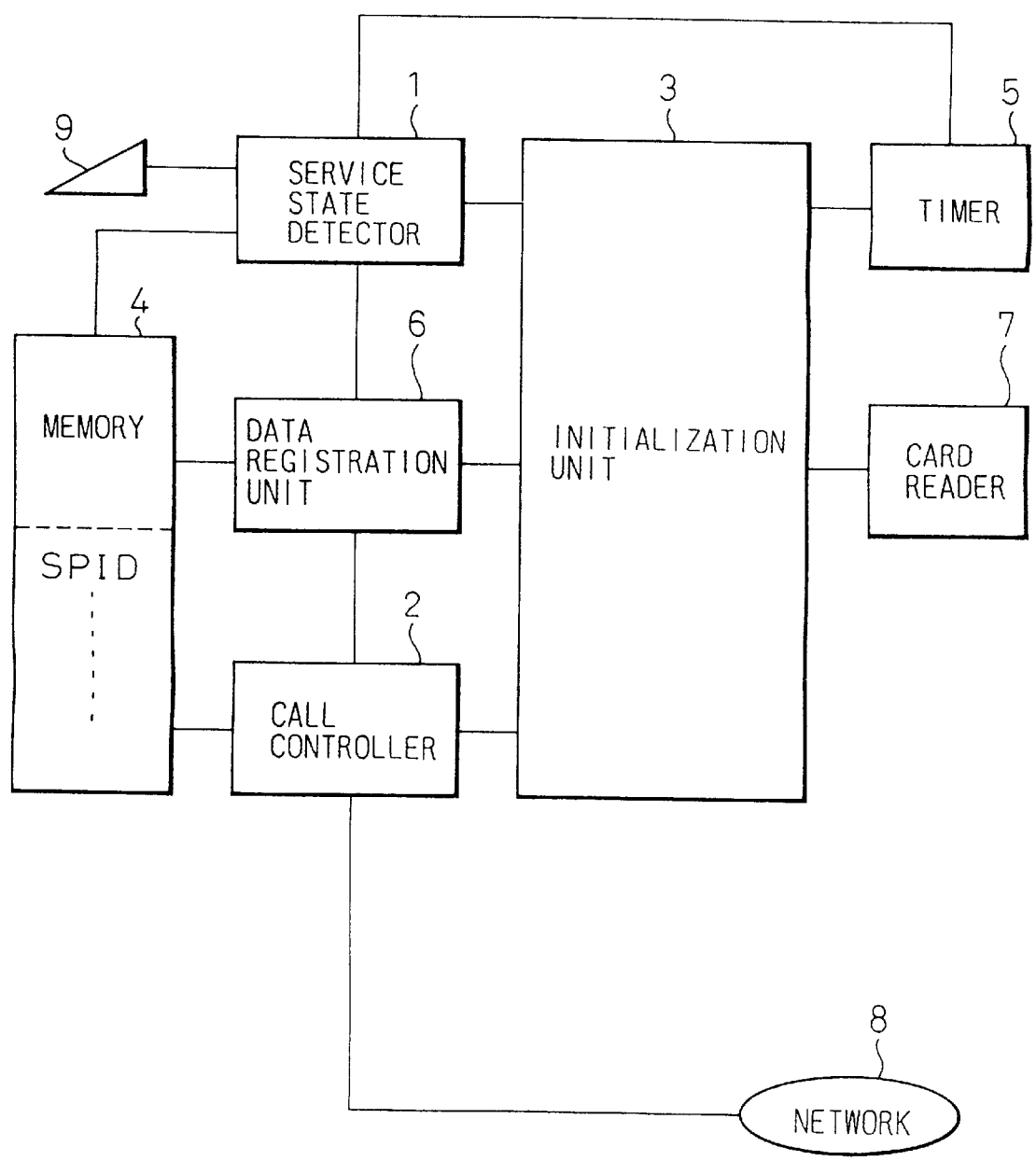
FIG. 1 is a block diagram showing the basic concept of the present invention.

FIG. 1 is a block diagram showing the basic concept of the present invention. In FIG. 1, numeral 1 denotes a service-state detector, 2 is a call controller, 3 is an initialization unit, 4 is a memory, 5 is a timer, 6 is a data registration unit, 7 is a card reader, 8 is a network, and 9 is an I/O device such as a transmitter-receiver, keyboard, or display.

The call controller 2 sends an receives a call to and from the network 8. The initialization unit 3 sends a system reset to a terminal apparatus and sends an end point initialization request to the network 8. The memory 4 stores service profile identifiers (SPIDs), switching conditions, downloading information, retry conditions, etc.

The timer 5 is hardware or software to monitor time. The data registration unit 6 registers data of SPIDs and switching conditions, etc., into the memory 4. The card reader 7 reads a card that records an SPID so that the SPID is registered or switched from one to another.

Figure 2:
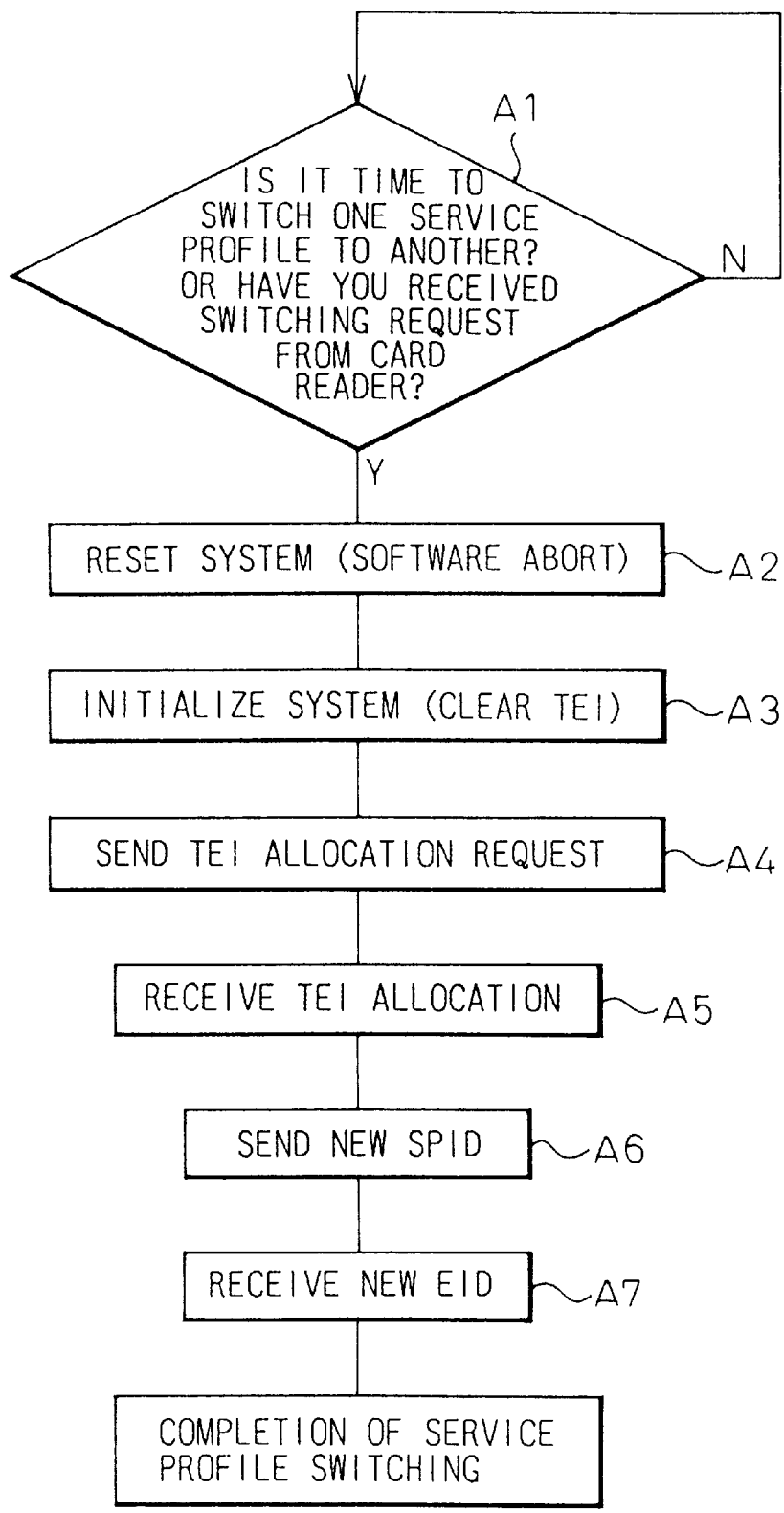
FIG. 2 is a flowchart showing the steps of switching service profiles from one to another.

FIG. 2 is a flowchart showing a process of switching a service profile to another. When the memory 4 stores a time as switching condition, step A1 determines whether or not it is the time to switch the present service profile to another, or determines whether or not the card reader 7 has sent a request for switching the service profile to another. If it is the time to switch the service profile, step A2 carries out a software abort to generate the system reset signal of the terminal apparatus.

Step A3 clears a terminal end point identifier (TEI), to complete the system initialization of the terminal apparatus. Step A4 requests the network 8 to allocate a new TEI. Step A5 receives an allocation of the TEI, and step A6 sends a new SPID with an end point initialization request to the network 8. Step A7 receives a new SPID from the network, to complete the switching of service profiles.

Figure 3:
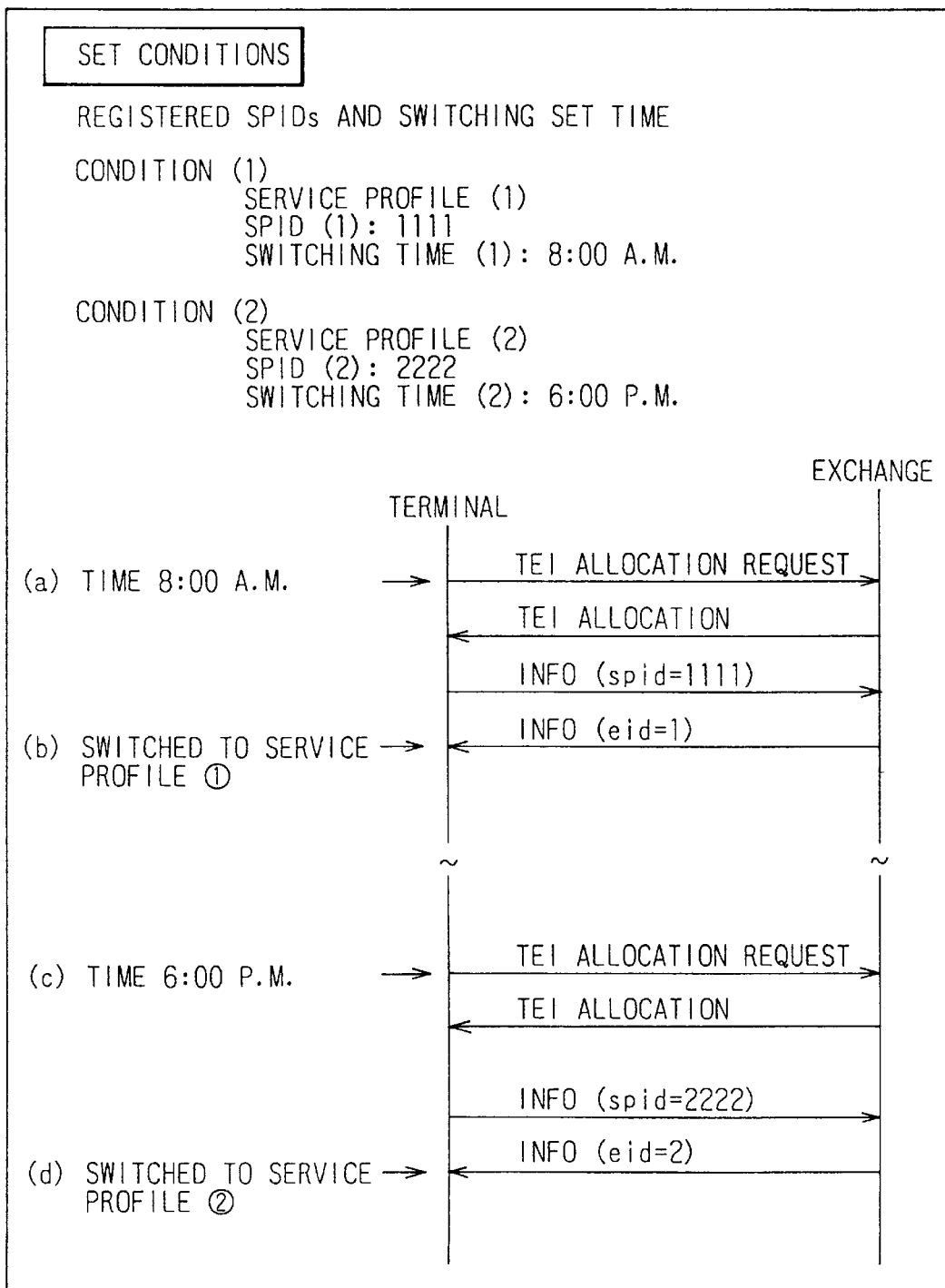
FIG. 3 shows a sequence of switching service profiles from one to another according to a set time.

FIG. 3 shows a sequence of switching a service profile to another according to a set time. The memory 4 stores a plurality of SPIDs and switching times. A condition (1) involves an SPID (1) of 1111 and a switching time (1) of 8:00 a.m. A condition (2) involves an SPID (2) of 2222 and a switching time (2) of 6:00 p.m. Namely, the same terminal apparatus is used by different users in the daytime and nighttime or by different service profiles.

In step (a), the timer 5 monitors time and activates the initialization unit 3 at 8:00 a.m. The initialization unit 3 resets the terminal apparatus, clears the terminal end point identifier, TEI, initializes the apparatus, and requests the network (an exchange) to allocate a new TEI. The network allocates the TEI to the terminal appratus. The terminal apparatus sends the SPID (1) OF 1111 stored in the memory 4 as an information message INFO (spid=1111) to the network and requests the network to initialize the end point.

In step (b), the network (exchange) allocates a service profile (1) corresponding to the SPID (1) of 1111 and sends an end point identifier EID for the service profile (1) as an information message INFO (eid=1) to the terminal apparatus from the exchanger (network). The terminal apparatus receives the end point identifier EID, and the switching to the service profile (1) is completed. In this way, the service profile (1) is automatically activated at 8:00 a.m.

The timer 5 monitors time, and when it detects 6:00 p.m., the initialization unit 3 starts. In step (c), the terminal apparatus is reset, and a TEI allocation request is sent to the exchange (network). A TEI is allocated to the terminal apparatus, which sends the SPID (2) of 2222 as an information message INFO (spid=2222) to the exchange. The exchange allocates a service profile (2) corresponding to the SPID(2) to the terminal apparatus and sends an end point identifier EID corresponding to the service profile (2) as an information message INFO (eid=2) to the terminal apparatus in step (d), to complete the switching to the service profile (2). In this way, the service profile (1) is automatically switched to the service profile (2) at 6:00 p.m.

Figure 4:
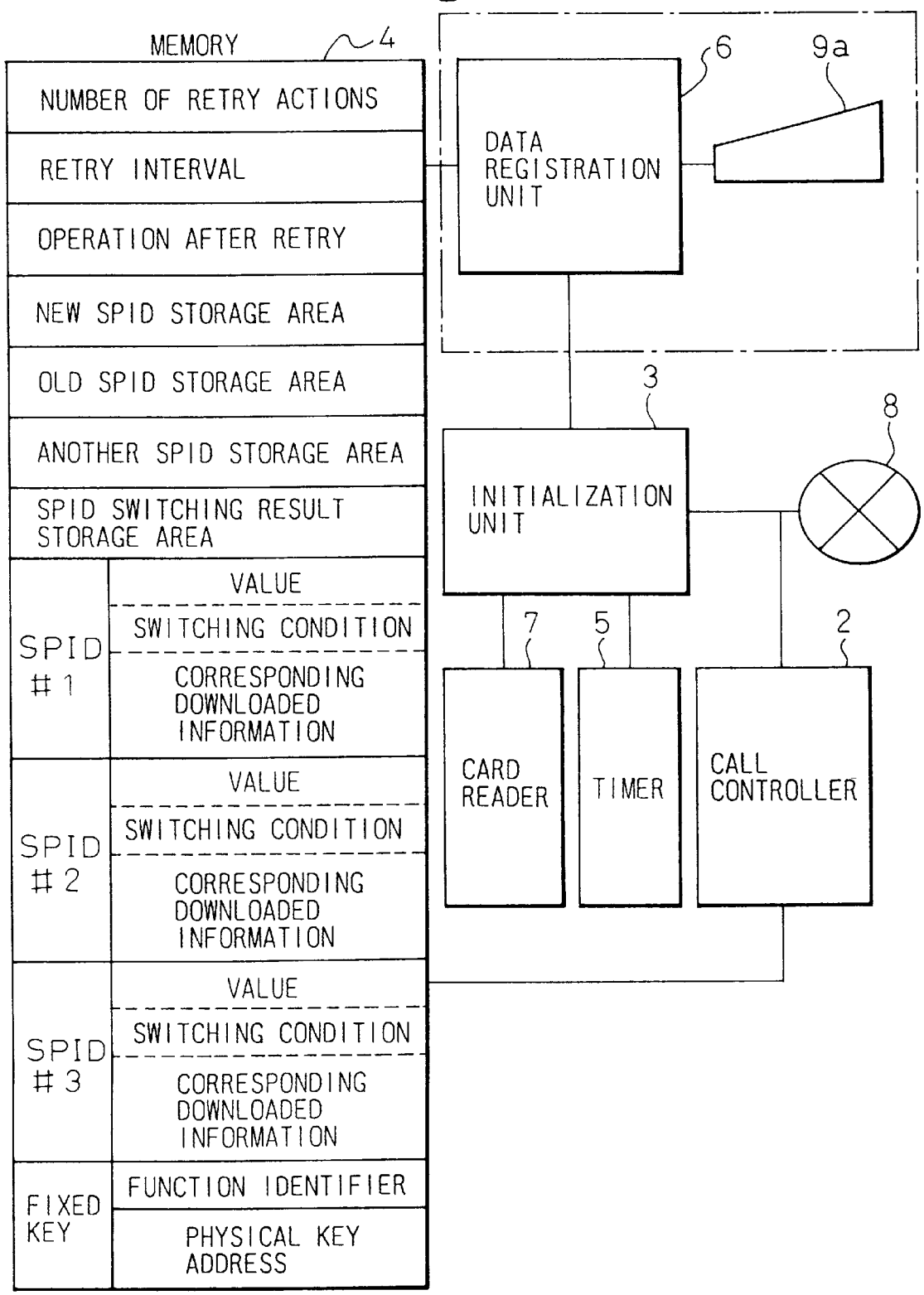
FIG. 4 shows end point initialization, retry, and fixed key allocation.

FIG. 4 explains an end point initialization, retry, and fixed key allocation. The same reference marks as those of FIG. 1 represent like parts. Reference mark 9a is a keyboard serving as an I/O device. The keyboard 9a is used to enter retry conditions including the number of retry actions, the intervals of the retry actions, an operation to be carried out after a retry operation, switching conditions, and fixed key information. The data registration unit 6 stores the entered data into the memory 4. The keyboard 9a is also used to enter a new service profile identifier (SPID) to switch a service profile to another.

When the terminal apparatus sends an end point initialization request with a new SPID to the network 8, it is possible that the request may be rejected by the network 8. In this case, the terminal apparatus repeats the request. The number of retry actions stored in the memory 4 specifies the number of repetitions of the end point initialization request. If no retry action is required, the number is set to 0.

The retry interval specifies the intervals of retry actions. An operation to be carried out when the network 8 rejects the set number of retry actions of end point initialization request is one of the following:

(1) send a new end point initialization request with another SPID;

(2) send a end point initialization request with the same SPID after a predetermined period;

(3) send an end point initialization request with an SPID that has been used before the failed end point initialization request; and (4) carry out no action.

The memory 4 has an area for storing the retry conditions, an area for storing a new SPID corresponding to a newly allocated service profile, an area for storing the preceding SPID, an area for storing another SPID, an area for storing the values, switching conditions, and download information of the SPIDs, and an area for storing the function identifiers and physical key addresses of fixed keys. The keyboard 9a is used to enter data into the fixed key area of the memory 4, and the data registration unit 6 registers physical key addresses and function identifiers to the area, to thereby allocate required functions to required physical keys.

SPID #1, SPID #2, SPID #3, etc., in the memory 4 correspond to the SPID (1) OF 111, SPID (2) of 2222, etc., mentioned above. Each SPID consists of, for example, 20 digits. The switching conditions include a switching time, etc. Information downloaded from the network is stored in an area of the memory 4 that is storing a corresponding SPID.

The embodiment of FIG. 4 employs only one fixed key having an allocated function. The memory 4 may store a plurality of fixed keys with their functions identifiers and physical key addresses. Fixed keys and allocated functions may be stored in areas for storing corresponding SPIDs.

Figure 5:
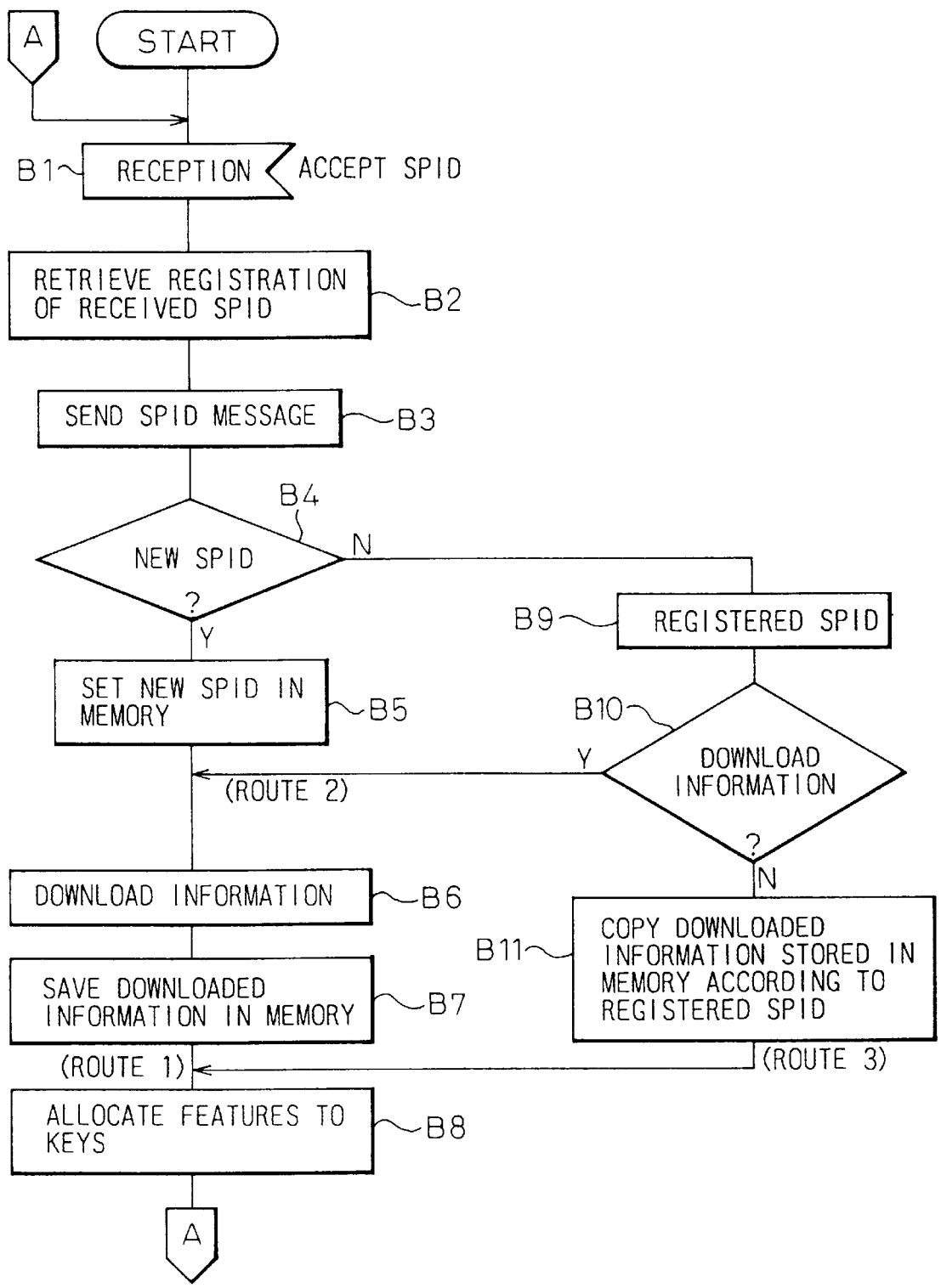
FIG. 5 is a flowchart showing the steps of again registering an SPID and downloading related information.

FIG. 5 is a flowchart showing the steps of downloading information for a registered service profile identifier (SPID) from the network. Step B1 receives an SPID from the I/O device 9 or card reader 7. Step B2 finds the SPID in the memory 4. Step B3 sends a message containing the SPID to the network. Namely, the terminal apparatus requests the network to initialize an end point according to the SPID.

Step B4 determines whether or not the SPID is registered. If not, step B5 registers the SPID to the memory 4, and step B6 downloads information related to the SPID from the network. Step B7 stores the downloaded information in the memory 4. Steps B4 to B7 form a route 1. Step B8 allocates functions to feature keys.

If the SPID is registered in step B9, step B10 determines whether or not information must be downloaded. If it must be downloaded, steps along a route 2 and the route 1 are carried out. If the information is not downloaded, step B11 copies registered information from an area corresponding to the SPID, and step B8 is carried out through a route 3. In this way, no information is downloaded from the network if the information is stored in the memory 4, and communication is quickly started.

Figure 6:
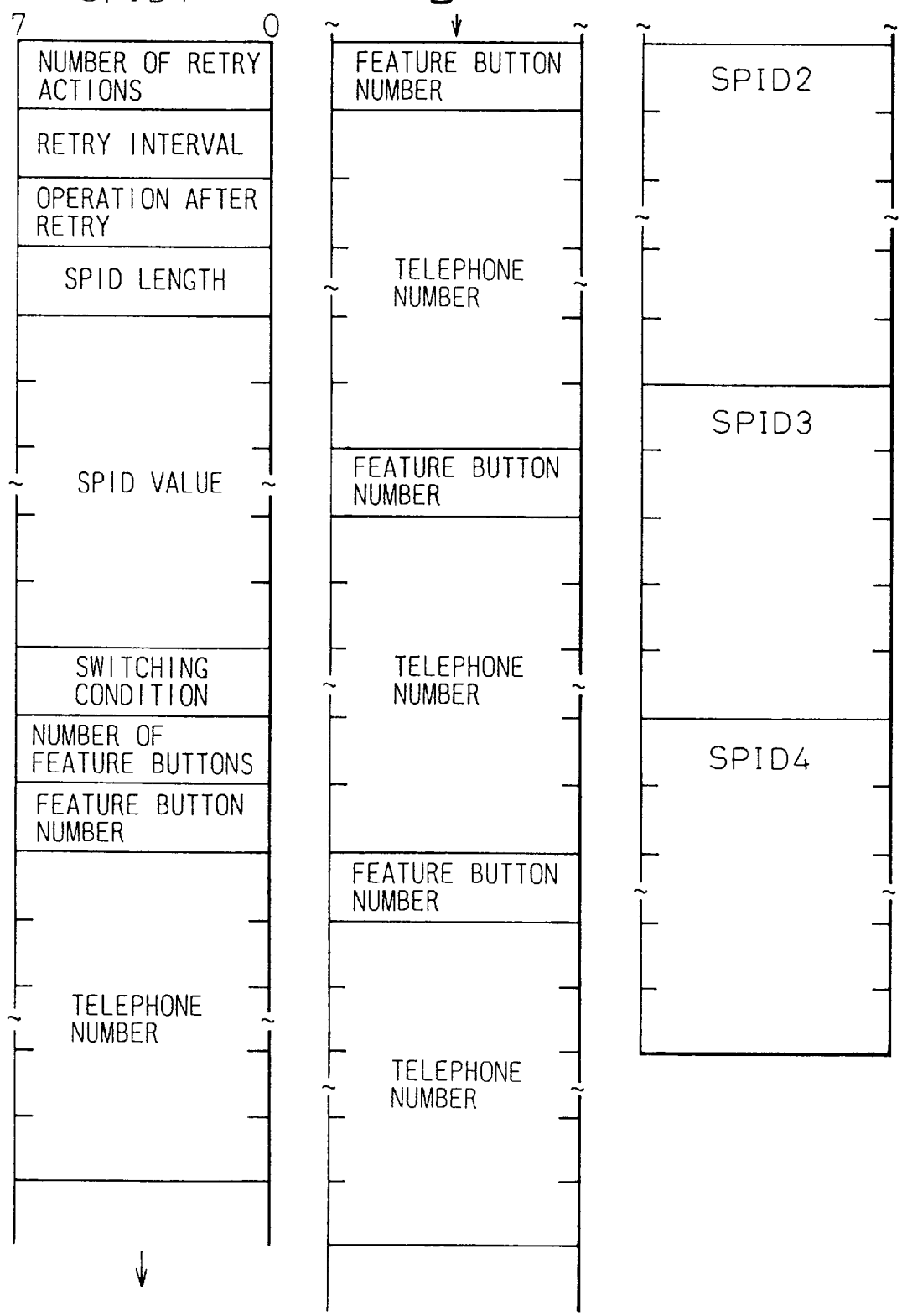
FIG. 6 shows an area for storing downloaded information.

FIG. 6 shows areas of the memory 4 for storing downloaded information. The memory 4 has areas SPID #1, SPID #2, SPID #3, and the like for SPID 1, SPID2, SPID 3, etc., respectively. Among them, FIG. 6 shows the area for the SPID 1. The area stores retry conditions including the number of retry actions, a retry interval, and an operation to be carried out after the retry actions, an SPID length, an SPID itself, switching conditions, the number of feature buttons, feature button numbers, and telephone numbers.

When an SPID is going to be registered or chosen, it is checked to see whether or not the SPID is already in the memory. If the SPID is not stored, the length and value of the SPID are written into an available space in the memory, and information related to the SPID is downloaded from the network. The information is written to the memory at a position corresponding to the telephone number, and functions are allocated to feature keys.

If the SPID is already registered and the information is stored, the download operation is not carried out, and functions are allocated to the feature keys according to the stored information.

Figure 7:
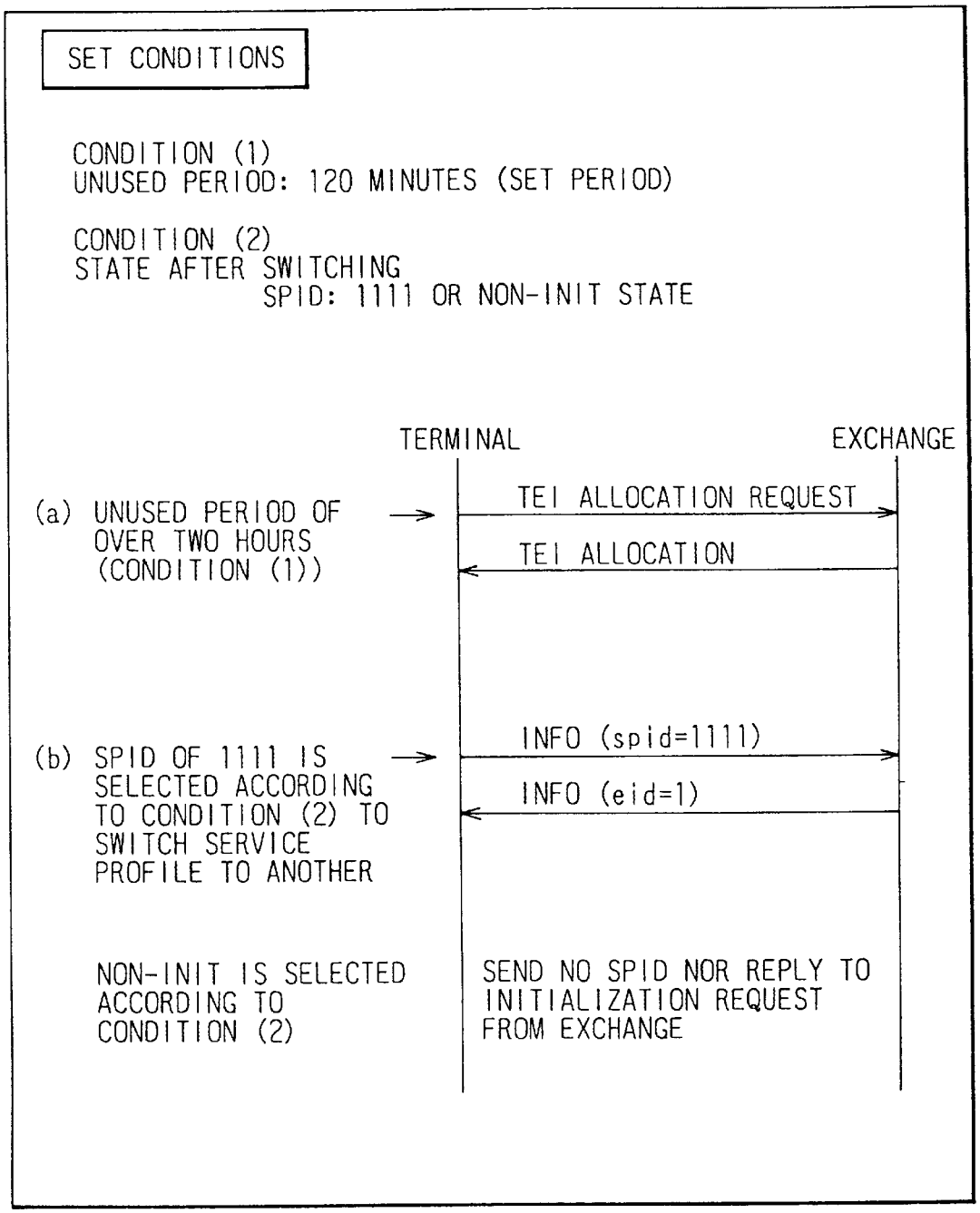
FIG. 7 shows a sequence of switching service profiles from one to another according to an unused period.

FIG. 7 shows a sequence of switching a service profile to another according to an unused period. A condition (1) specifies an unused period of 120 minutes. A condition (2) specifies an SPID of 1111 or a non-initialized state to which the present state is going to be switched. Namely, the present state is switched to a state involving a default service profile, or to a state in which no service profile is allocated. If the timer 5 detects that the unused period of two hours (120 minutes) has passed, step (a) resets the terminal apparatus and requests the exchange (network) to allocate a TEI.

The exchange allocates the TEI to the terminal apparatus. If the condition (2) specifies the SPID of 1111, step (b) sends an information message INFO (spid=1111) to the exchange, to request the exchange to initialize the end point. The network sends an end point identifier with an information message INFO (eid=1) to the terminal apparatus, to complete the switching process. If the condition (2) specifies the non-initialization, the terminal apparatus does not send the SPID to the exchange and ignores an initialization request from the exchange.

When the present service profile is temporarily switched to another and if the profile is unused over the set unused period, the original service profile is automatically resumed, or the non-initialization state is established. In the latter case, another terminal apparatus is allowed to register the SPID. Instead of the unused period, the number of times of use of a service profile in a set period may be employed. If the number of times of use is below a given value, the present service profile is switched to another. In this case, a state to be established after the service profile is switched to another must be specified.

Figure 8:
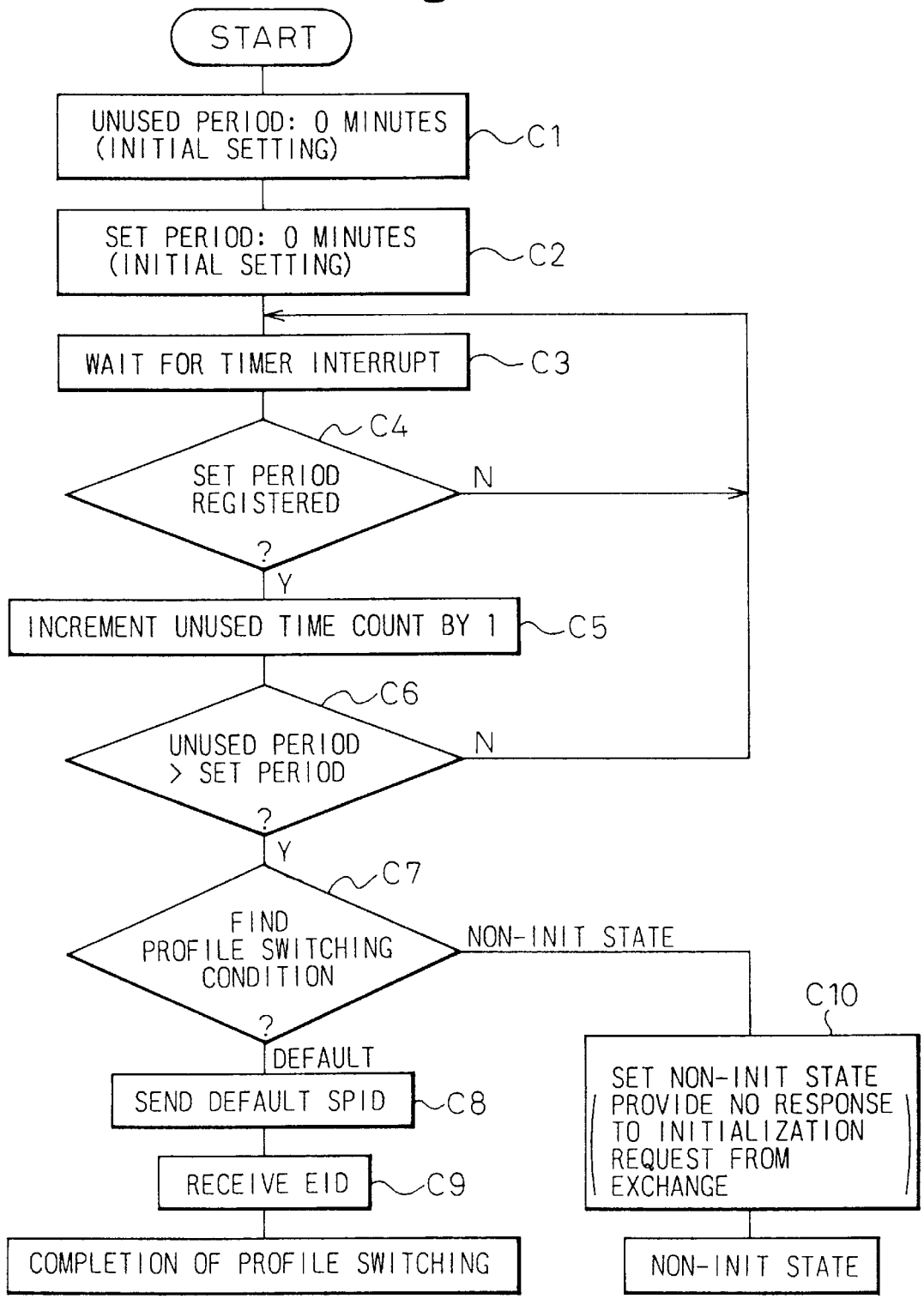
FIG. 8 is a flowchart showing the steps of switching service profiles from one to another according to the number of times of use.

FIG. 8 is a flowchart showing the steps of switching a service profile to another according to the number of times of use. If the number of times of use is below a given value for a set period, the service profile is switched to another. Step C1 initializes an unused period to 0, and step C2 initializes the set period to 0. Step C3 sets the interval of an interrupt carried out by the timer 5 to, for example, one minute. Step C4 determines whether or not the set period is registered. For example, the set period is 120 minutes. If the terminal apparatus is unused when the timer 5 interrupts, step C5 increments the count of the unused period by one. If the terminal apparatus is used, the count is zeroed.

Step C6 determines whether or not the period counted by the timer 5 is above the set period. If the count is above the set period, step C7 checks the switching condition of service profiles. If it specifies to resume a default service profile, step C8 sends and SPID to the network and requests the network to initialize the end point. Step C9 receives an end point identifier EID, to complete the switching of service profiles.

If the switching condition specifies a non-initialization state, step C10 sets the non-initialization state. Then, the terminal apparatus does not respond to an initialization request from the exchange (network). Accordingly, no service profile is allocated to the preceding SPID nor to any other SPID.

Figure 9:
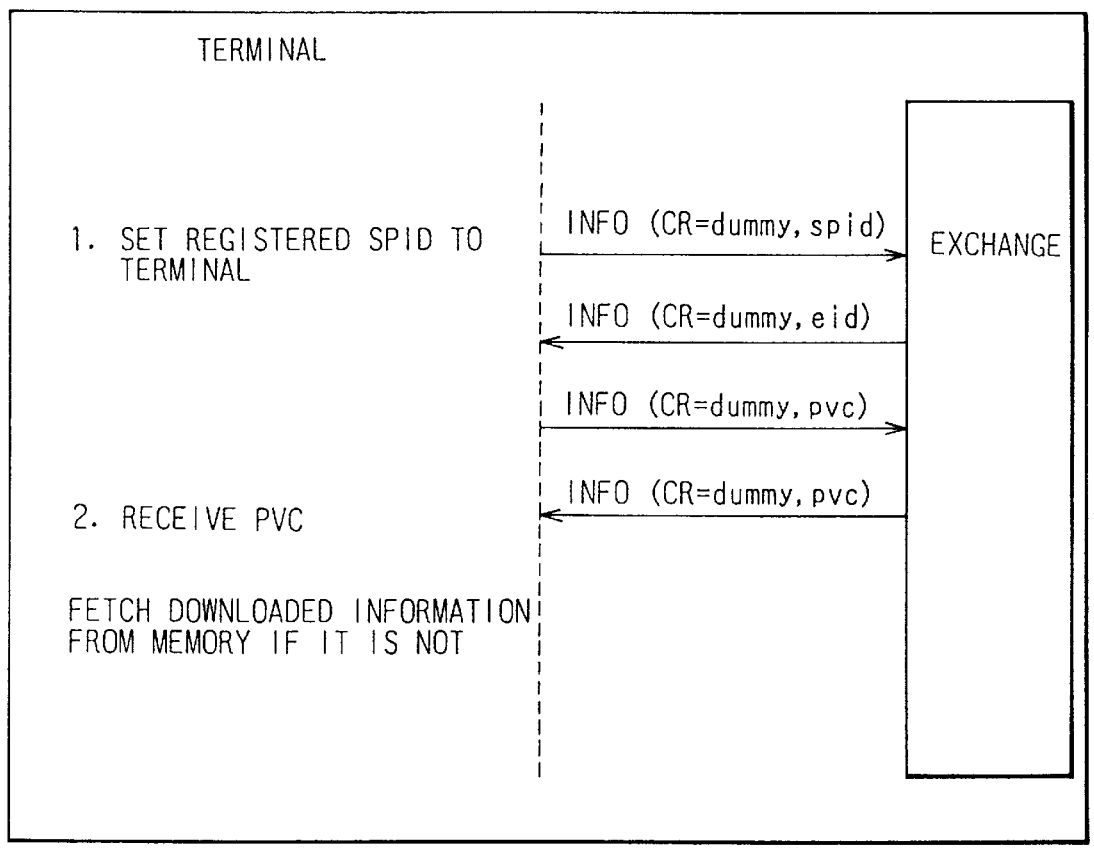
FIG. 9 shows a sequence of restoring a default service profile after the temporary use of a given service profile.

FIG. 9 shows a sequence of restoring a default service profile after the temporary use of a service profile. An information message INFO (CR=dummy, spid) indicates a dummy call number and an SPID, INFO (CR=dummy, eid) indicates the dummy call number and an EID, and INFO (CR=dummy, pvc) indicates the dummy call number and protocol version control.

To switch a temporary service profile to a default service profile, the registered SPID of the default service profile must be set. The information messages are communicated between the terminal apparatus and the exchange (network), and the temporary service profile is switched to the default service profile. No information for the default service profile will be downloaded from the exchange if the memory 4 already has the same.

Figure 10:
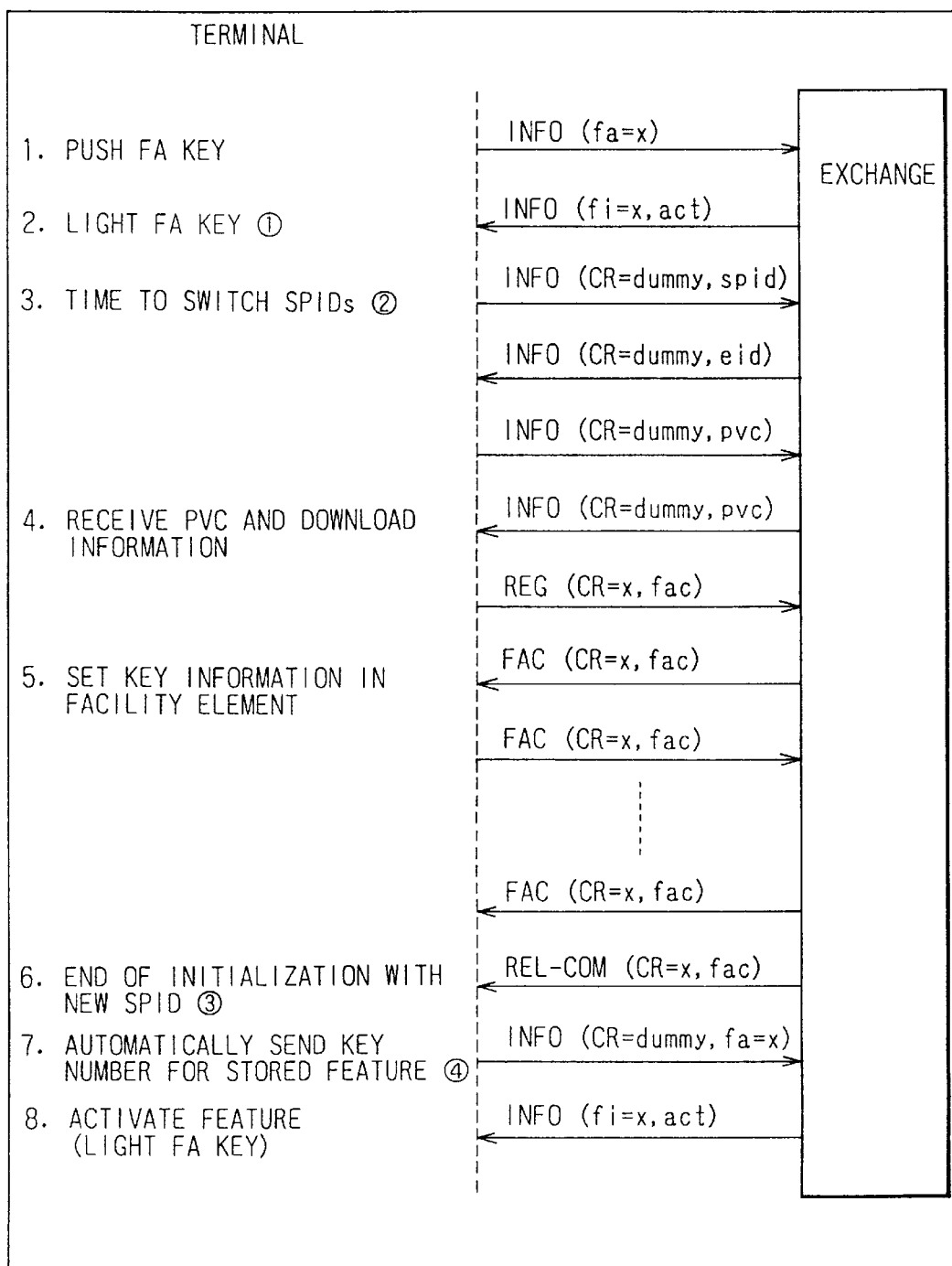
FIG. 10 shows a sequence of automatically activating a feature after the switching of service profiles.
Figure 11:
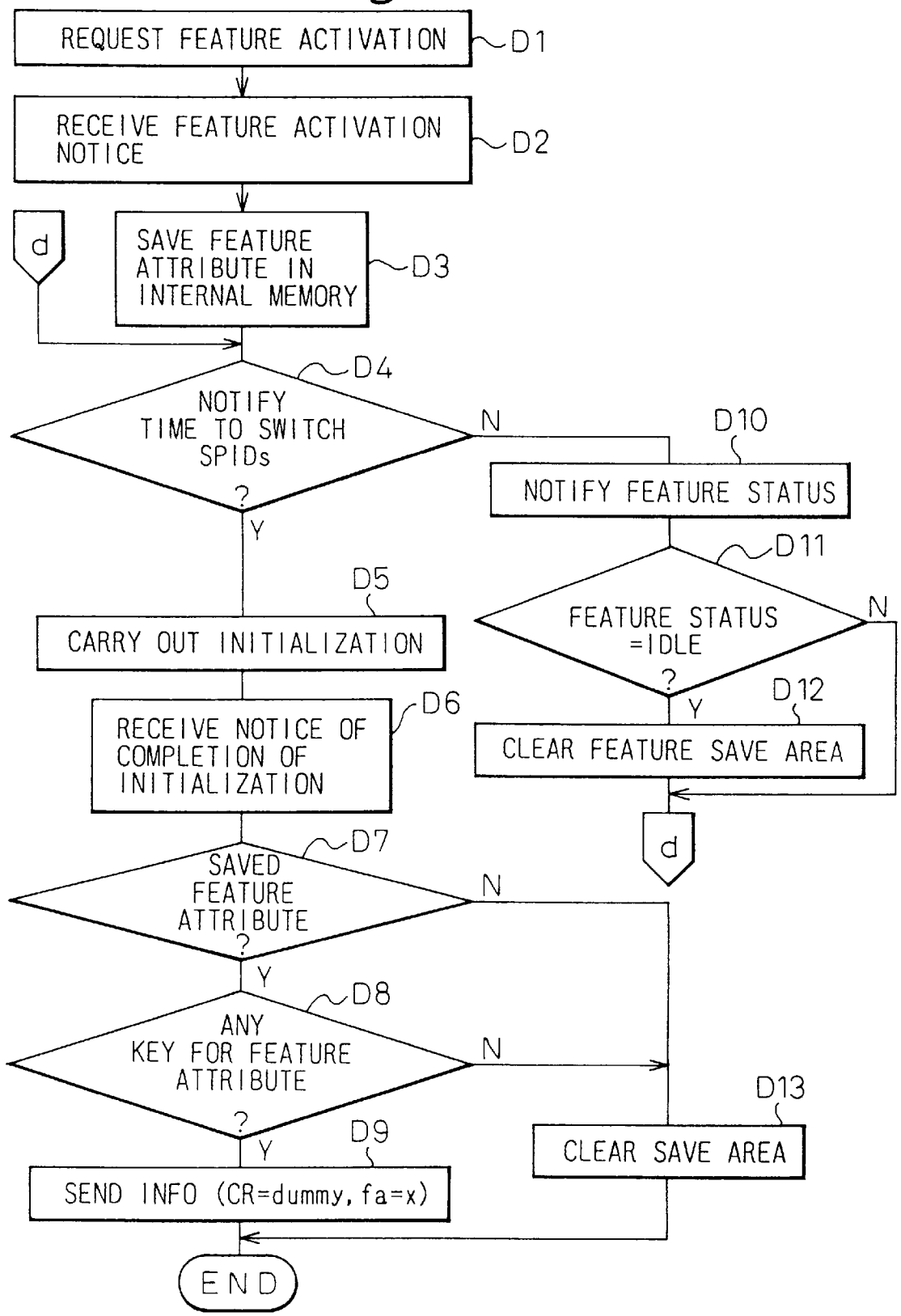
FIG. 11 is a flowchart showing the steps of automatically activating a feature.
Figure 12:
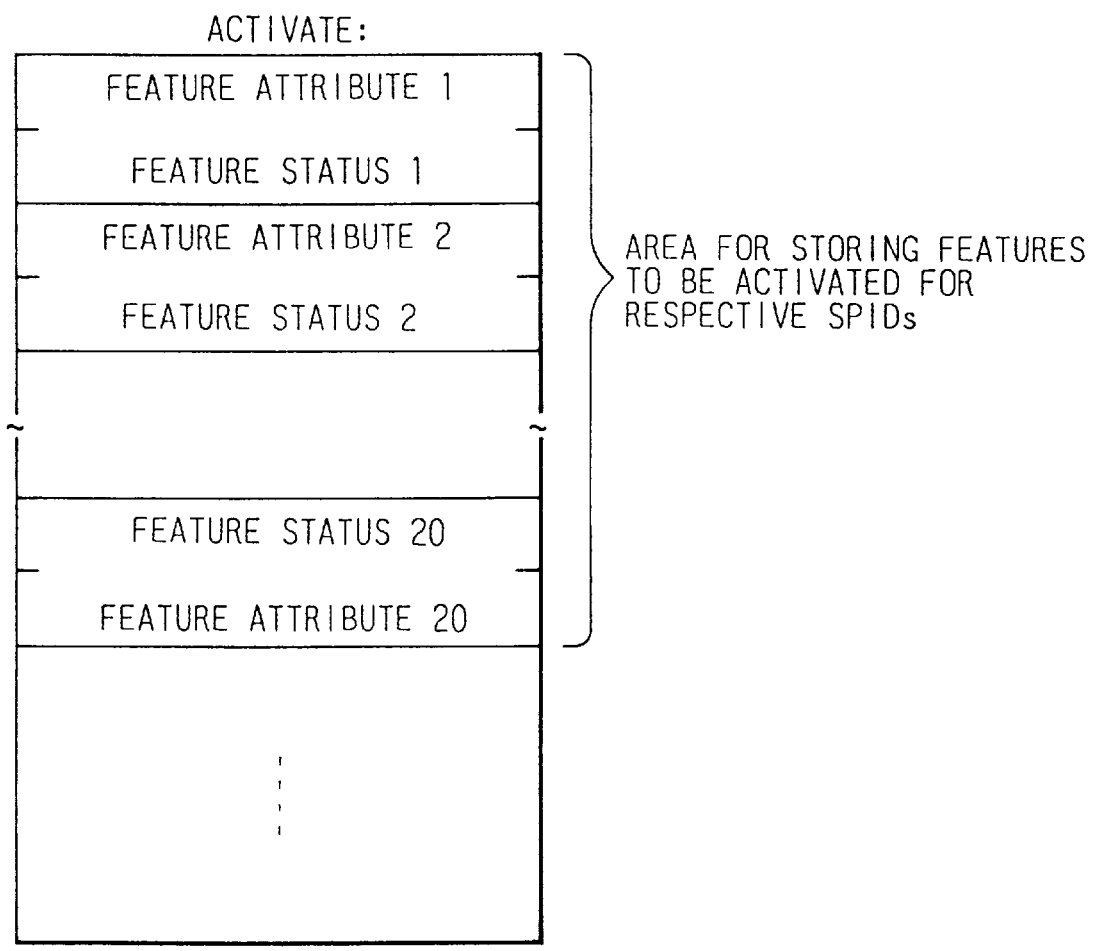
FIG. 12 shows an area for storing feature information.

FIG. 10 shows a sequence of automatically starting a feature after a service profile is switched to another, FIG. 11 is a flowchart showing the steps of automatically starting a feature, and FIG. 12 explains a feature registration area. The feature registration area stores the attributes and states of features 1 to 20. The attribute of a feature indicates, for example, a transfer service and an arrival of a call during a busy state. The state of a feature indicates whether or not the feature is active. The feature registration area is capable of storing the attributes and states of 20 features. The attributes and states of features are registered for respective SPIDs, so that a difference feature is activated according to a chosen SPID.

In step (1) of FIG. 10, a feature activation key is pushed down to send an information message INFO (fa=x), which indicates the activation of a feature x, to the exchange (network). The exchange sends an information message INFO (fi=x, act) indicating the feature to the terminal apparatus.

In step (2), the time of switching the present SPID to another comes. As explained above, the terminal apparatus is reset, and the terminal apparatus sends an information message INFO (CR=dummy, spid) to the exchange (network), to request the exchange to initialize the end point. The exchange allocates a service profile for the SPID and sends an information message INFO (CR=dummy, eid) with an EID to the terminal apparatus. This completes the switching of service profiles.

An information message INFO (CR=dummy, pvc) containing a dummy call number and protocol version control is transferred between the terminal apparatus and the exchange. Upon receiving the protocol version control PVC, the terminal apparatus starts to download information. The terminal apparatus sends a registration message REG (CR=x, fac) containing a call number CR=x and facility to the exchange.

The exchange sends a facility message FAC (CR=x, fac) containing the call number CR=x and facility to the terminal apparatus. According to this message, the terminal apparatus sets key information for a facility element. These steps are repeated until information for a required number of keys is obtained. The exchange sends a release completion message REL-COM (CR=x, fac) to the terminal apparatus. The terminal apparatus receives this message, and the initialization with the new SPID is complete in step (3).

If the feature registration area stores a feature that was active before the switching of service profiles, the terminal apparatus sends and information message INFO (CD=dummy, fa=x) containing a feature activation of fa=x to the exchange. The exchange sends an information message INFO (fi=x, act) containing a feature indication of fi=x to the terminal apparatus. As a result, the feature is activated, and the key FA is lit.

In FIG. 11, step D1 sends a feature activation request. Step D2 receives a feature activation notice. Step D3 saves a feature attribute. Namely, the feature attribute is stored in the feature registration area of FIG. 12. Step D4 determines that the time of switching the present SPID to another has come. Step D5 resets and initializes the terminal apparatus. Step D6 receives a notice of completion of initialization. Step D7 determines whether or not the feature attribute is stored.

If the feature attribute is stored, step D8 determines whether or not there is a key corresponding to the feature attribute. If there is, step D9 sends an information message INFO (CR=dummy, fa=x) as shown in step 7 of FIG. 10. If the feature attribute is not stored, step D13 clears a corresponding save area. If there is no key corresponding to the feature attribute, step D13 clears the save area.

If it is not time to switch the SPID to another, step D10 notifies of a feature status. Step D11 determines whether or not the feature status is idle. If it is idle, step D12 clears a corresponding feature save area. The terminal apparatus automatically informs the exchange of a key number corresponding to the feature that was active before the switching of service profiles and was stored in the feature registration area. This information is made with a feature activation message fa, so that the feature is automatically activated. In this case, it is not necessary to activate a feature whenever a service profile is switched to another.

Figure 13:
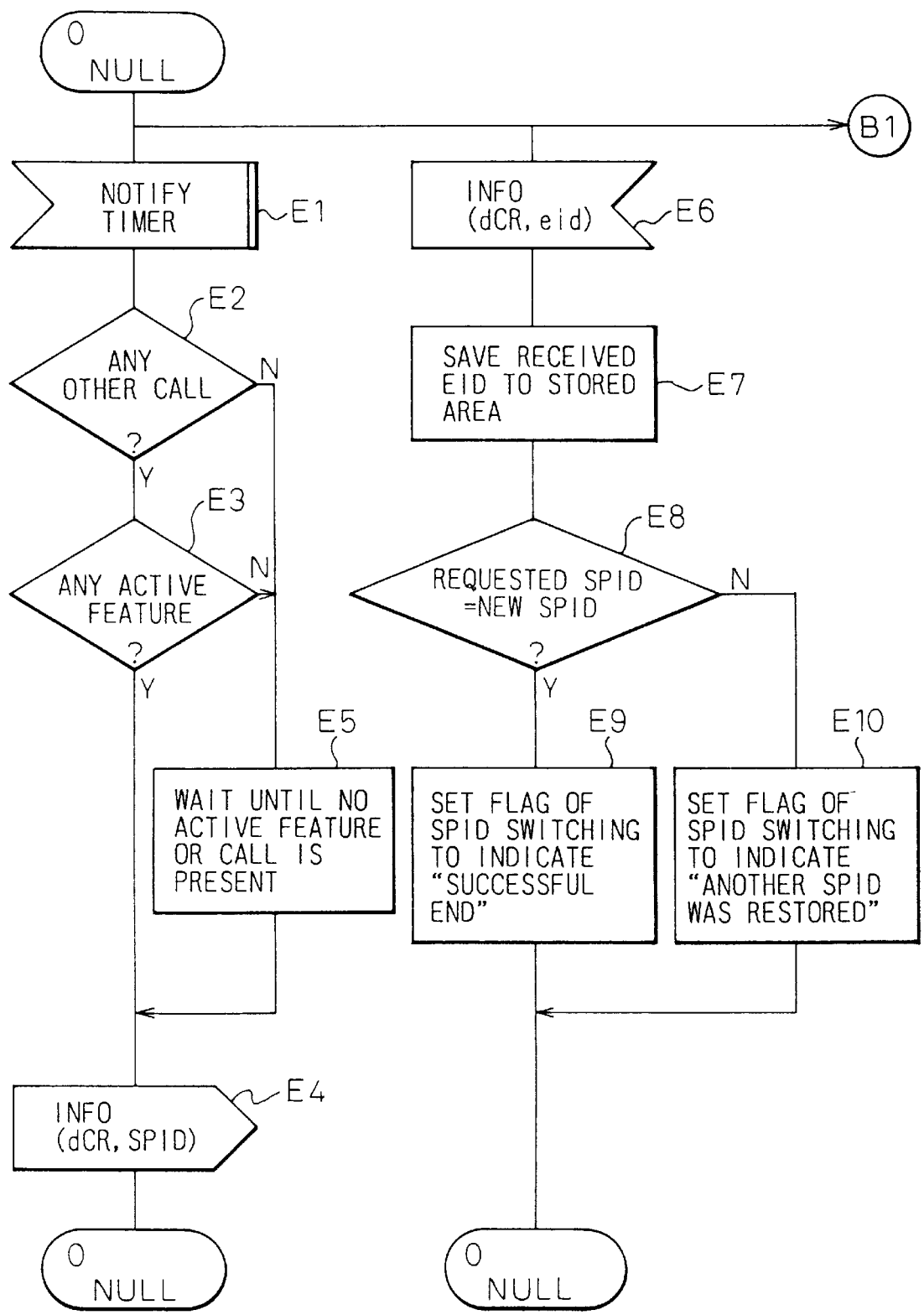
FIG. 13 is a flowchart showing the steps of retrying the switching of SPIDs.
Figure 14:
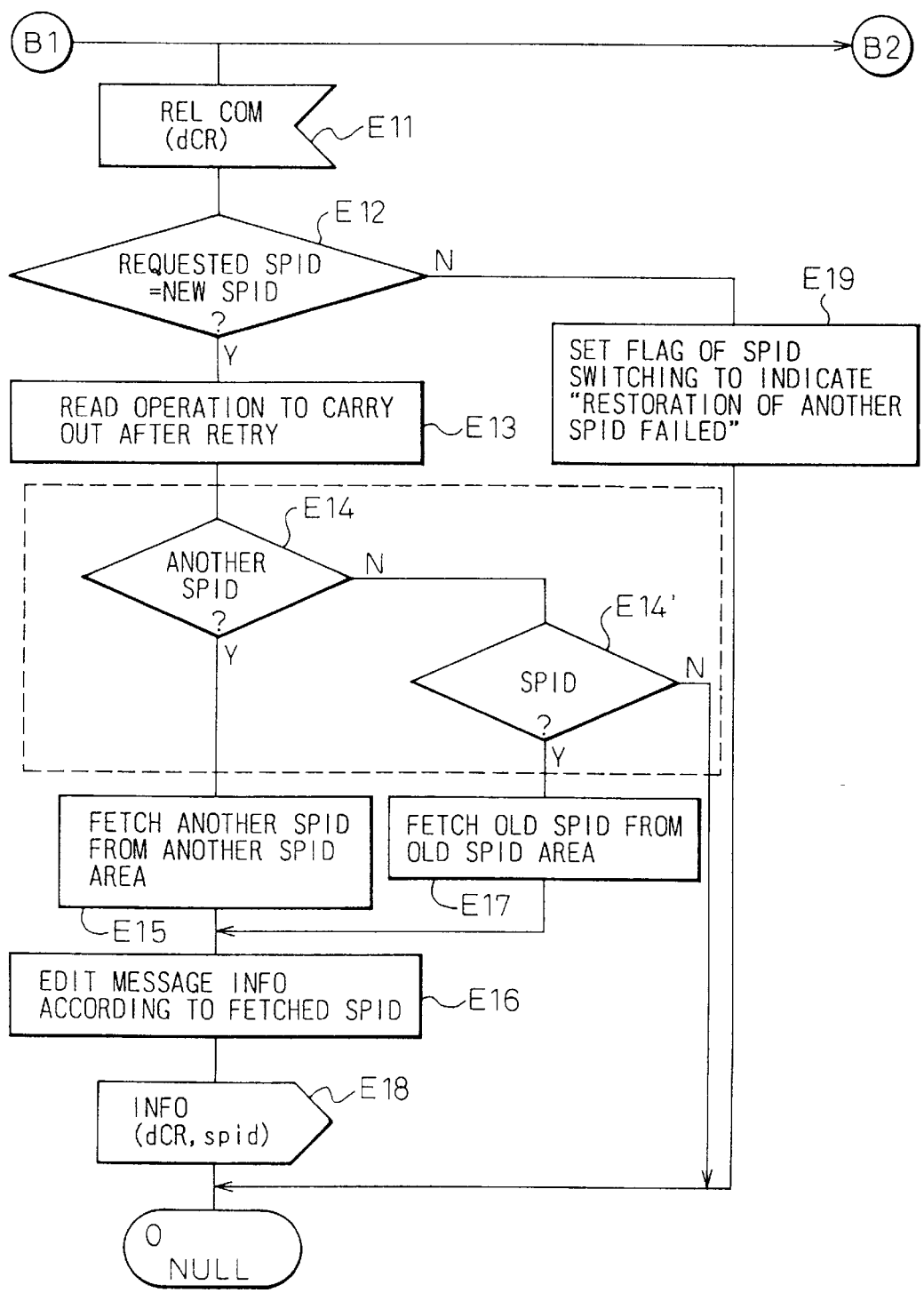
FIG. 14 is a flowchart showing the steps of retrying the switching of SPIDs.

FIGS. 13 and 14 are flowcharts showing the steps of retrying the switching of an SPID to another when a first attempt to switch is unsuccessful. In step E1, the timer notifies that it is time to switch the present service profile to another. Step E2 determines whether or not there is another call. Step E3 determines whether or not there is an active feature that my have trouble if an initialization is carried out. If there is a call or an active feature, step E5 waits until the call disappears or the feature becomes inactive.

If there is no call nor active feature, step E4 sends an information message INFO (dCR, SPID) including a new SPID and a dummy call number dCR to the exchange (network).

In step E6, the exchange sends an information message INFO including the dummy call number dCR and an end point identifier EID. Step E7 stores the EID in the storage area. Step E8 determines whether or not the requested SPID is equal to the received SPID. If they are equal to each other, step E9 sets a resultant flag to indicate that the SPID has correctly been switched to the requested, one. If they are not equal to each other, it is an end point initialization request with another SPID, so that step E10 sets the resultant flag to indicate that another SPID has been restored.

After step E4 sends the information message, step E11 receives a release complete message REL-COM(dCR). Step E12 determines whether or not the requested SPID is equal to the new SPID. When a retry action is carried out with the same SPID, the requested SPID is equal to the new SPID. If a predetermined number of retry actions is over, the preceding SPID or another SPID may be used to make an end point initialization request. In this case, the requested SPID is not equal to the new SPID. Namely, step E12 determines whether it is a failure of end point initialization with the requested SPID, or a failure of end point initialization with another SPID.

If the requested SPID is equal to the new SPID, step E13 reads an operation to be carried out after the retry actions out of the memory 4. Step E14 branches according to the operation. Step E15 fetches an SPID out of another SPID storage area and carries out a retry action. Alternatively step E17 fetches an SPID out of the previous SPID storage area and carries out a retry action. Step E16 edits an information message INFO according to the fetched SPID. Step E18 requests the exchange to initialize the end point according to the information message INFO (dCR, spid).

If the requested SPID is not equal to the new SPID, the resultant flag is set to indicate that another SPID is unable to restore. The user reads the flag to know the result of the switching of service profiles.

Figure 15:
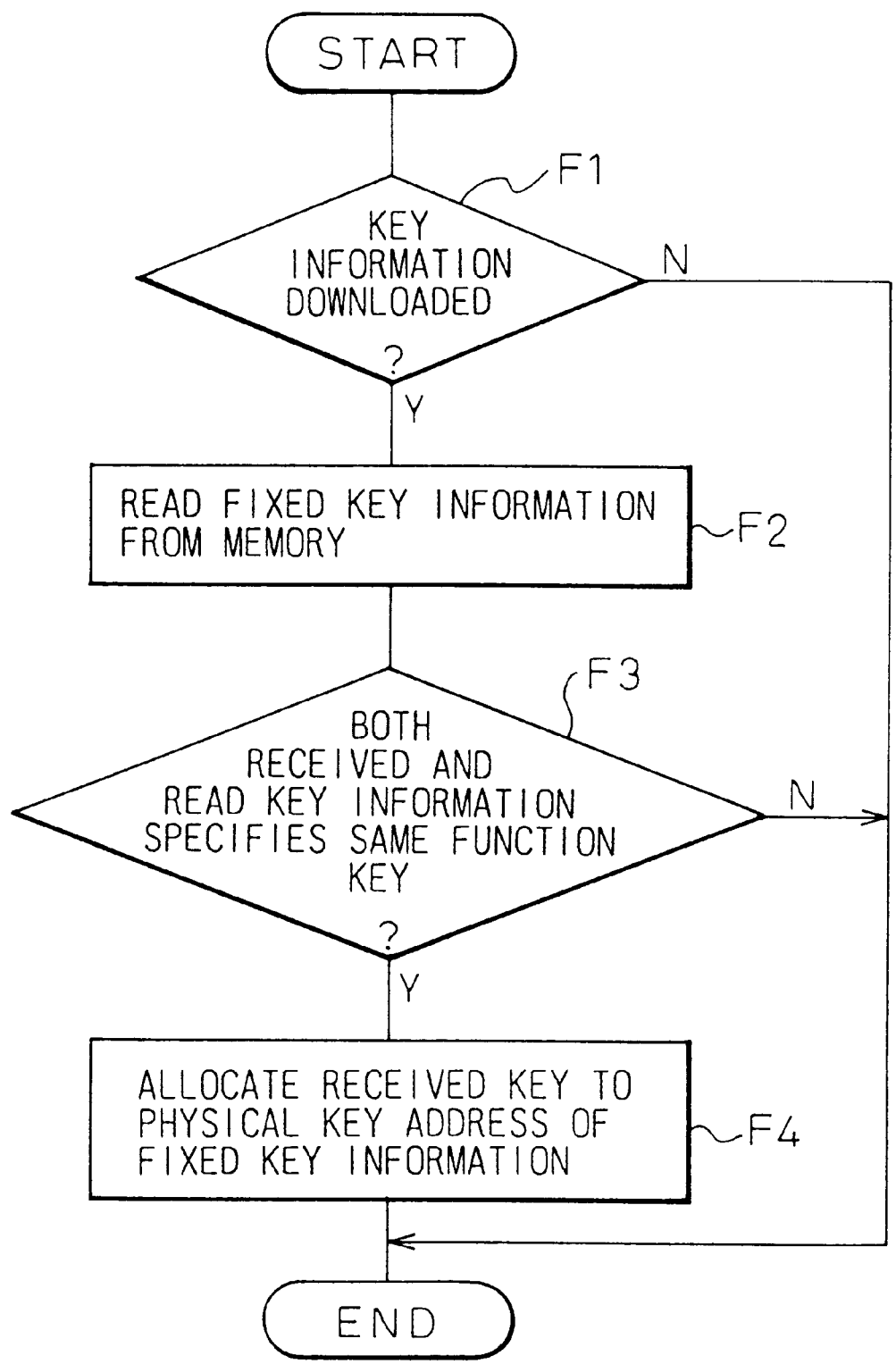
FIG. 15 is a flowchart showing the steps of allocating the same function to a specific key according to downloaded information.

FIG. 15 is a flowchart showing the steps of allocating a fixed function to a specific key when downloading subscriber information. Step F1 determines whether or not downloaded information is key information. If it is key information step F2 reads fixed key information out of the memory 4 (FIG. 4). Step F3 determines whether or not the received key information is identical to the read key information. If they are equal to each other, step F4 allocates the received key information to the physical key address of the fixed key information. Consequently, the same function is allocated to the fixed key. Instead, a function for the fixed key may be arranged according to an SPID.

Figure 16:
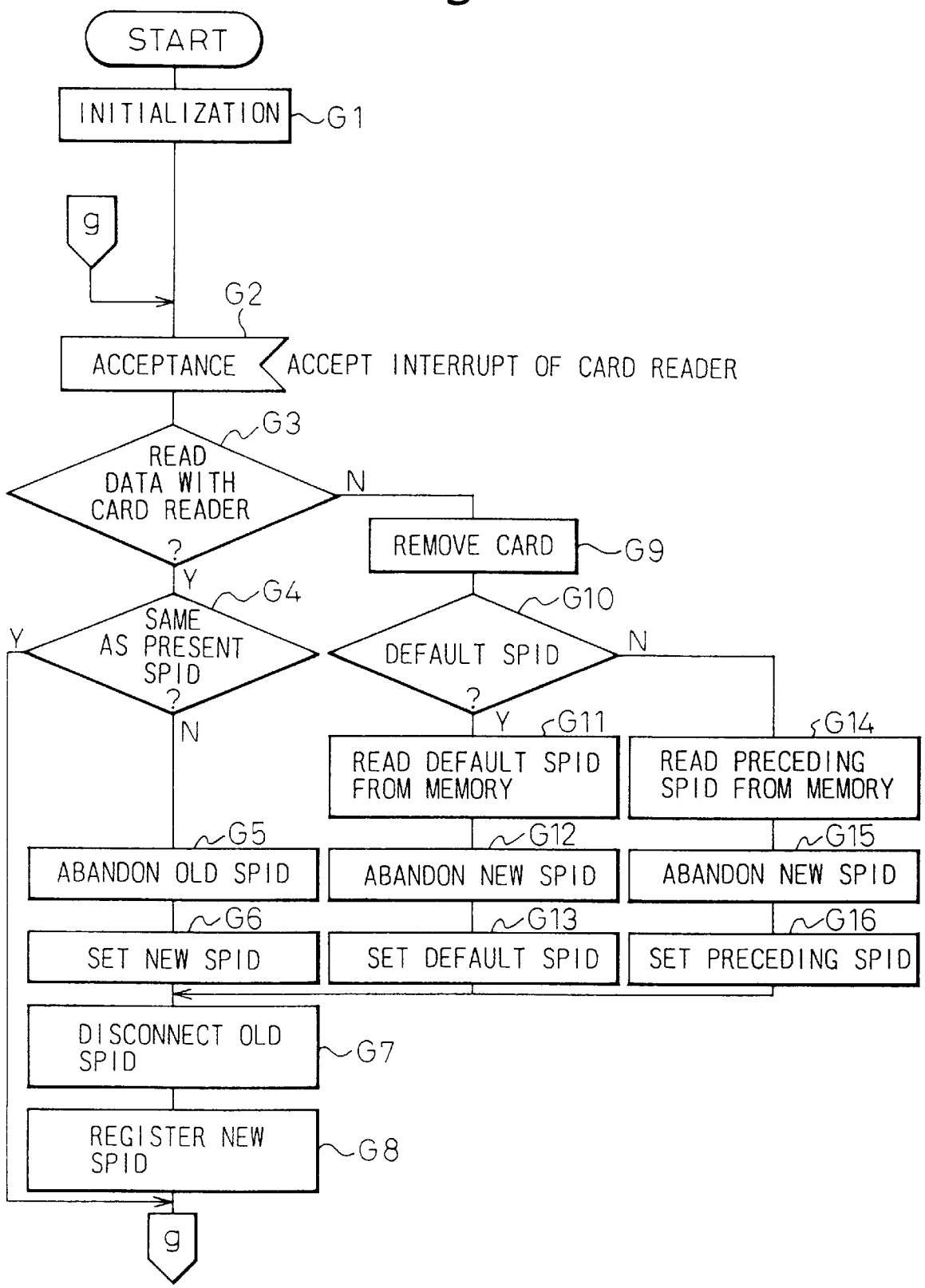
FIG. 16 is a flowchart showing the steps of switching service profiles from one to another with the use of a card reader.

FIG. 16 is a flowchart showing the steps of switching a service profile to another according to a signal from the card reader. Step G1 carries out an initial setting. Step G2 accepts an interrupt from the card reader 7 (FIG. 1). The interrupt is caused when a card is inserted into the card reader 7 (step G3), or when the card is removed from the card reader 7 (step G9). When a card is inserted into the card reader 7 and is read thereby, step G4 determines whether or not an SPID read out of the card is equal to the present SPID. If they are equal to each other, nothing is done. If they differ from each other, step G5 discards the present SPID, and step G6 adopts the read SPID. Step G7 disconnects the old SPID, and step G8 registers the new SPID.

In this case, the present service profile is switched to another according to the data read out of the card. Namely, the end point is initialized according to the SPID read out of the card. If the same SPID is stored in the memory 4, related information stored in the memory 4 is read, and no information is downloaded from the network. If the SPID is not in the memory 4, information related to the SPID is downloaded from the network, and the new SPID and downloaded information are stored in the memory 4.

When the card is removed from the card reader in step G9, step G10 determines whether or not a default SPID must be used. When the default SPID must be used, step G11 reads the default SPID out of the memory 4. Step G12 abandons the SPID set by the card, and step G13 sets the default SPID. If the default SPID must not be used, step G14 reads the preceding SPID out of the memory 4. Step G15 abandons the SPID set by the card, and step G16 registers the preceding SPID. Then, the present service profile is switched to another as mentioned above.

Figure 17A:
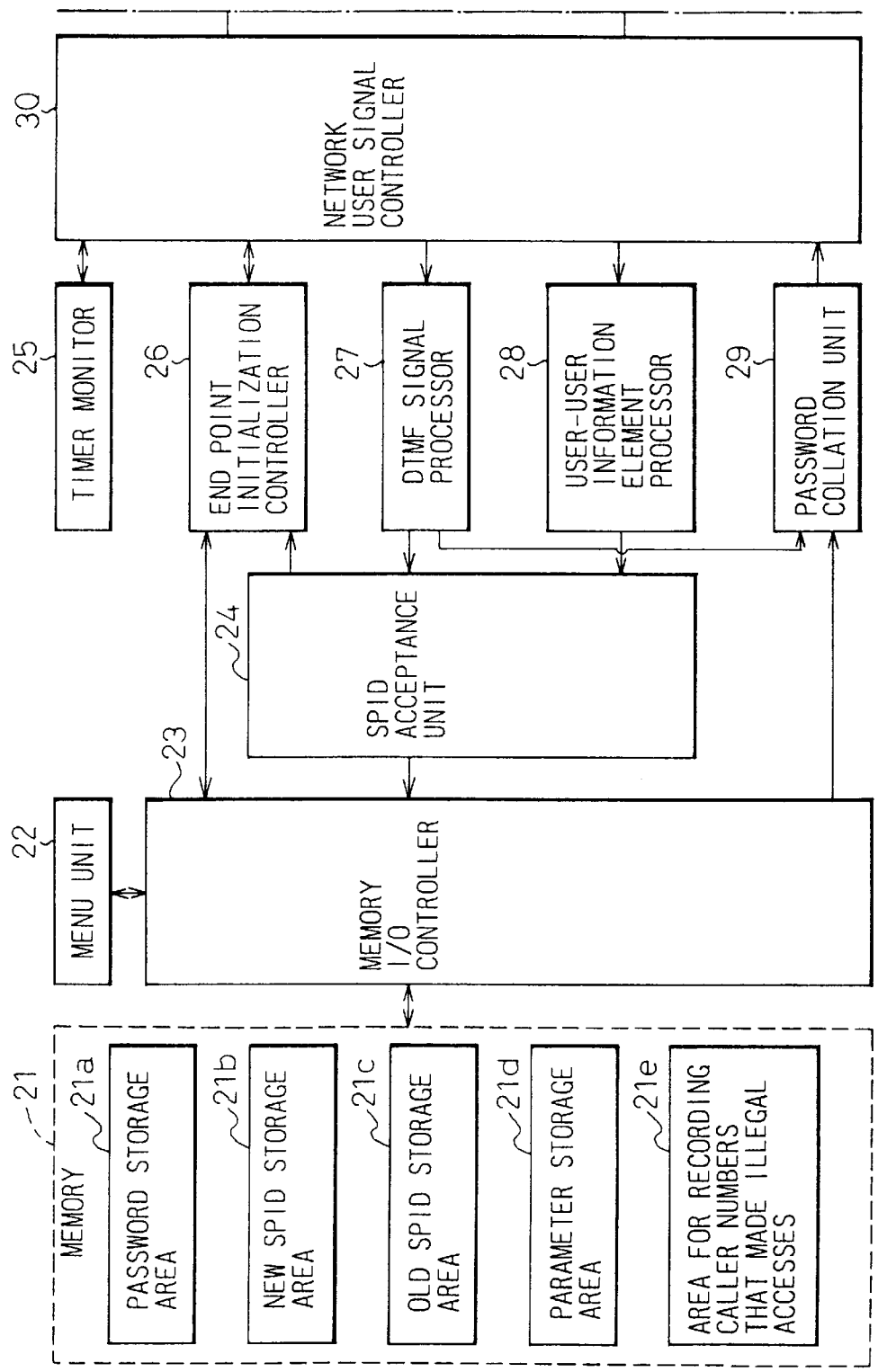
FIGS. 17A and 17B show a remote control system according to an embodiment of the present invention.
Figure 17B:
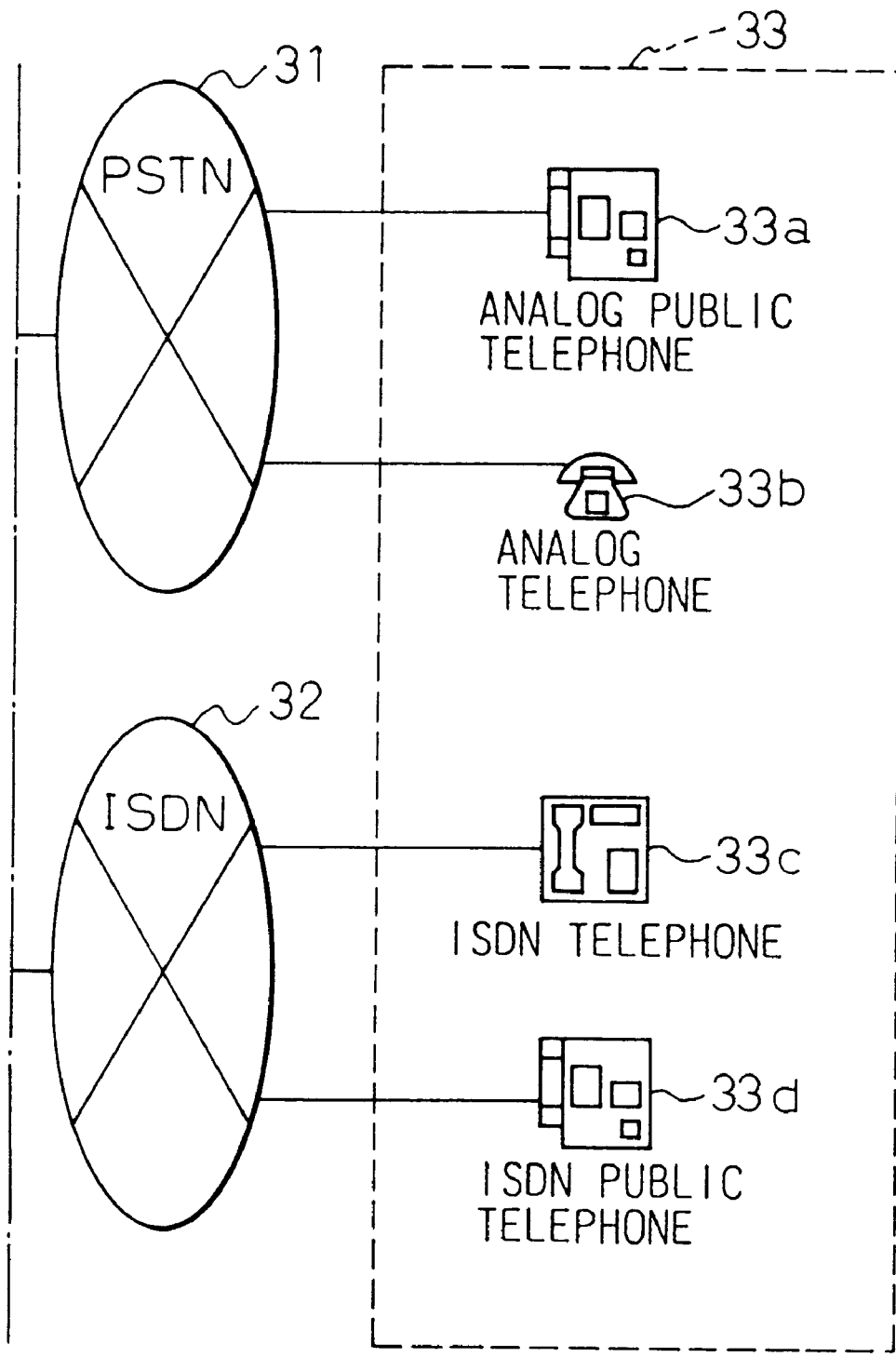

FIGS. 17A and 17B explain a remote control operation according to an embodiment of the present invention. Numeral 21 is a memory, 21a is a password storage area, 21b is a new SPID storage area, 21c is an old SPID storage area, 21d is an area for storing various parameters, 21e is an area for storing illegal access call numbers, 22 is a menu unit, 23 is a memory I/O controller, 24 is an SPID reception unit, 25 is a timer monitor, 26 is an end point initialization controller, 27 is a DTMF signal processor, 28 is a user—user information processor, 29 is a password collation unit, 30 is a network/user signal controller, 31 is a PSTN (analog public service telephone network), 32 is an ISDN, 33 is a remote terminal apparatus, 33a is an analog public telephone, 33b is an analog telephone, 33c is an ISDN telephone, and 33d is an ISDN public telephone.

The memory 21 corresponds to the memory 4 of FIG. 1, the memory I/O controller 23 to the data registration unit 6 of FIG. 1, and the end point initialization controller 26 to the initialization unit 3 of FIG. 1. Compared with the memory 4 of FIG. 1, the memory 21 additionally has the password storage area 21a and the area 21e for storing call numbers that have made illegal accesses. The area 21d stores various parameters such as retry conditions, downloaded information for SPIDs, switching conditions, and fixed key information. Similar to the terminal apparatus of FIG. 1, the terminal apparatus of FIGS. 17A and 17B employs processors to realize various functions, and semiconductor memories and magnetic disk units to realize the memory areas.

The password storage area 21a stores a password that allows the registration of a service profile identifier (SPID) sent from a remote terminal apparatus. The password collation unit 29 collates a received password with the password stored in the area 21a. The area 21e stores a call number that has caused a predetermined number of password mismatches.

The menu unit 22 displays a menu on a display (not shown) when a user registers various parameters and reads the illegal call numbers from the area 21e. The SPID reception unit 24 receives a new SPID and activates the end point initialization controller 26 to control an end point initialization.

The DTMF signal processor 27 receives and processes a password and SPID sent with a DTMF signal from a remote terminal apparatus. The user—user information processor 28 receives and processes a password and SPID of user—user information sent with a call setup message. The network user signal controller 30 has an interface function to connect the terminal apparatus to the PSTN 31 or ISDN 32.

Switching a service profile to another according to a request from the remote terminal apparatus 33 will be explained next. The ISDN telephone 33c or ISDN public telephone 33d connected to the ISDN 32 sends a call setup message SETUP containing user—user information such as a service profile identifier (SPID) and a password to the network. Alternatively, the analog public telephone 33a or analog telephone 33b connected to the PSTN 31 sends, after a path is established, an SPID and a password with a DTMF signal to the network.

The network/user signal controller 30 checks the call setup message SETUP to see whether or not it includes user—user information including a password and SPID. If the message includes the information, the controller 30 extracts and transfers the password to the password collation unit 29 and the SPID to the user—user information processor 28.

IF the message includes no user—user information, the timer monitor 25 is activated to monitor an SPID sent with a DTMF signal. The network user signal controller 30 sends a call connection message CONN to connect a B-channel to establish a path. The analog public telephone 33a or analog telephone 33b sends the DTMF signal containing a password and SPID. The controller 30 receives the DTMF signal and transfers the password to the password collation unit 29 and the SPID to the DTMF signal processor 27.

Alternatively, the user—user information processor 28 discriminates the password and SPID from each other and transfers the password to the password collation unit 29 and the SPID to the SPID reception unit 24. In this case, the DTMF signal processor 27 receives a DTMF signal containing the password and SPID after the establishment of a path and transfers the password to the unit 29 and the SPID to the unit 24.

The password collation unit 29 collates the received password with a password read out of the password storage area 21a. If they disagree with each other, the unit 29 sends a notice of disagreement of password to the remote terminal apparatus through the network user signal controller 30 and cuts the call. If the passwords agree with each other, the SPID reception unit 24 activates the memory I/O controller 23 to store the received SPID in the new SPID storage area 21b. The end point initialization controller 26 is activated to request the network to initialize an end point according to the new SPID.

After the end point is initialized, the SPID in the storage area 21b is copied to the old SPID storage area 21c. If the end point initialization fails, the same operation is retried according to retry conditions. If the end point initialization fails even after a predetermined number of retry actions, the end point initialization is tried with the SPID stored in the old SPID storage area 21c, to restore a service profile corresponding to the old SPID.

When the SPID from the remote terminal apparatus is accepted, it is informed to the remote apparatus. When the present service profile is switched to another after the completion of the end point initialization, it is informed to the remote apparatus. If the switching of service profiles fails, it is informed to the remote apparatus. After the service profile is switched to another according to the request from the remote apparatus, the user of the remote apparatus enters the new SPID to use the corresponding service profile at the remote apparatus. Namely, the user may change the telephone number of the remote terminal to a user's telephone number to start communication.

FIG. 18 explains a remote operation according to an embodiment of the present invention. There are remote telephones such as an ISDN telephone 33c, ISDN public telephone 33d, analog public telephone 33a, and analog telephone 33b. One of these telephones is used to change an SPID in a terminal apparatus 41 connected to an ISDN 34. The ISDN 34 includes exchanges 35 to 38. Numeral 42 is an ISDN telephone, 32 is a terminal apparatus, 44 is a G4-type facsimile (G4 FAX), 45 is a G3-type facsimile (G3 FAX), TA is a terminal adapter, and DSU is a digital service unit.

When the terminal apparatus 41 sends a service profile identifier (SPID) "a" to the exchange 38, the exchange 38 allocates a corresponding service profile "a" to the terminal apparatus 41. When the terminal apparatus 41 sends an SPID "b" to the exchange, the exchange 38 allocates a corresponding service profile "b" to the terminal apparatus 41. One of the telephones 33c, 33d, 33a, and 33b is used to register an SPID to the terminal apparatus 41 as mentioned above. Then the terminal apparatus 41 requests the exchange 38 to initialize an end point according to the SPID, and the exchange 38 allocates a corresponding service profile to the terminal apparatus 41. In this way, a service profile is switched to another from a remote terminal apparatus.

FIG. 19 shows an SPID remote registration network according to an embodiment of the present invention. Numerals 41 to 44 are ISDN telephones, 45 is an analog public telephone, 46 is a private exchange (PBX), 47 is a PSTN, 48 is an ISDN, 49a to 49c are exchanges, UNI is a user network interface, NNI is a network node interface, and DSU is a digital service unit.

The ISDN telephone 41 of a Tokyo head office has a service profile corresponding to a first SPID. At this time, the home ISDN telephone 41 can register a second SPID to the telephone 41, so that the first SPID set in the telephone 41 is changed to the second one. As a result, the user may register the first SPID to the home telephone 42, to use the home telephone 42 with the telephone number and service functions of the telephone 41 provided by the first SPID.

Figure 20B:
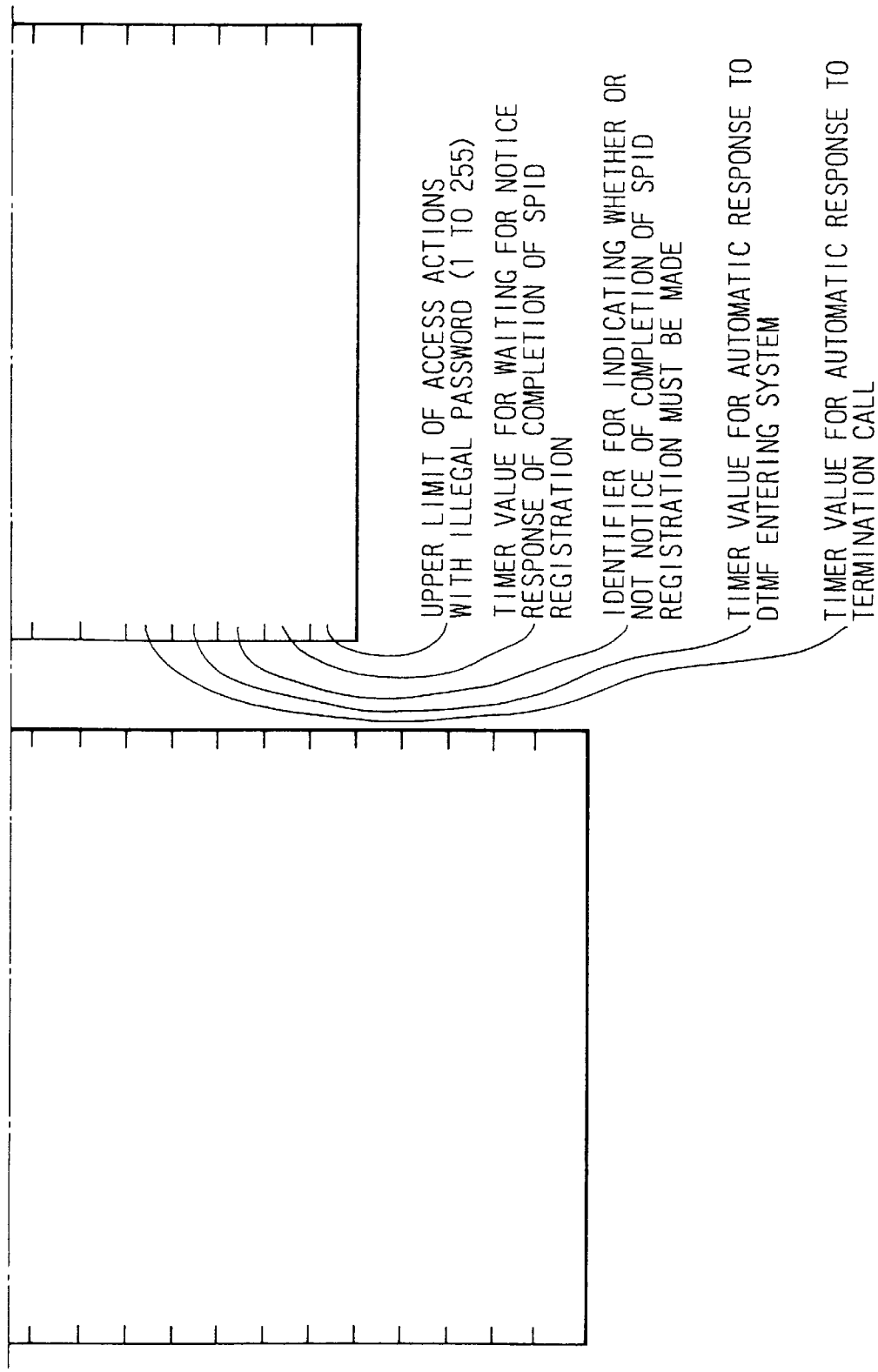

FIGS. 20A and 20B show storage areas of the memory 21 of FIGS. 17A and 17B. Each storage area includes the number of digits of a password, the password itself, the length of an old SPID, the old SPID itself, the length of a new SPID, the new SPID itself, an upper limit of the number of access operations allowed with an incorrect password, a timer value to wait for an SPID registration completion notice acknowledgment, an identifier to indicate whether or not an SPID registration completion notice is required, a timer value to automatically respond to DTMF, and a timer value to automatically respond to an arrived call. The timer monitor 25 monitors time according to the set timer values.

Figure 21:
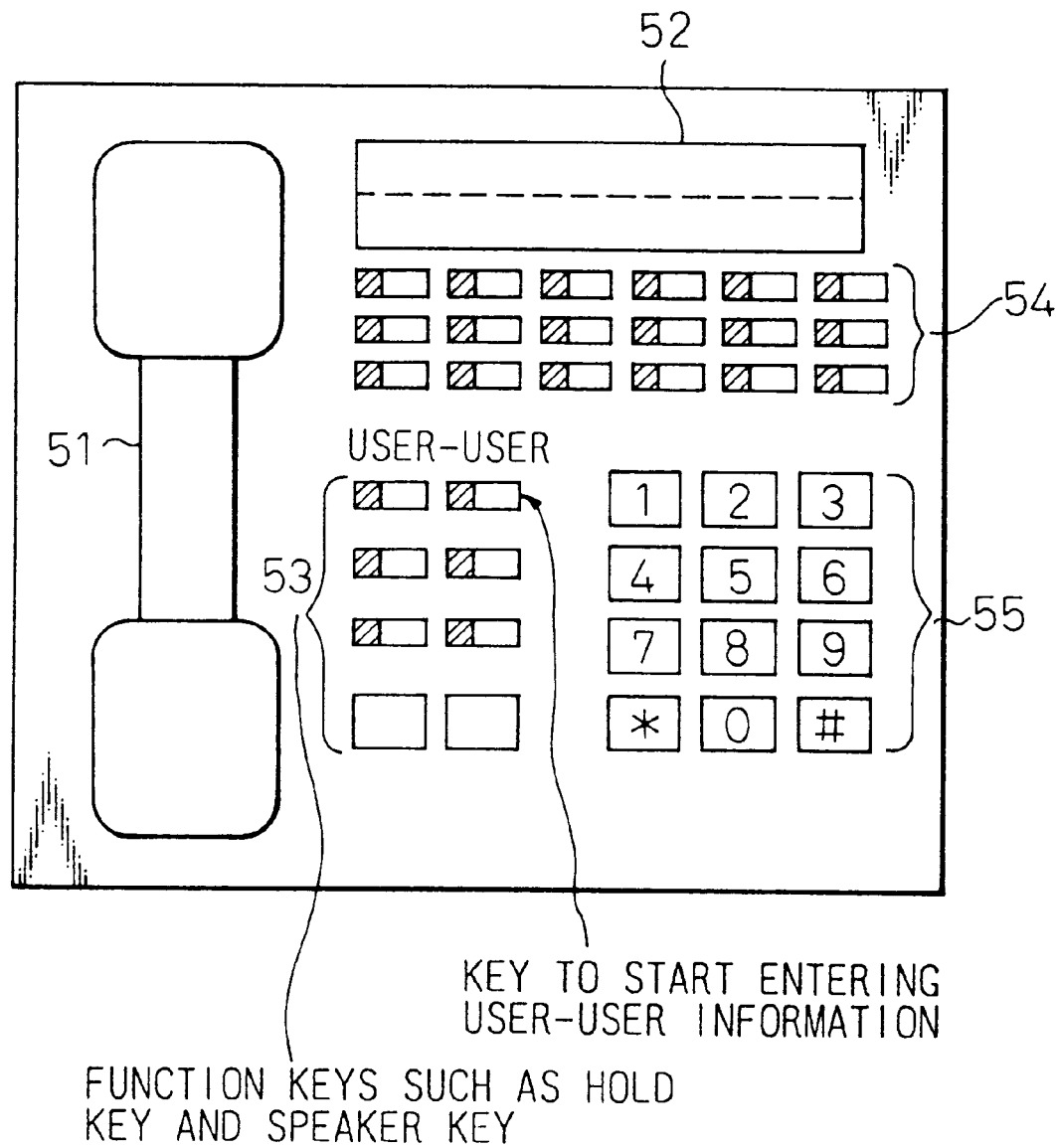
FIG. 21 shows an ISDN telephone for registering an SPID to a remote terminal.

FIG. 21 shows an ISDN telephone serving as a remote telephone for registering an SPID. Numeral 51 is a handset, 52 is a liquid crystal display, 53 is function keys including a user—user information start key and a hold key, 54 is multiple assign keys including a one-touch key, and 55 is dial keys. To enter a password and an SPID, the user pushes the user—user information start key and enters the password and SPID with the dial keys 55.

Figure 22:
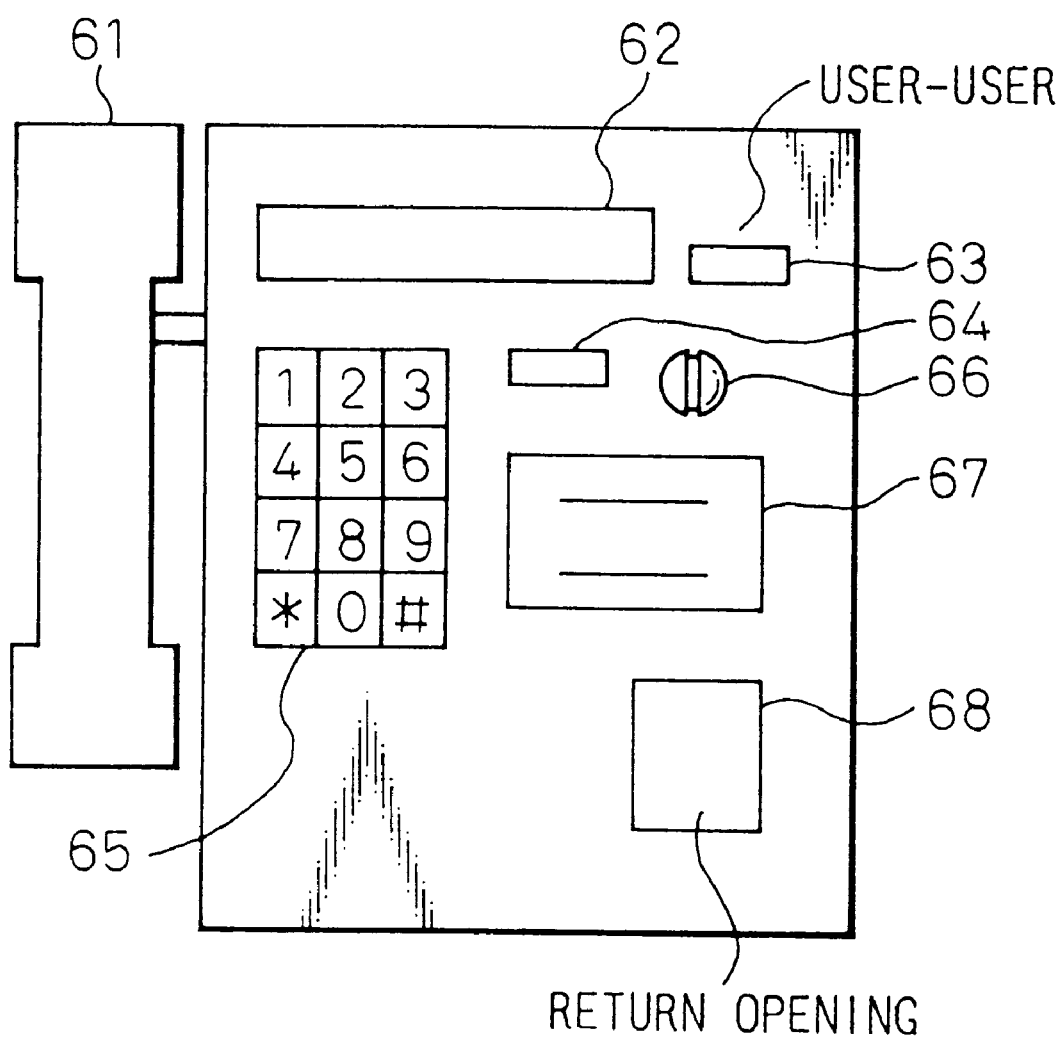
FIG. 22 shows an ISDN public telephone for registering an SPID to a remote terminal.
Figure 23A:
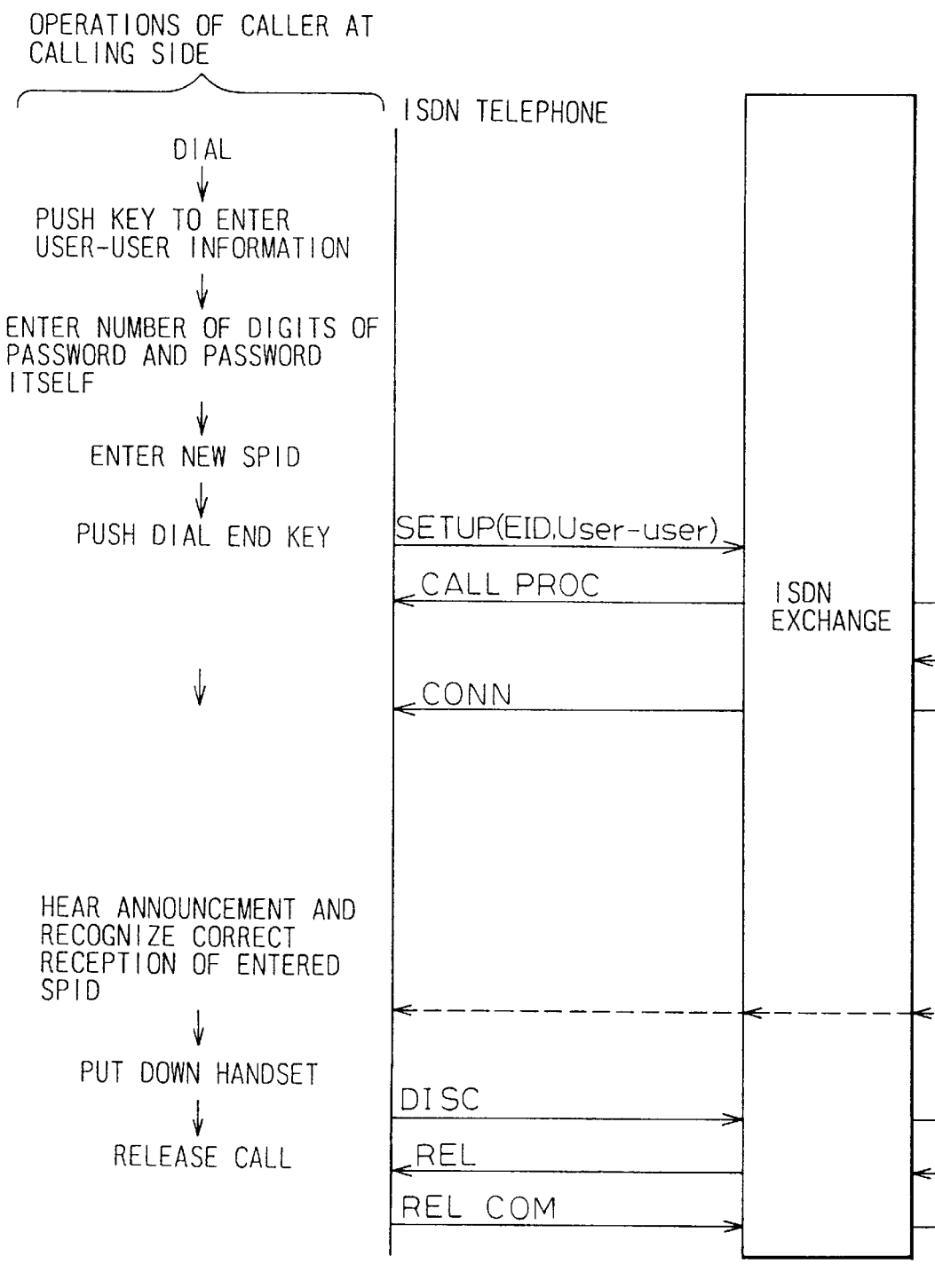
FIGS. 23A and 23B show a sequence of correctly registering and SPID to a remote terminal according to an embodiment of the present invention.
Figure 23B:
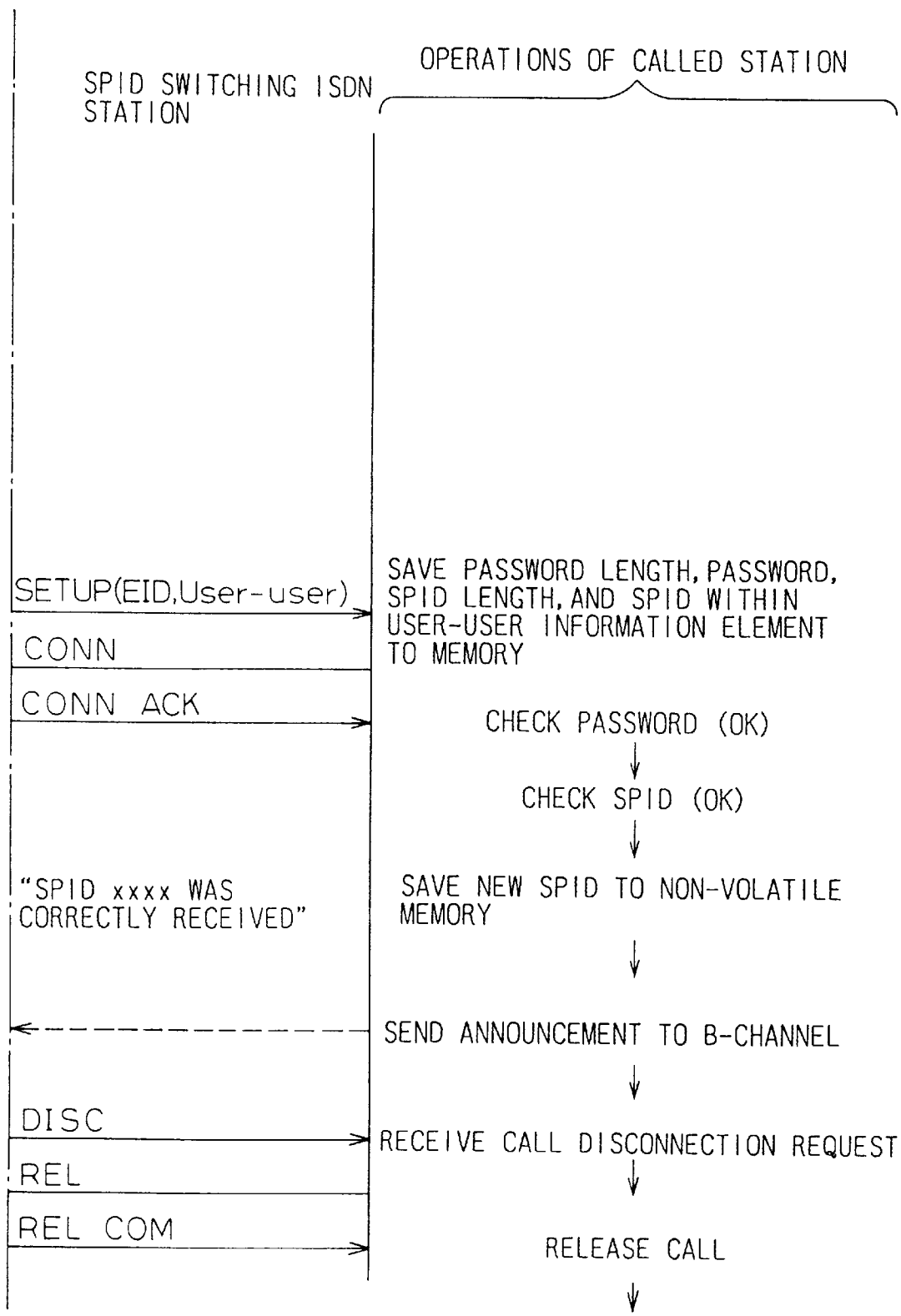

FIG. 22 shows an ISDN public telephone serving as a remote telephone for registering an SPID. Numeral 61 is a handset, 62 is a liquid crystal display, 63 is a user—user information start key, 64 is a dial end key, 65 is dial keys, 66 is a slot for inserting coins, 67 is slots for entering and extracting a telephone card, and 68 is an opening for returning coins. Similar to the preceding case, the user pushes the user—user information start key 63 and enters a password and an SPID with the dial keys 65. In this way, the remote ISDN telephone or public telephone has the user—user information start key or any other key that provides the same function.

FIGS. 23A, 23B, 24A and 24B show sequences of correctly registering an SPID from a remote terminal apparatus according to an embodiment of the present invention. The left side of each figure shows the operations of an ISDN telephone serving as a caller, and the right side thereof shows the operations of an ISDN terminal serving as a receiver. The center of each figure shows an ISDN exchange. The telephone of the caller is, for example, the ISDN telephone of FIG. 21. On the caller side, the handset is lifted, the user—user information start key is pushed down, a password or a new SPID is entered, and the dial end key is pushed down.

As a result, a call setup message SETUP (CPN, User—User) is sent to the ISDN exchange. The message SETUP includes user—user information including a called party number CPN, password, and SPID. In response to the message SETUP, the ISDN exchange sends an acknowledgment CALL-OROC to the caller.

At the same time, the ISDN exchange sends a call setup message SETUP to the receiver. This message includes the user—user information and an end point identifier EID. The receiver stores the password length, password, SPID length, and SPID contained in the user—user information into a memory. The receiver sends an acknowledgment CONN to the ISDN exchange. The ISDN exchange sends an acknowledgment CONN-ACK to the receiver, and at the same time, an acknowledgment CONN to the caller.

If the password and SPID are acceptable, the receiver stores the SPID in the memory and sends an announcement of "the SPID xxxx was correctly received" to a B-channel. On hearing this announcement, the caller recognizes that the SPID was correctly received by the receiver and puts downs the handset. This results in sending a disconnection message DISC to the ISDN exchange.

In response to the message DISC, the ISDN exchange sends a disconnection message DISC to the receiver. The receiver sends a release message REL to the ISDN exchange, which sends a release message to the caller. The caller sends a release completion message REL-COM to the ISDN exchange, which also sends a release completion message to the receiver.

Figure 24A:
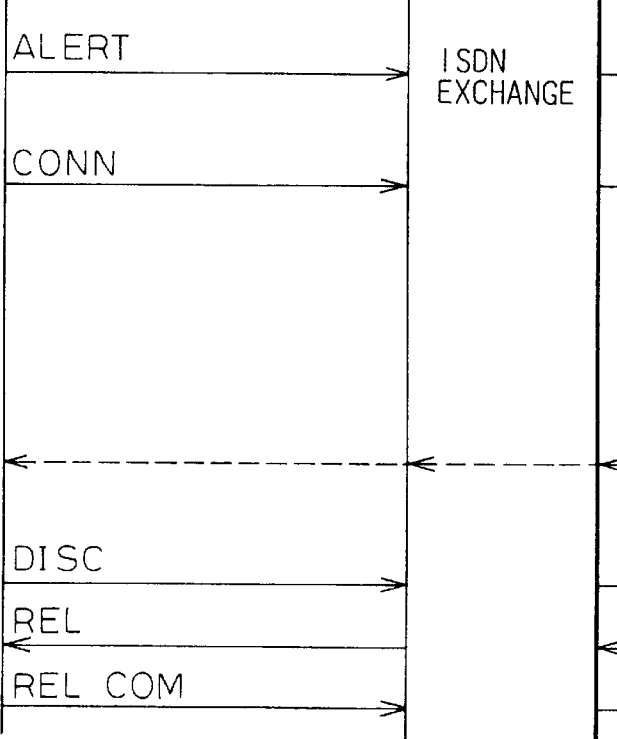
FIGS. 24A and 24B show a continuation of the sequence of FIGS. 23A and 23B.
Figure 24B:
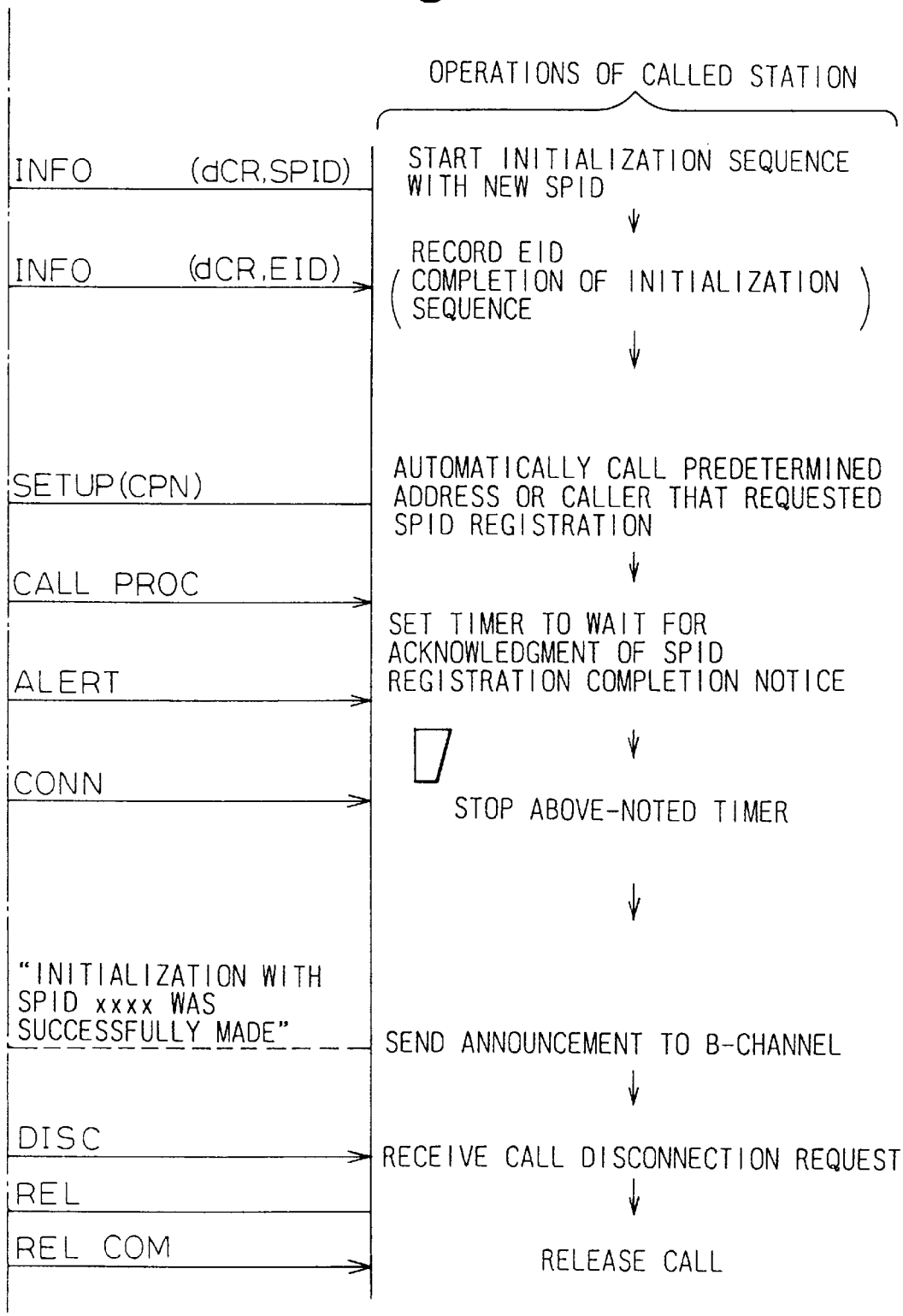

In FIGS. 24A and 24B, the receiver uses the received SPID to start an initialization sequence. The receiver sends an information message INFO (dCR, SPID) including a dummy call number dCR and the SPID to the ISDN exchange. The ISDN exchange allocates a service profile for the SPID, and sends an information message INFO (dCR, EID) including the dummy call number dCR and an end point identifier EID to the receiver.

The receiver stores the EID and completes the initialization sequence. The receiver automatically calls a predetermined address or the address of the remote terminal (caller) that has registered the SPID. Namely, the receiver sends a call setup message SETUP (CPN) including a called party number CPN. The ISDN exchange sends an acceptance message CALL-PROC to the receiver. The ISDN exchange sends a call setup message SETUP (CPN) including the called party number CPN to the caller that has requested the registration of the SPID, and sets the timer to wait for an SPID registration completion notice acknowledgment. For example, this timer is in the timer monitor 25 of FIGS. 17A and 17B.

In response to the message SETUP (CPN), a ringer of the caller operates and sends a ringing message ALERT to the ISDN exchange, which transfers the same to the receiver. The caller lifts the handset and sends an acknowledgment CONN to the ISDN exchange, which transfers the same to the receiver.

Upon receiving the acknowledgment CONN, the receiver stops the timer to wait for the SPID registration completion notice acknowledgment, and through the B-channel, sends an announcement of "initialization with the SPID xxxx was successfully done" to the caller. Upon hearing this announcement, the caller puts down the handset and sends a disconnection message DISC to the ISDN exchange, which also sends a disconnection message DISC to the receiver. A release message REL and a release completion message REL-COM are transmitted among the receiver, ISDN exchange, and caller, to release the call.

Figure 25A:
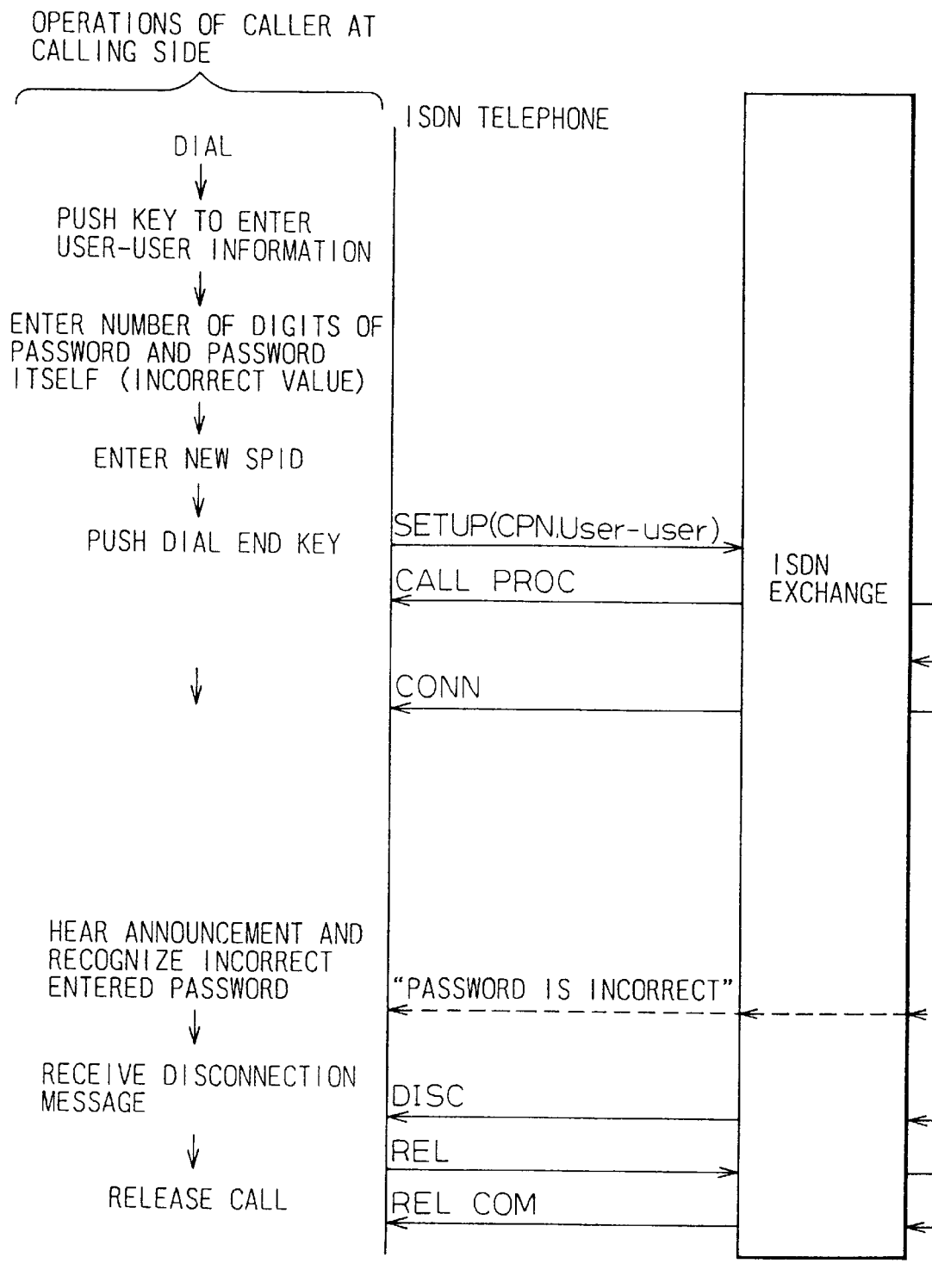
FIGS. 25A and 25B show a sequence of handling an incorrect password according to an embodiment of the present invention.
Figure 25B:
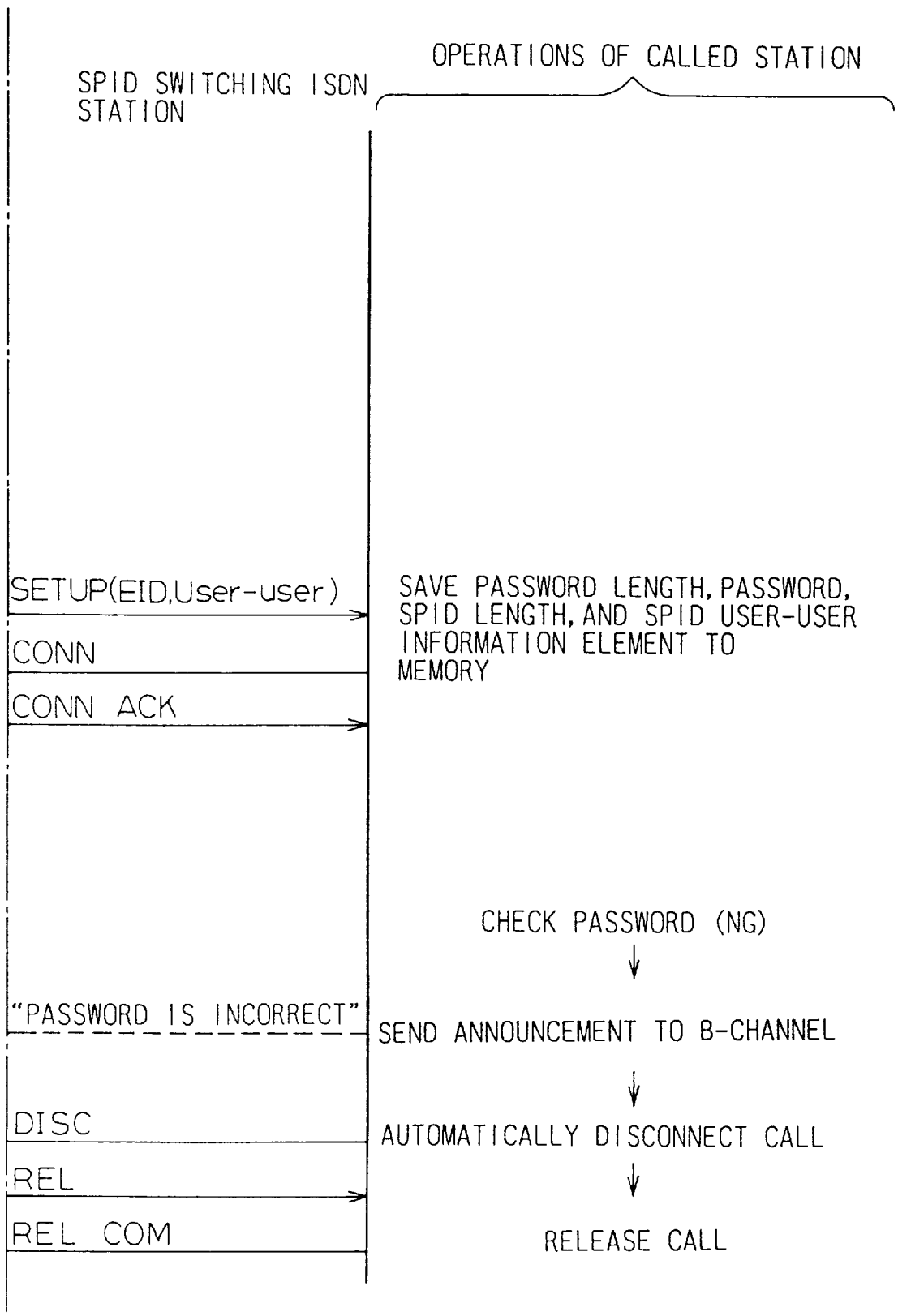
Figure 26A:
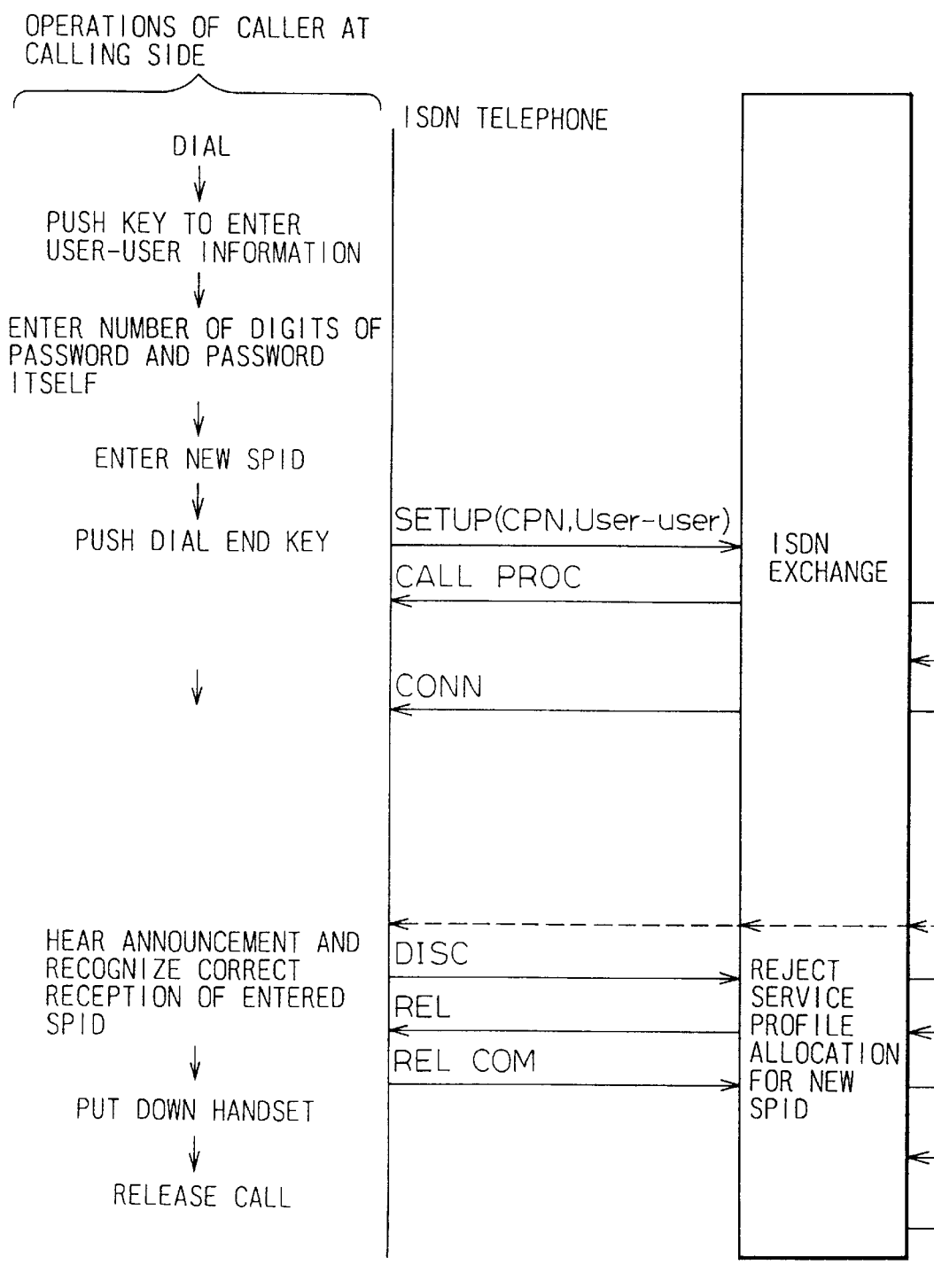
FIGS. 26A and 26B show a sequence of restoring an old SPID according to an embodiment of the present invention.
Figure 26B:
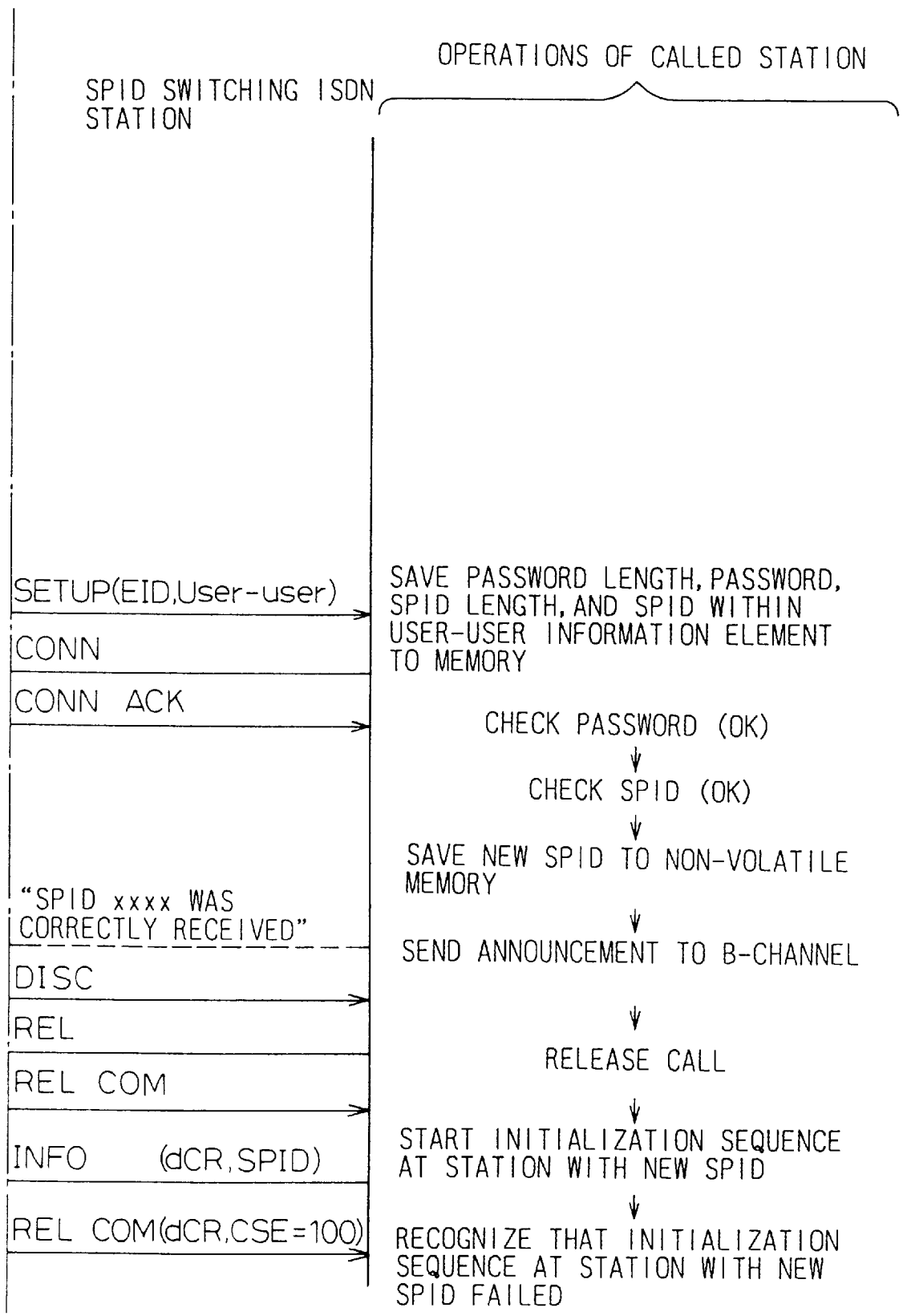
Figure 27A:
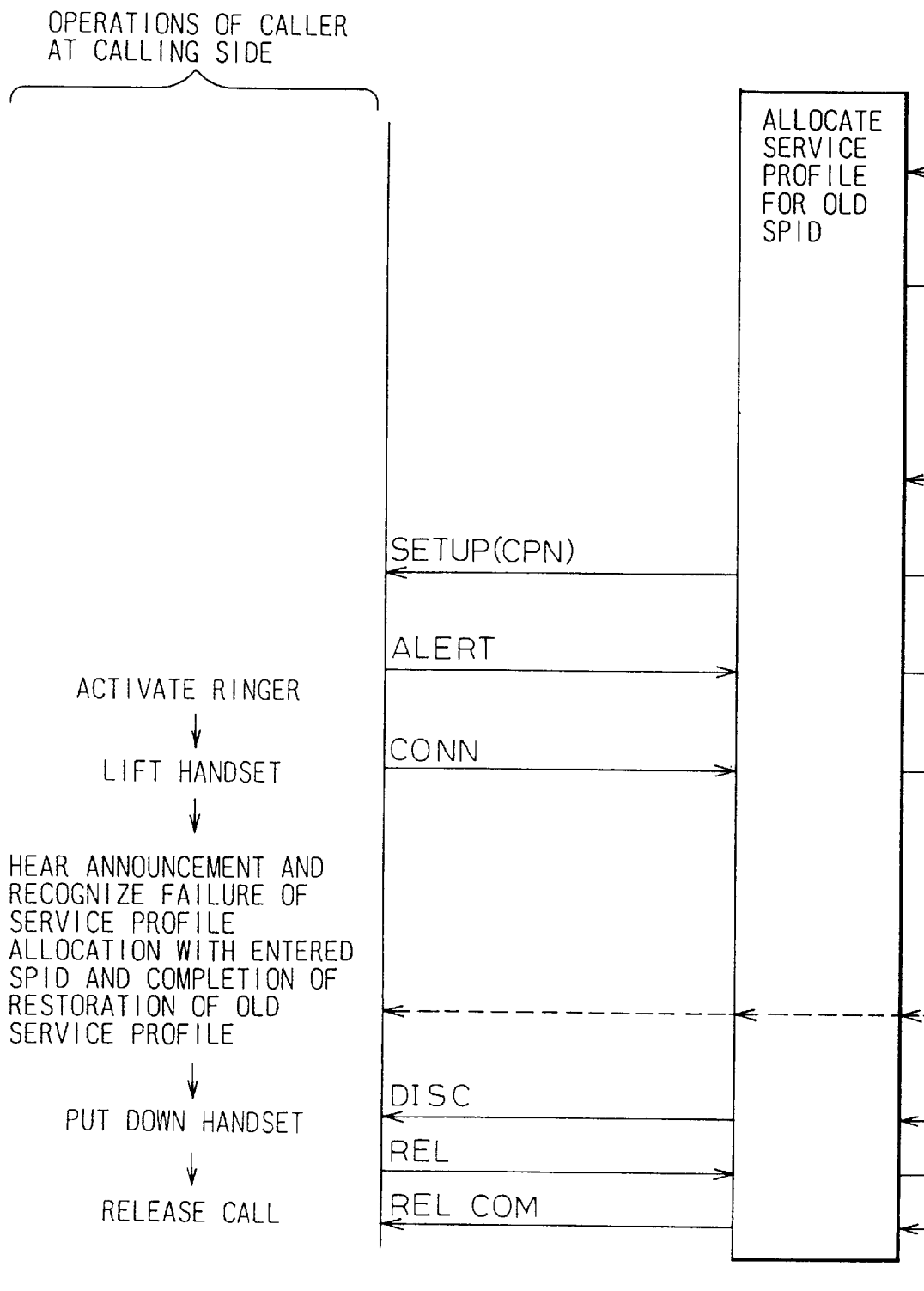
FIGS. 27A and 27B show a continuation of the sequence of FIGS. 26A and 26B.
Figure 27B:
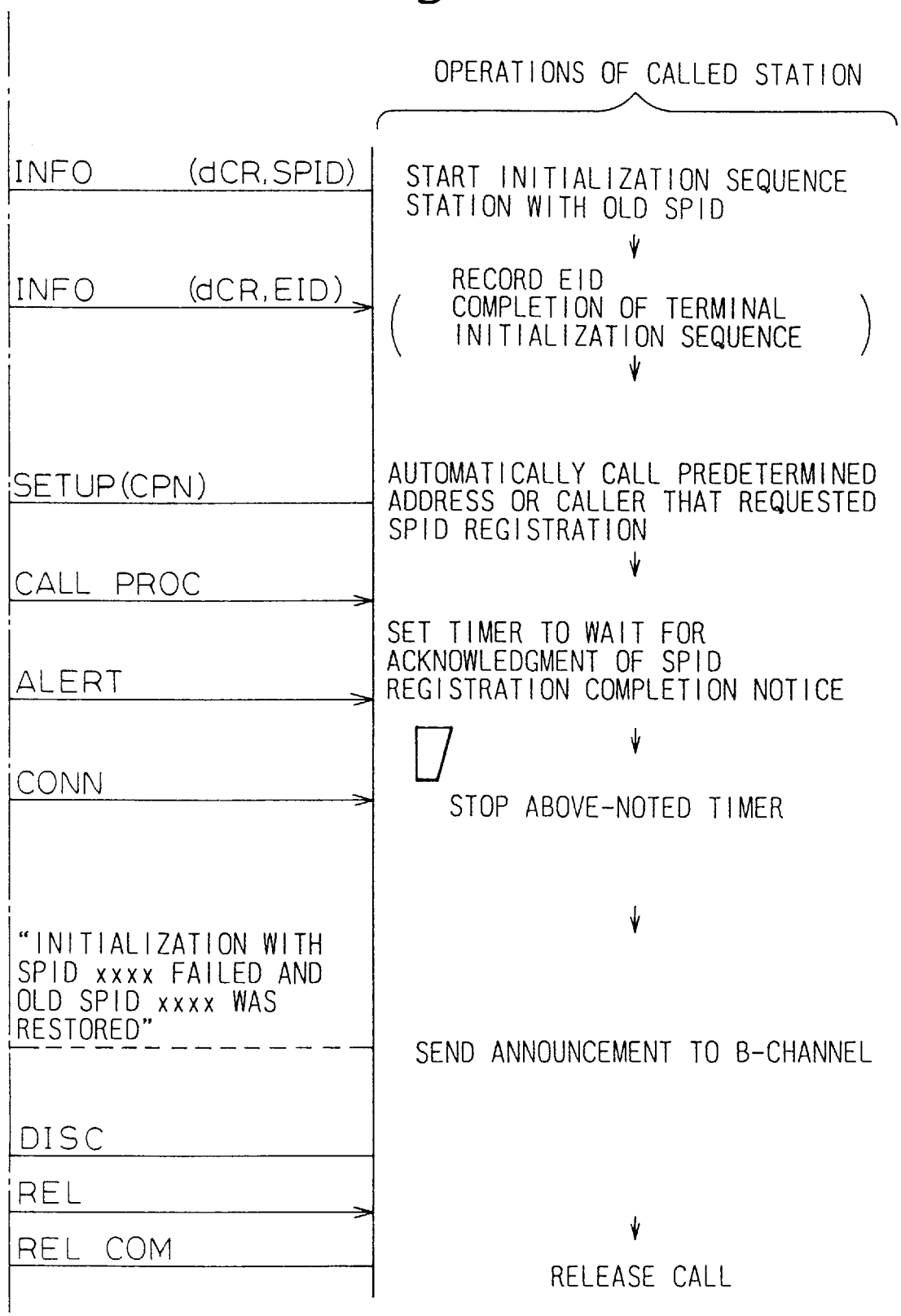
Figure 28A:
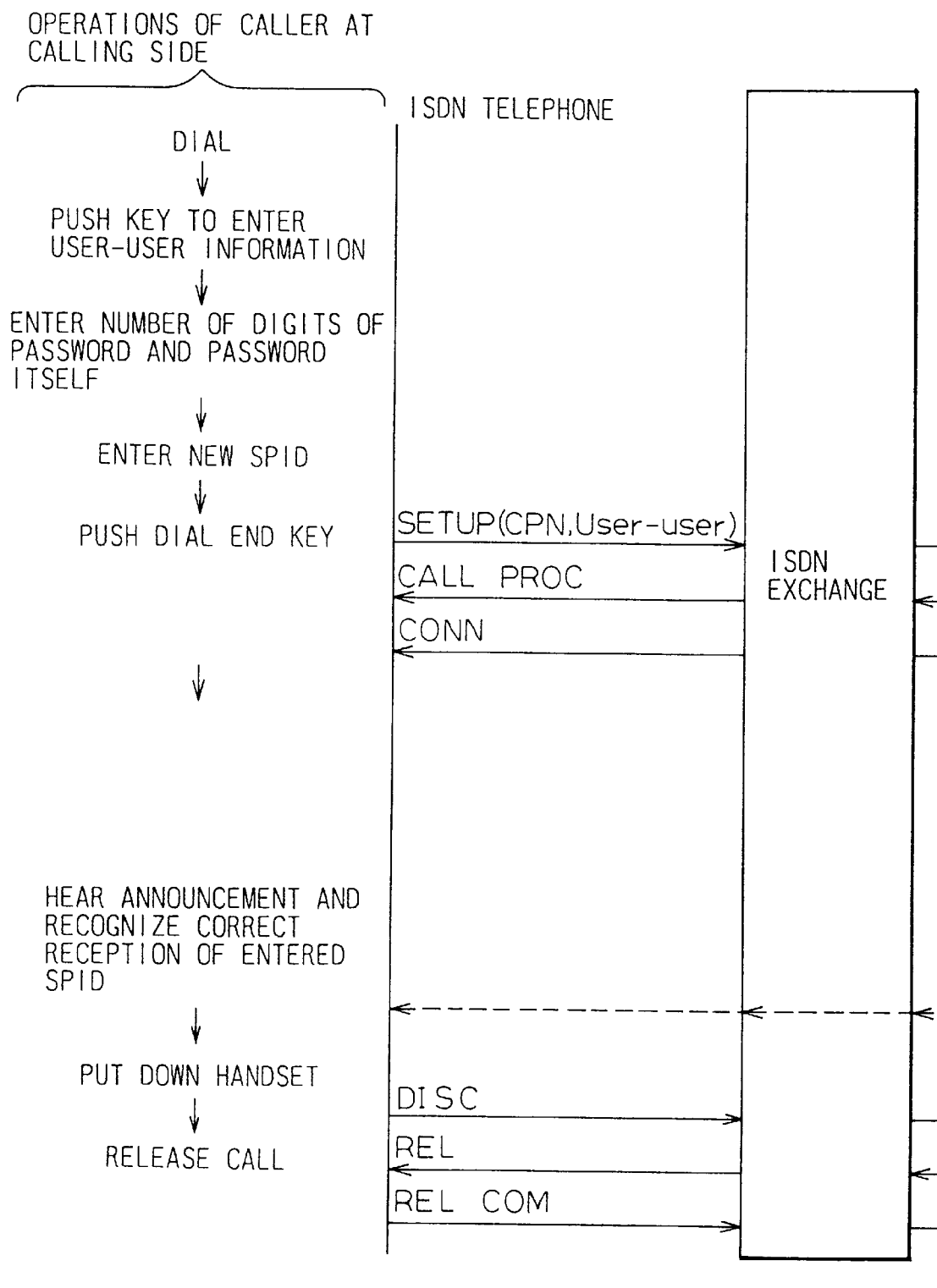
FIGS. 28A and 28B show a sequence of handling a failure of restoring an old SPID according to an embodiment of the present invention.
Figure 28B:
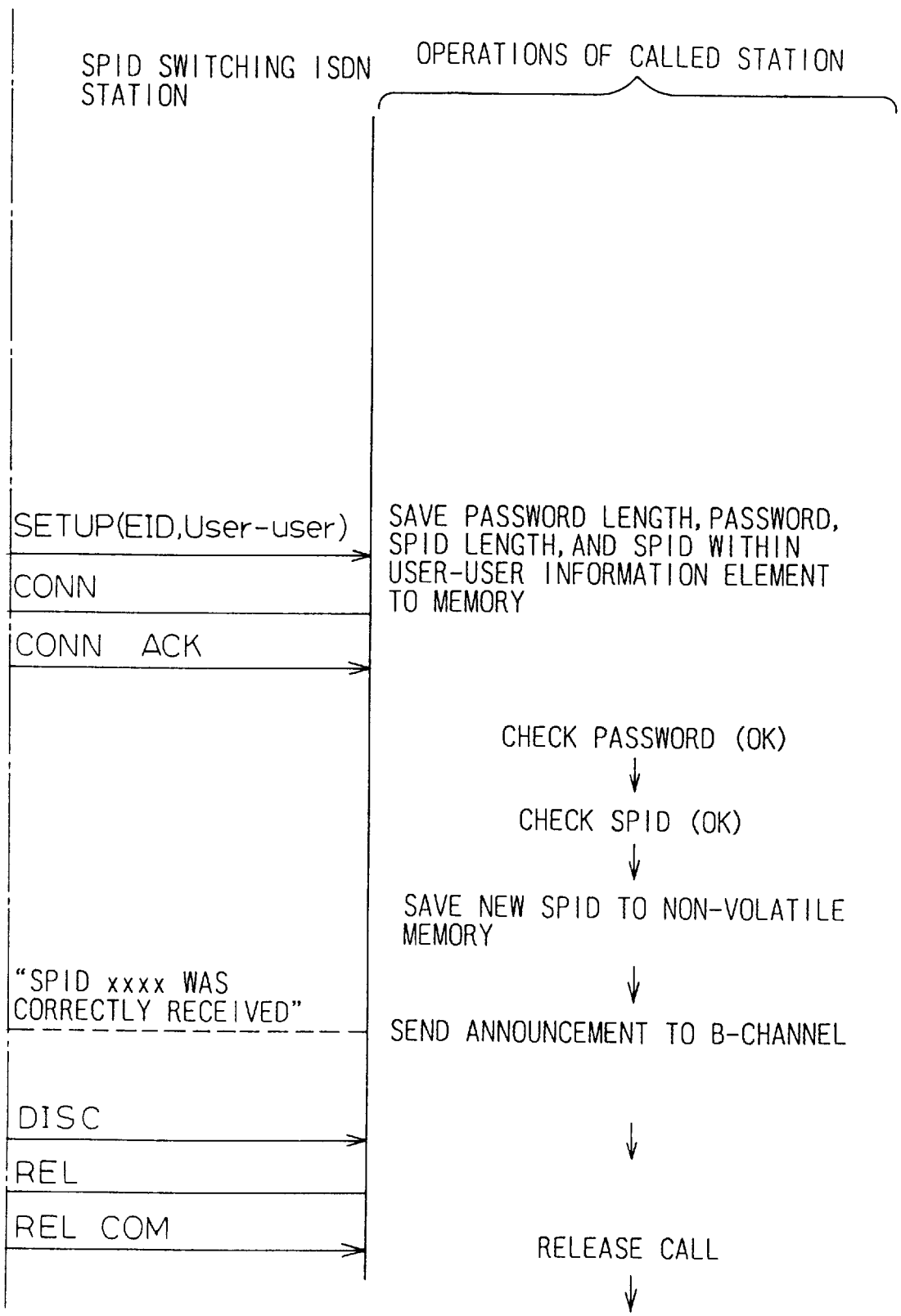
Figure 29A:
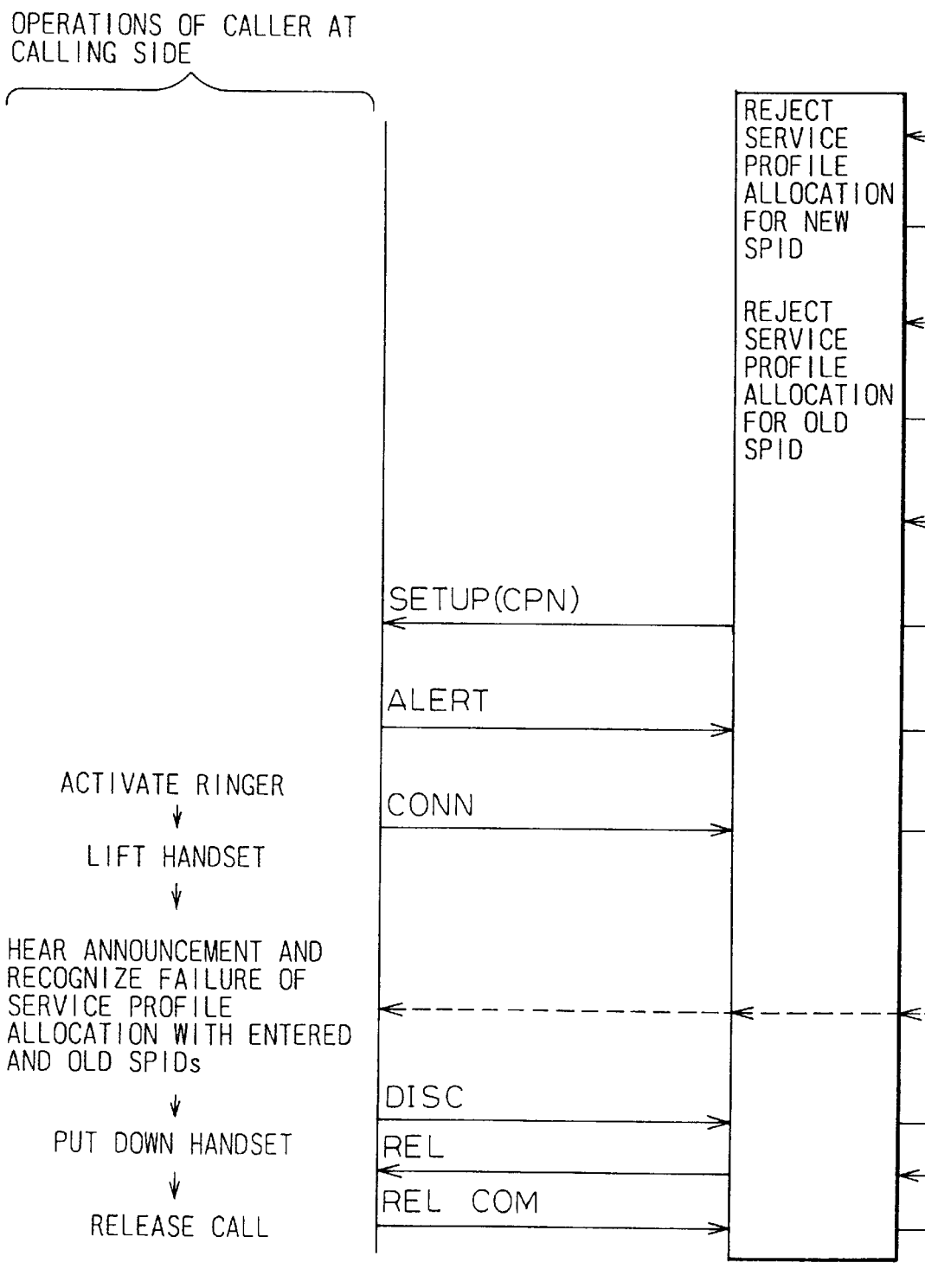
FIGS. 29A and 29B show a continuation of the sequence of FIGS. 28A and 28B.
Figure 29B:
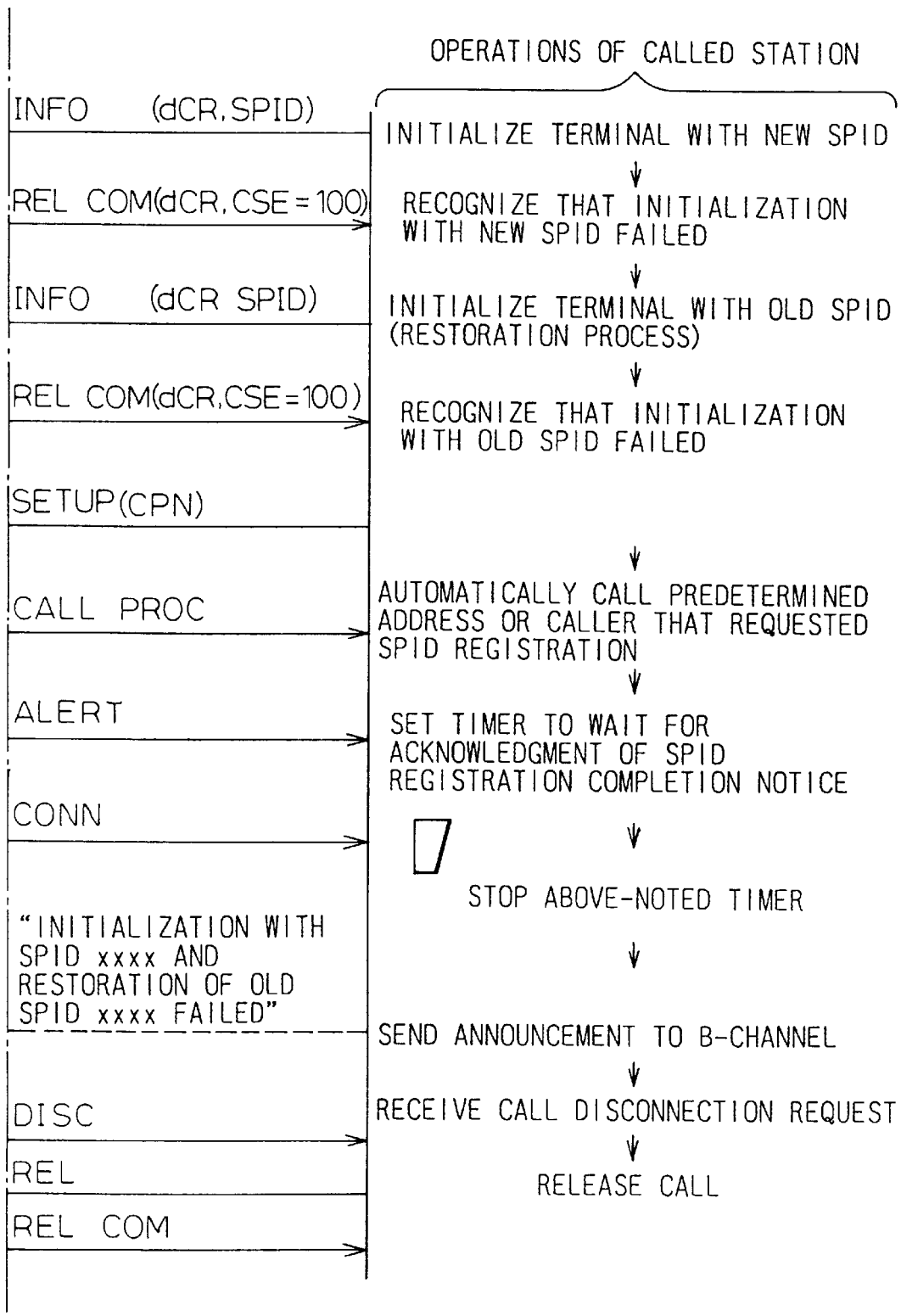

FIGS. 25A and 25B show a sequence of handling an incorrect password according to an embodiment of the present invention. This sequence is the same as the above-mentioned sequence up to checking a password by the receiver. If a received password disagrees with a stored password, the receiver sends an announcement of "the password is incorrect" through the B-channel and automatically cuts the call by sending a disconnection message DISC.

The announcement is transferred to the caller through the ISDN exchange, so that the caller may recognize that the password is incorrect. Upon receiving the disconnection message DISC from the ISDN exchange, the caller sends a release message REL to the ISDN exchange, which also sends a release message REL to the receiver. The receiver sends a release completion message REL-COM to the ISDN exchange, which transfers the same to the caller.

FIGS. 26A, 26B, 27A and 27B show a sequence of restoring an old SPID according to an embodiment of the present invention. A caller sends an SPID registration request. A receiver checks a password and SPID sent by the caller. If they are correct, the call is released, and an initialization is carried out. These are the same as those of FIGS. 23A and 23B. When the receiver starts a terminal initialization sequence with the received SPID and sends an information message INFO (dCR, SPID) to the ISDN exchange, the ISDN exchange rejects allocating a service profile for the SPID due to congestion or any other reason. In this case, the old SPID is restored. To achieve this, the ISDN exchange sends a release completion message REL-COM (dCR, CSE=100) including a dummy call number dCR and a cause display information element CSE to the receiver.

Upon receiving the message, the receiver recognizes that the terminal initialization with the new SPID has failed. Although it is possible to retry the initialization according to retry conditions, this embodiment starts initializing the terminal with the old SPID. Namely, the receiver sends an information message INFO (dCR, SPID) including the dummy call number dCR and the old SPID to the ISDN exchange. The ISDN exchange allocates a service profile for the old SPID and sends an information message INFO (dCR, EID) including the dummy call number dCR and an end point identifier EID to the receiver.

The receiver records the EID and completes the terminal initialization. The receiver automatically calls a predetermined address or the address of the caller that requested the registration of the new SPID. Namely, the receiver sends a call setup message SETUP (CPN) including a called party number CPN to the ISDN exchange, which transfers the message to the caller. At the same time, the ISDN exchange sends a call setup reception message CALL-PROC to the receiver.

When a ringer of the caller starts, the caller sends a calling message ALERT to the ISDN exchange, which transfers the message to the receiver. The receiver sets a timer to wait for an SPID registration completion notice acknowledgment. When the ringer starts, the caller lifts the handset and sends an acknowledgment CONN to the ISDN exchange, which transfers it to the receiver. In response to this, the receiver stops the time to wait for the SPID registration completion notice acknowledgment and sends an announcement of "initialization with the SPID xxxx failed and the service profile for the preceding SPID xxxx was restored." Thereafter, the receiver sends a disconnection message DISC.

Upon hearing the announcement, the caller recognizes that the old SPID was restored and puts down the handset. The caller sends a release message REL to the ISDN exchange, which sends the same message to the receiver. The receiver sends a release completion message REL-COM to the ISDN exchange, which sends the same to the caller. As a result, the call is released. In this way, an old SPID is restored after a failure of the remote registration of a new SPID, and the result is informed to the caller.

FIGS. 28A, 28B, 29A and 29B show a sequence to be carried out when a restoration of an old SPID fails, according to an embodiment of the present invention. When a terminal initialization with a new SPID fails, a terminal initialization with an old SPID is carried out. These processes are the same as those of FIGS. 26A, 26B, 27A and 27B. The ISDN exchange may reject an allocation of a service profile for the old SPID and send a release completion message REL-COM (dCR, CSE=100) including a dummy call number dCR and a cause display information element CSE to the receiver (FIG. 29).

The receiver recognizes the failure of terminal initialization with the old SPID and automatically sends a call setup message SETUP (CPN) to call a predetermined address or the address of the caller that has requested the registration of the new SPID. At the same time, the receiver sets the timer to wait for an SPID registration completion notice acknowledgment. The ISDN exchange sends a call setup reception message CALL-PROC to the receiver. It is possible that the exchange may not accept the request under a terminal initialization incomplete state. In this case, a release completion message REL-COM instead of the message CALL-PROC is sent to the receiver, to terminate the process.

Upon receiving the call setup message SETUP (CPN), the ISDN exchange sends a call setup message SETUP (CPN)

to the caller. The ringer of the caller starts, and the caller sends a calling message ALERT to the ISDN exchange, which transfers the same to the receiver. When the ringer starts, the caller lifts the handset and sends an acknowledgment CONN to the ISDN exchange, which transfers the same to the receiver.

Upon receiving the acknowledgment CONN, the receiver stops the timer and sends an announcement of "initialization with SPID xxxx and restoration of old SPID both failed" to the B-channel. Upon receiving the announcement, the caller puts down the handset. Thereafter, a disconnection message DISC, release message REL, and release completion message REL-COM are transmitted among the caller, ISDN exchange, and receiver, to release the call.

Figure 30:
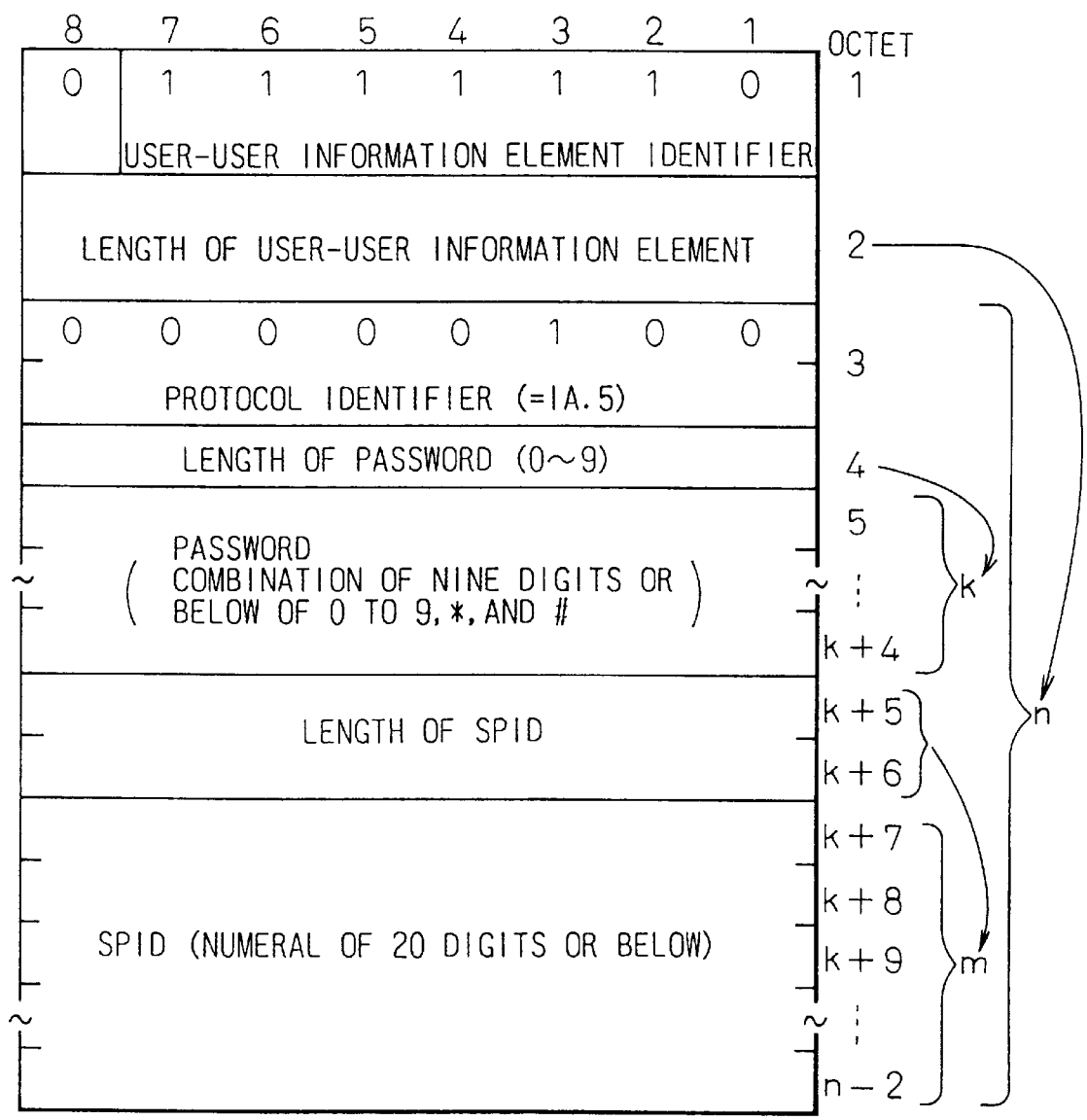
FIG. 30 shows a format of user—user information.
Figure 31:
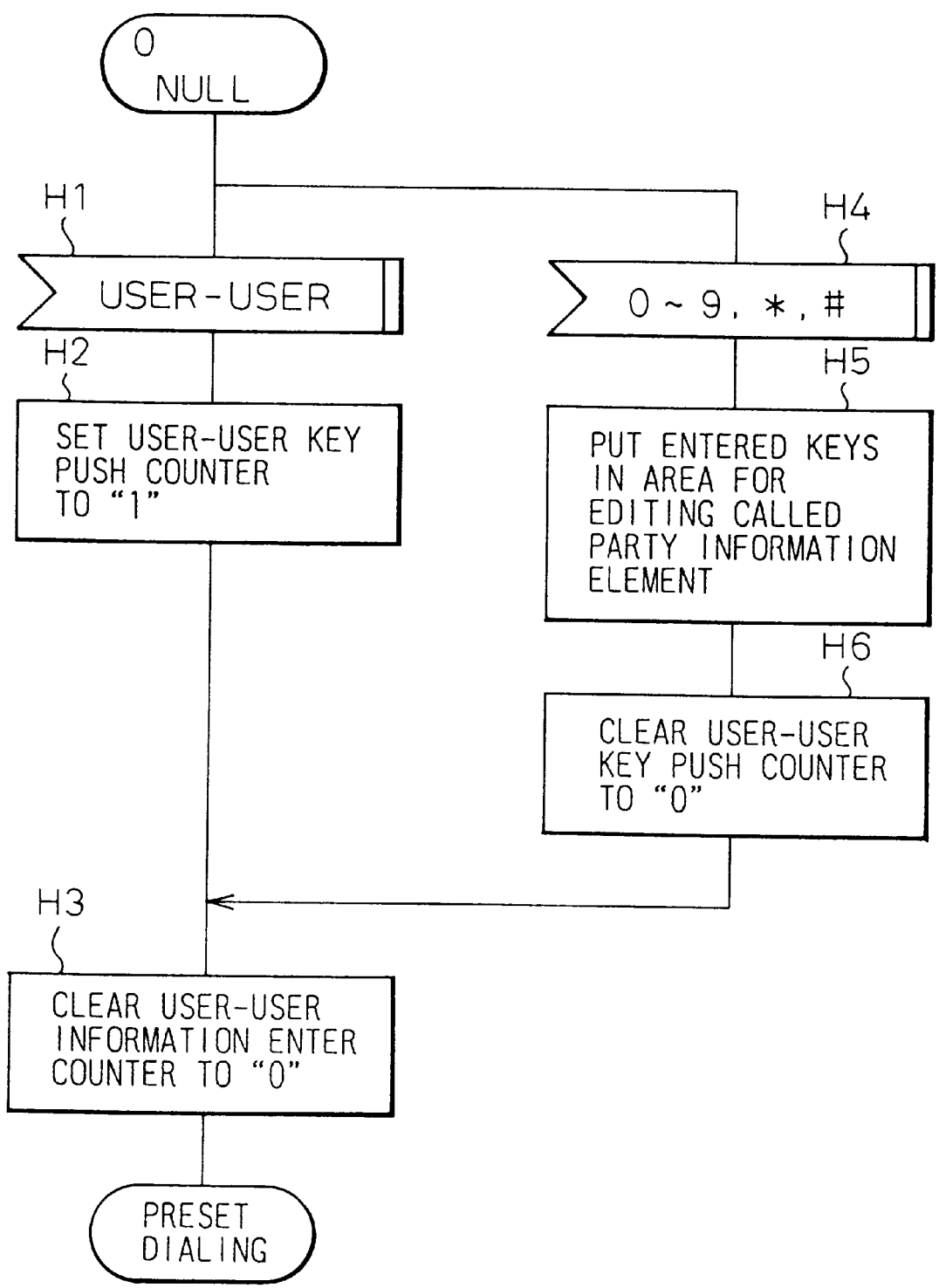
FIG. 31 is a flowchart showing the steps of setting and SPID according to an embodiment of the present invention.

FIG. 30 shows a format of user—user information. The format includes user—user information identifier, the length of the element, a protocol identifier, the length of a password, the password, the length of an SPID, and the SPID. The password consists of nine digits or below and is a combination of numbers, *, and #. The SPID consists of 20 numbers or below. Reference marks n, k, and m are octet numbers.

FIGS. 31, 32A, 32B and 33 are flowcharts showing the steps of setting an SPID according to an embodiment of the present invention. The SPID is set through the ISDN telephone or ISDN public telephone of FIGS. 21 and 22 having the user—user information start key. In step H1, the start key is pushed down. Step H2 sets "1" in a counter for counting the number of times the start key is pushed. In step H4, the dial keys involving 0 to 9, #, and * are pushed down. Step H5 sets the pushed keys in a called party number edit area. Step H6 zeroes the counter for counting the number of times the user—user information start key is pushed. Step H3 zeroes a counter for counting the number of times user—user information has been entered.

Figure 32A:
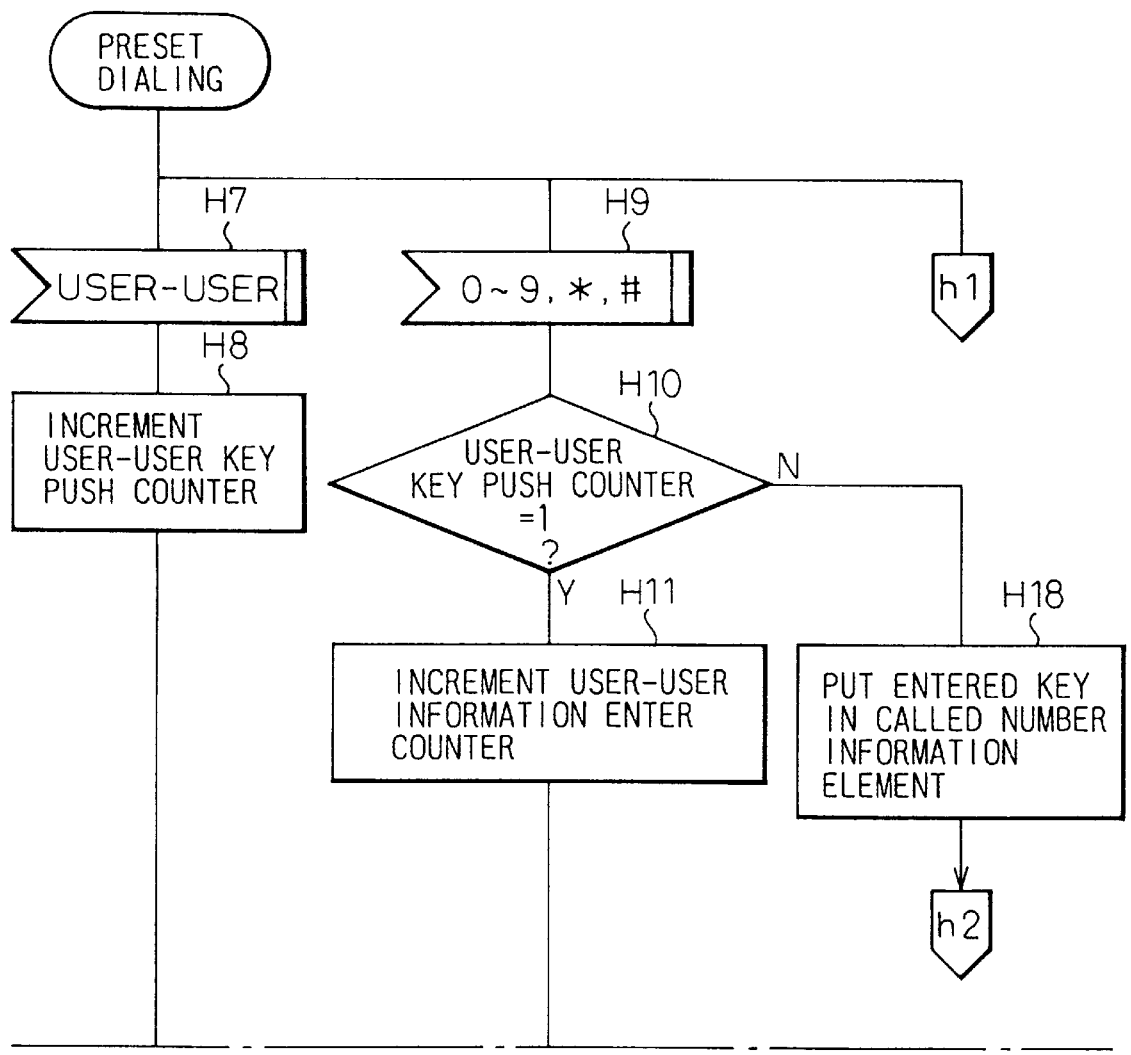
FIGS. 32A and 32B are a continuation of the flowchart of FIG. 31.
Figure 32B:
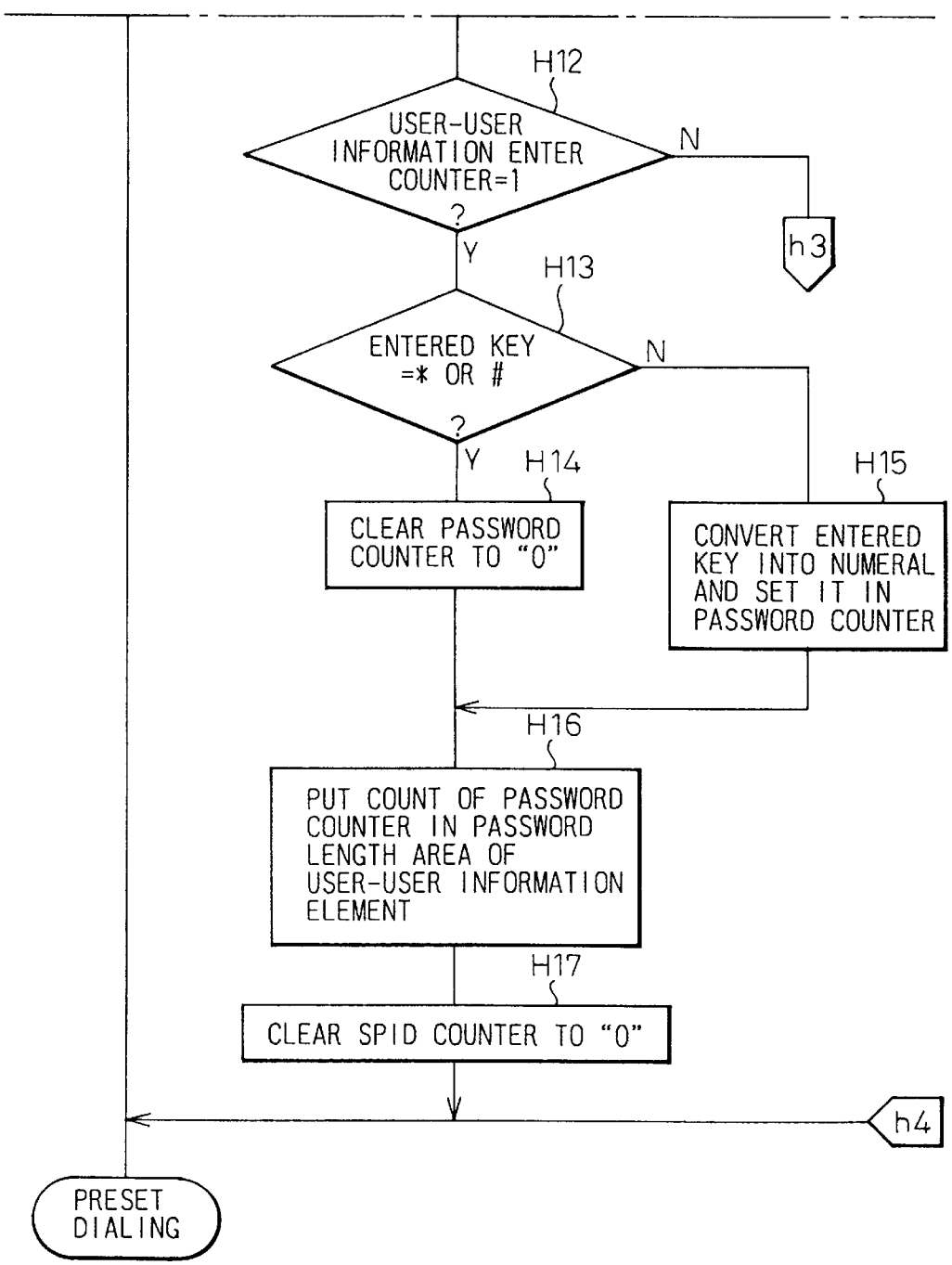
Figure 33:
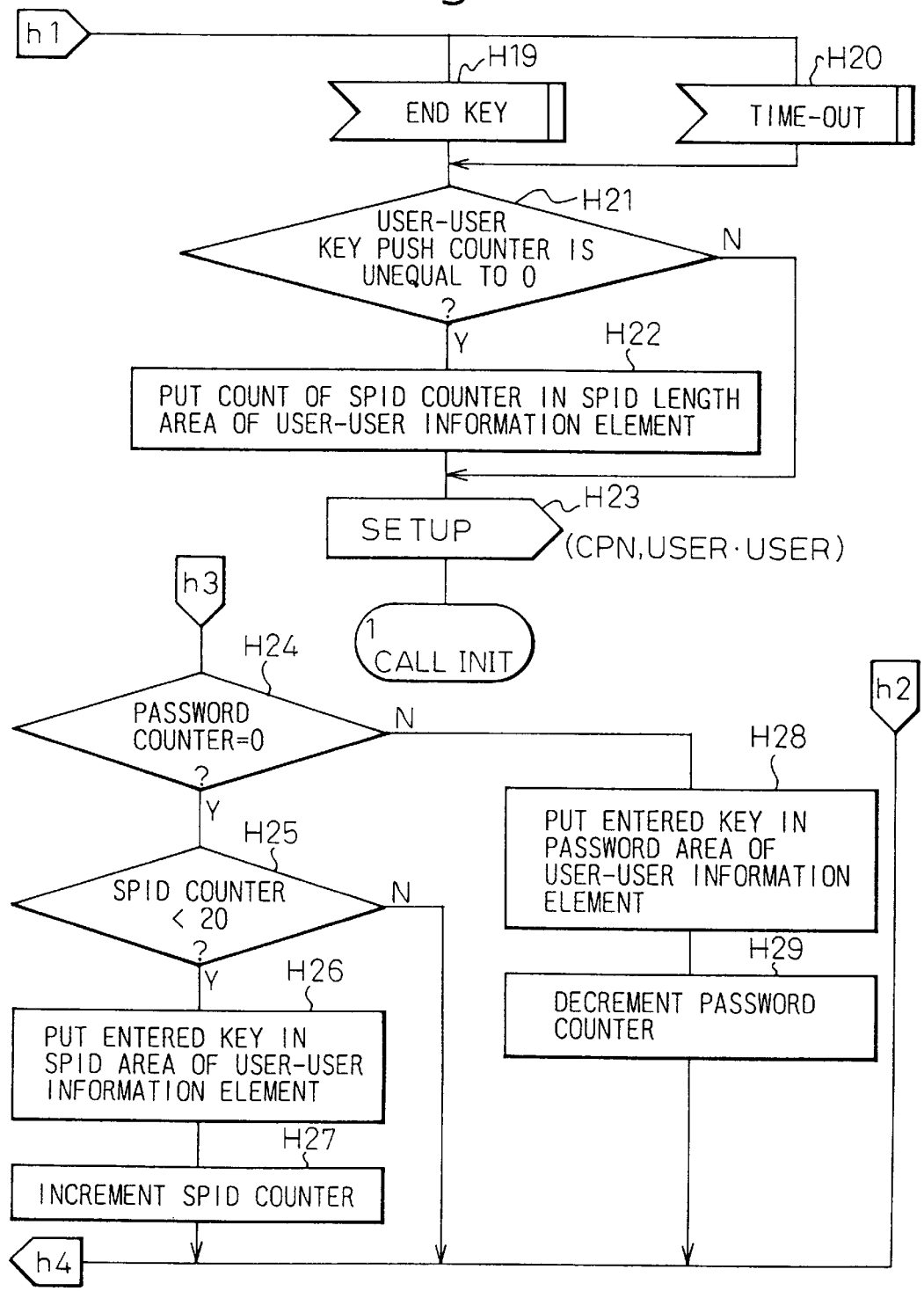
FIG. 33 is a continuation of the flowchart of FIGS. 32A and 32B.
Figure 34A:
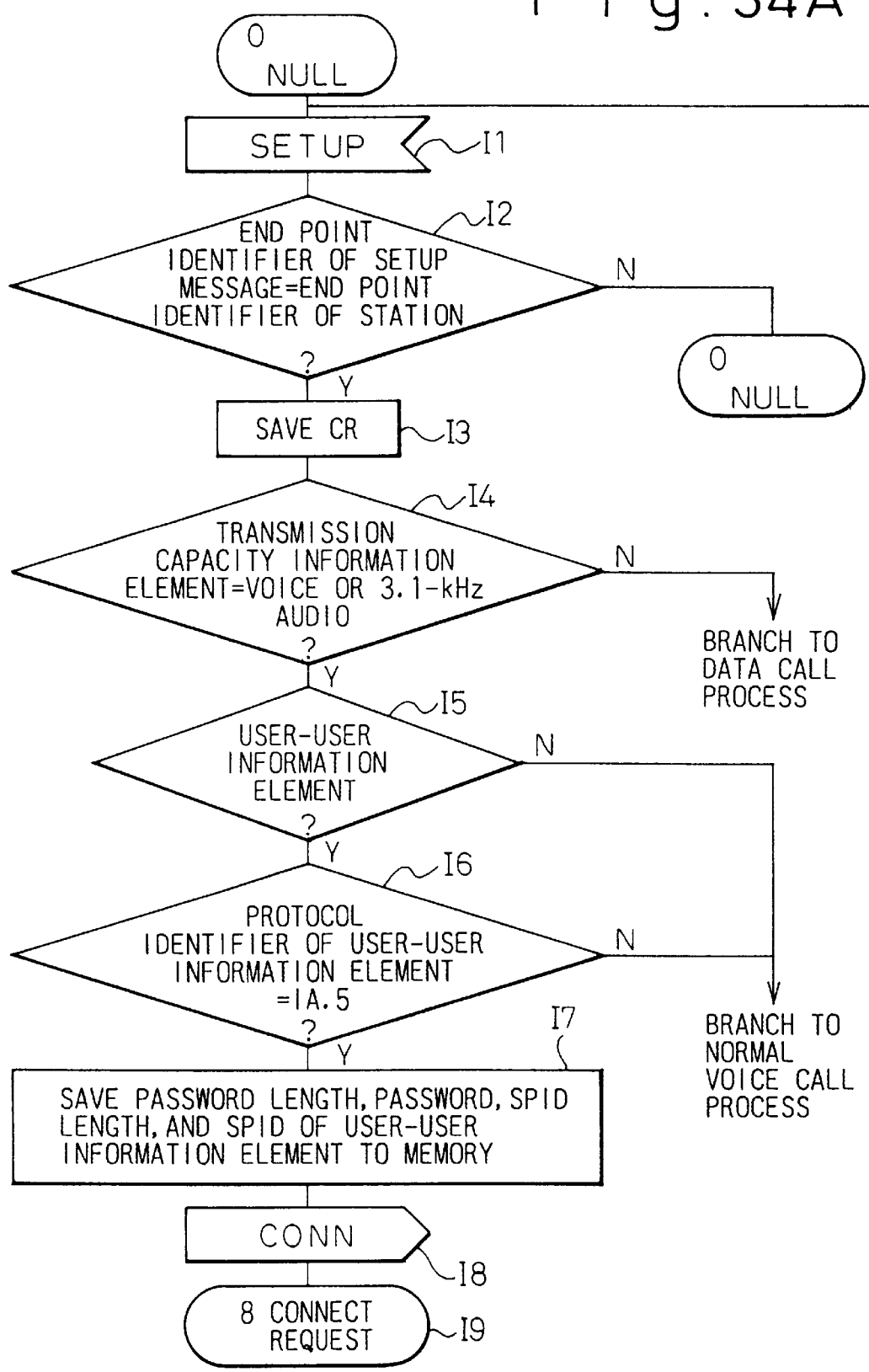
FIGS. 34A and 34B are a flowchart showing the steps of registering and SPID to a remote terminal according to an embodiment of the present invention.
Figure 34B:
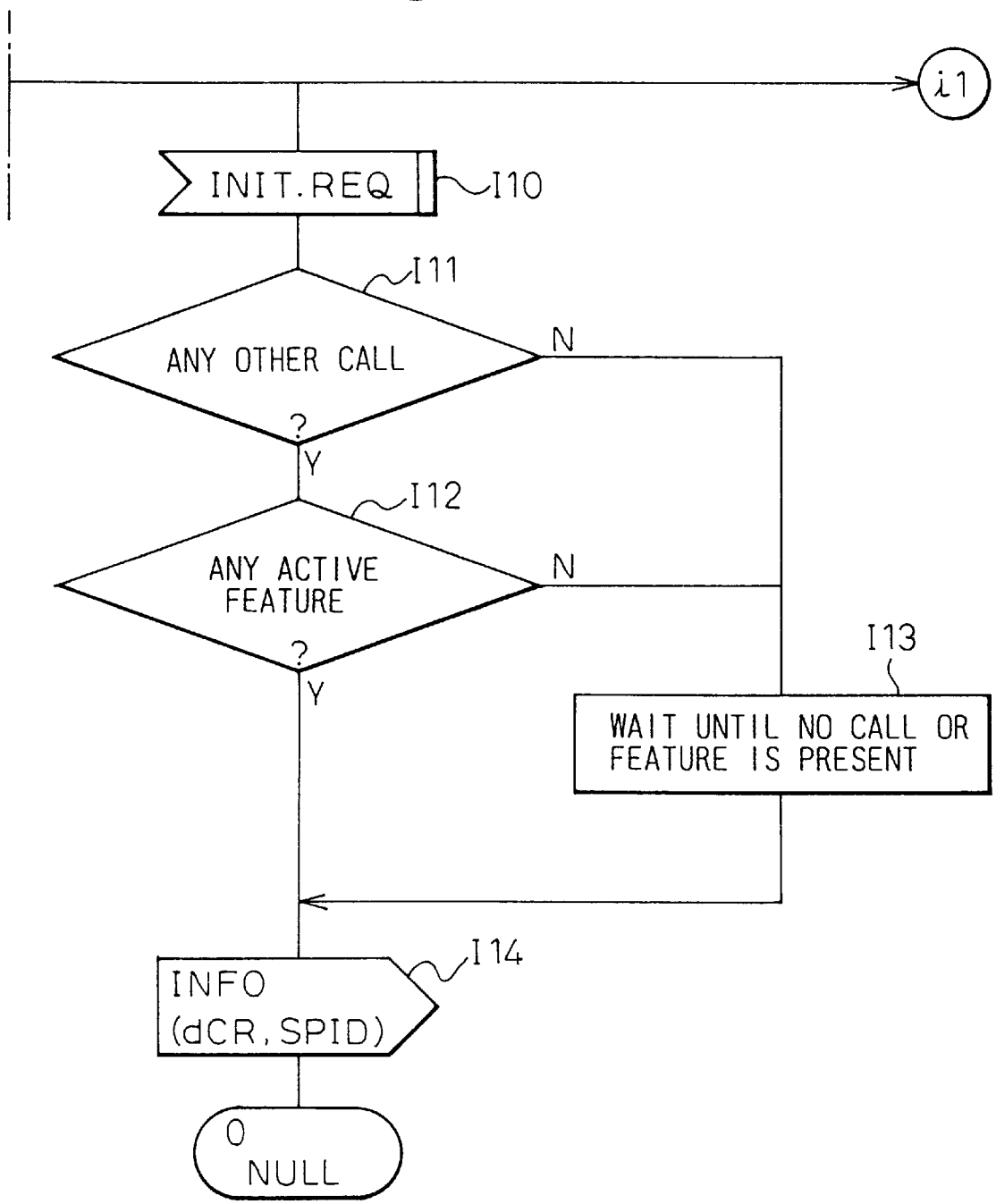

In FIGS. 32A, 32B and 33, step H7 starts when the user—user information start key is pushed down. Step H9 starts when the dial keys are pushed. Step H19 starts when the end key is pushed. Step H20 starts when a time-out error occurs. When the user—user information start key is pushed down, step H8 increments the user—user information start key counter. When the dial keys are pushed, step H10 determines whether or not the start key counter is 1. If the counter is 1, step H11 increments the user—user information entering counter, and if it is not 1, step H18 pushes the entered key into the called party number.

After the information entering counter is incremented, step H12 determines whether or not the information entering counter is 1. If the counter is 1, step H13 determines whether or not the entered key is * or #. If the entered key is numeric, step H15 converts the entered key into a numeral and puts the same in a password counter. If the entered key is not numeric, step H14 zeroes the password counter. Step H16 puts the value of the password counter in the password length area of the user—user information. Step H17 zeroes the SPID counter.

If step H12 determines that the information entering counter is not 1, step H24 determines whether or not the password counter is 0. If it is 0, step H25 determines whether or not the SPID counter is smaller than 20. If it is smaller than 20, step H26 puts the entered key into the SPID value area of the user—user information. Step H27 increments the SPID counter. If the password counter is 0 in step H24, step H28 puts the entered key into the password value area of the user—user information. Step H29 decrements the password counter.

When the end key is pushed down in step H19, or when a time-out error occurs in step H20, step H21 determines whether or not the start key counter is 0. If it is not 0, step H22 sets the value of the SPID counter into the SPID length area of the user—user information. Step H23 generates a call setup message SETUP. If the start key counter is 0 in step H21, step H23 is directly carried out.

FIGS. 34A, 34B, 35 to 37, 38A, 38B and 39 are flowcharts showing the steps of registering an SPID from a remote terminal, according to an embodiment of the present invention. This embodiment employs user—user information. Step I1 receives a call setup message SETUP. Step I10 makes an initialization request INIT-REQ. Step I15 receives an information message INFO. Step I21 receives a release completion message REL-COM. Step I28 makes a call setup request CONN-REQ.

Upon receiving a call setup message, step I2 determines whether or not an end point identifier contained in the message agrees with an end point identifier stored in the terminal apparatus. If they disagree with each other, the process ends. If they agree with each other, step I3 saves a CR value. Step I4 determines whether or not transmission capacity information is voice or 3.1-kHz audio. If it is not voice or 3.1-kHz audio, the process branches to a data call process. If it is voice or 3.1-kHz audio, step I5 determines whether or not there is user—user information. If there is, step I6 determines whether or not a protocol identifier in the user—user information is IA.5.

If there is no user—user information or if the protocol identifier is not IA.5, the flow branches to a normal voice call process. If the protocol identifier is IA.5, step I7 saves a password length, a password, an SPID length, and an SPID contained in the user—user information into the memory. Step I8 transmits an acknowledgment CONN, and step I9 makes a connection request.

When an initialization request is made, step I11 determines whether or not there is another call. If there is no other call, step I12 determines whether or not there is an active feature. If there is no active feature, step I14 transmits an information message INFO including a dummy call number dCR and an SPID. If there is another call, or if there is an active feature, step I13 waits until the call or feature disappears.

If an information message INFO including the dummy call number dCR and an end point identifier EID is received, step I16 saves the EID in a storage area. Step I17 determines whether or not the requested SPID is equal to the new SPID. If they are equal to each other, the flow normally ends. Step I18 sets a resultant flag to indicate the successful completion of SPID registration. If the SPIDs disagree, it is determined that the restoration of an old SPID is complete, and step I19 sets the resultant flag to indicate the restoration of the old SPID. Step I20 sends a connection request CONN-REQ.

When a release completion message REL-COM is received, step I22 determines whether or not the requested SPID is equal to the new SPID. If they are equal to each other, step I23 fetches the old SPID from the old SPID storage area and saves the same in the new SPID storage area. Step I24 edits an information message INFO according to the old SPID and transmits the message. If the SPIDs are not equal to each other, it is determined that the old SPID is not restorable. Step I26 sets the resultant flag to indicate the result of the SPID registration, and step I27 prepares a connection request CONN-REQ.

When the connection request CONN-REQ is made in FIG. 36, step I29 determines whether or not it is an SPID registration completion notice call setup request. If it is not, the flow branches to a normal call process, and if it is, step I30 determines whether or not an SPID registration completion notice is needed. If it is needed, step I31 allocates a CR value, and step I32 transmits a call setup message SETUP.

When a call setup reception message CALL-PROC is received in step I33 of FIG. 36, step I34 connects the B-channel. When step I35 receives a call message ALERT under this state, step I36 sets the response wait timer.

Figure 37:
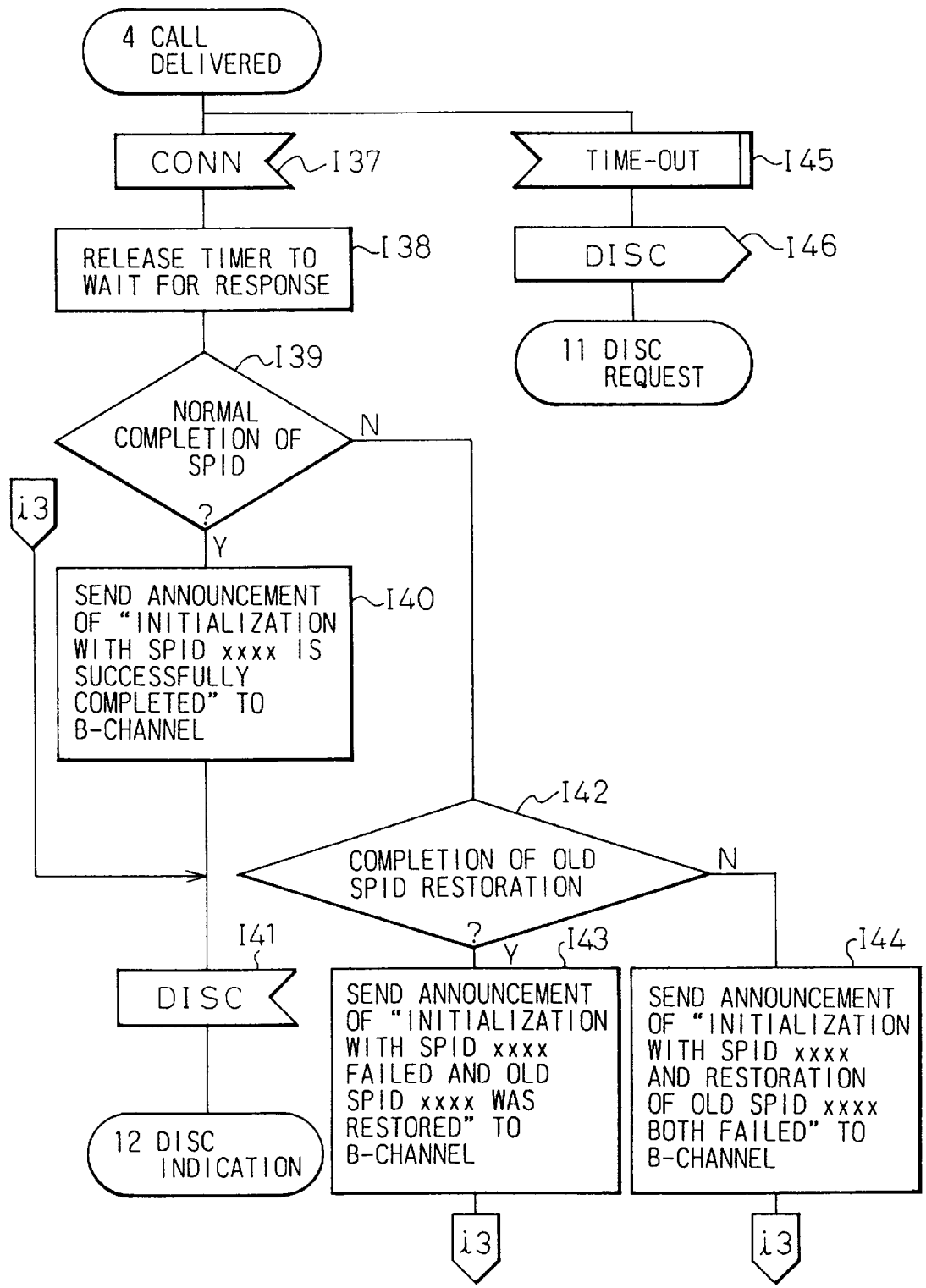
FIG. 37 is a continuation of the flowchart of FIG. 36.

If step I37 of FIG. 37 receives a response message CONN with the response wait timer being set, step I38 releases the timer. Step I39 determines whether or not the SPID process has been finished normally. If it has been finished normally, step I40 sends an announcement of "initialization with SPID xxxx was successfully made" to the B-channel. Step I41 sends a disconnection message DISC.

If the SPID process has not been finished normally in step I39, step I42 determines whether or not an old SPID has been restored. If YES, step I43 sends an announcement of "initialization with SPID xxxx failed, and old SPID xxxx was restored" to the B-channel. Then, step I41 is carried out. If the restoration of the old SPID is not successful, an announcement of "initialization with SPID xxxx and restoration of SPID xxxx both failed" is sent to the B-channel. Then, step I41 is carried out. If step I45 finds a time-out error according to the timer set in step I36, step I46 sends a disconnection message DISC.

Figure 38A:
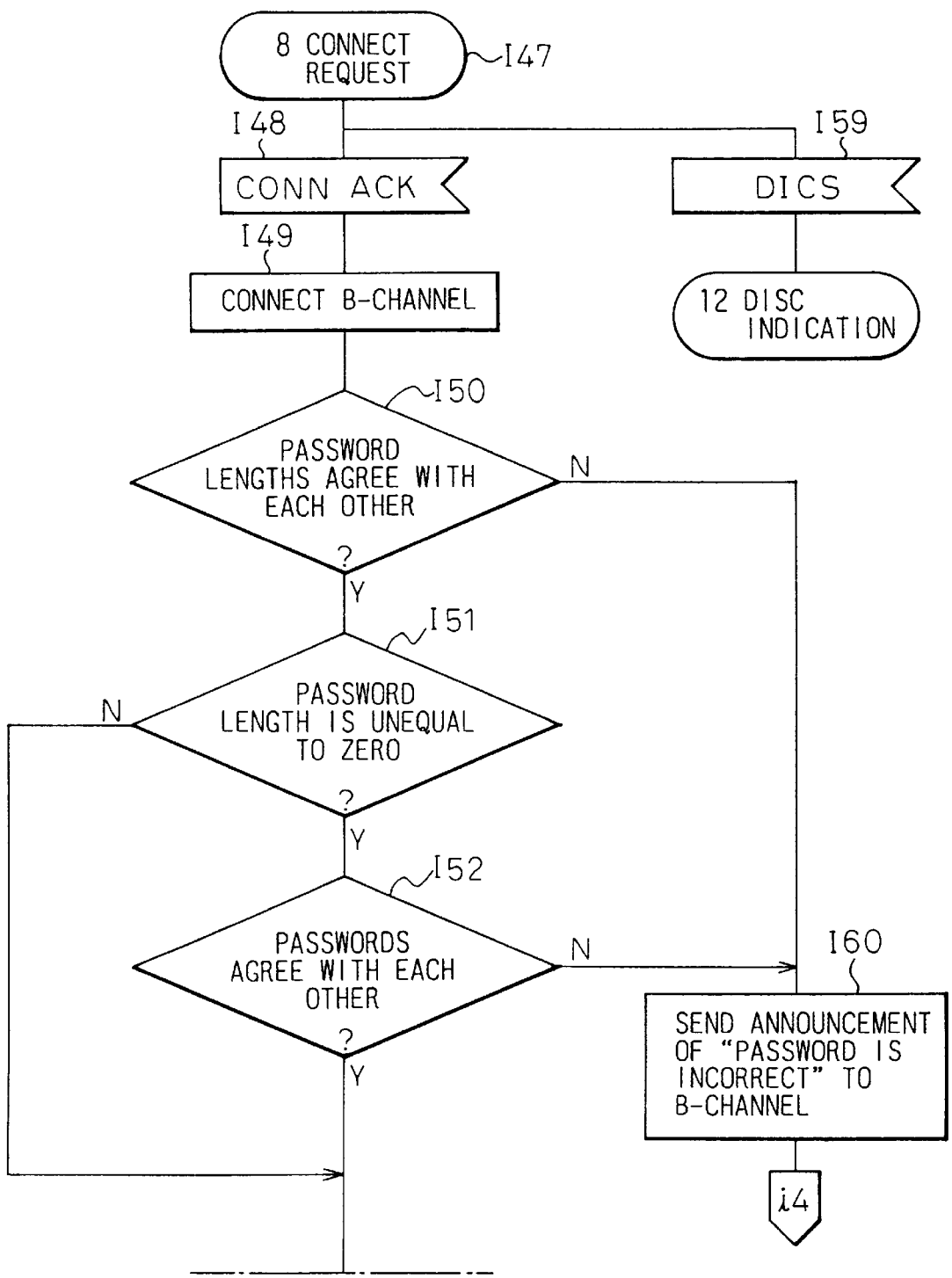
FIGS. 38A and 38B are a continuation of the flowchart of FIG. 37.
Figure 38B:
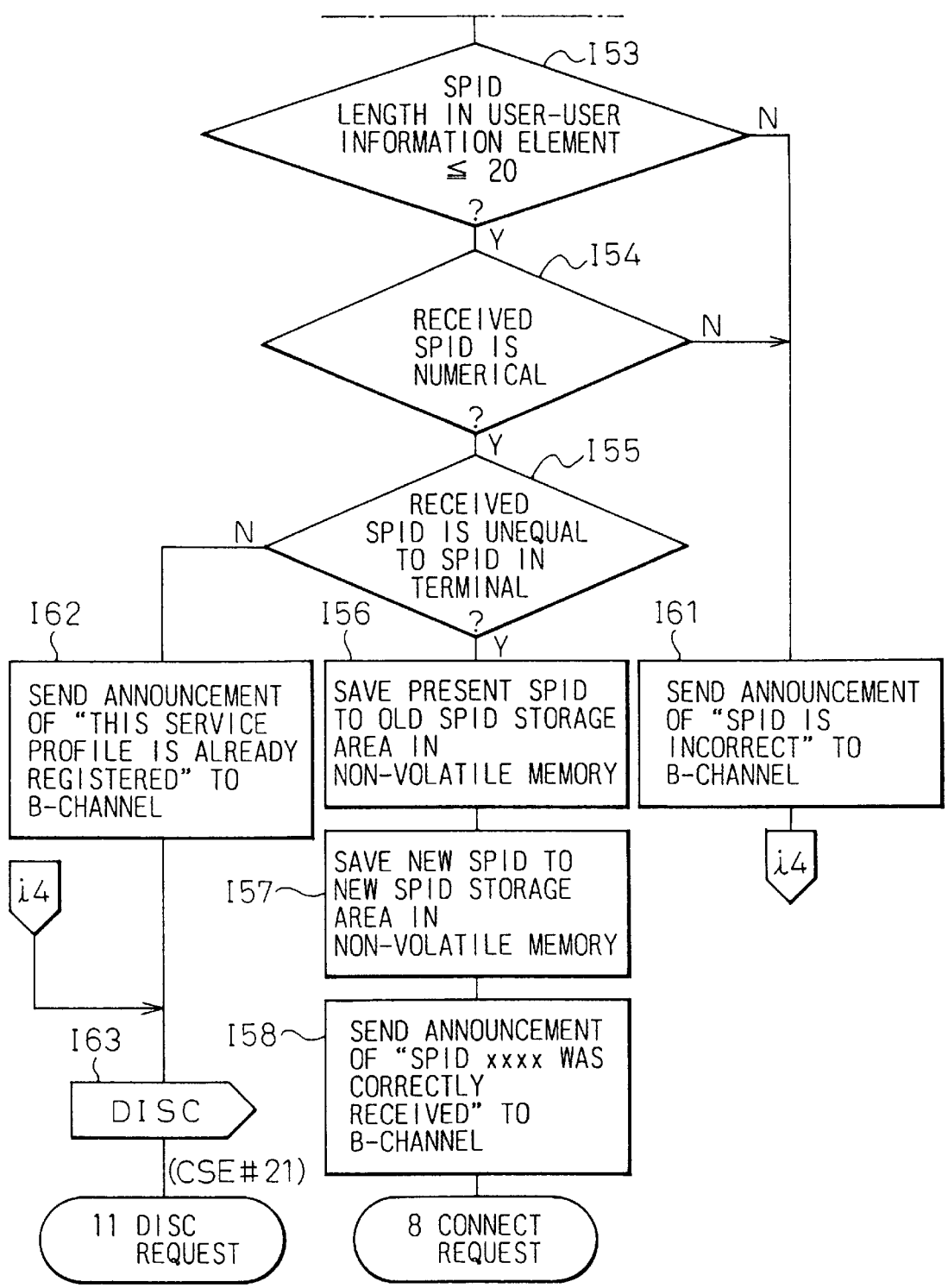
Figure 40B:
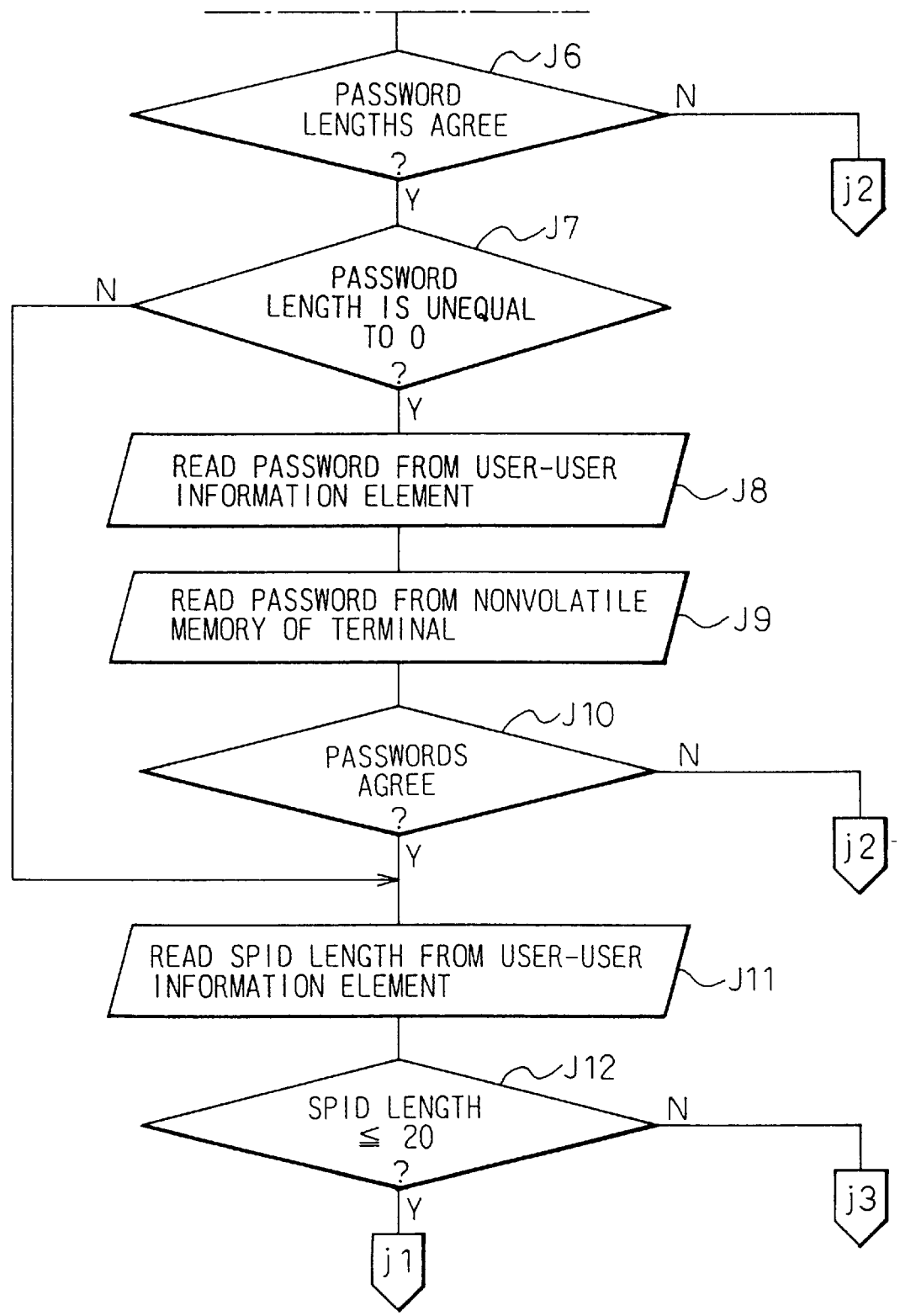
Figure 41B:
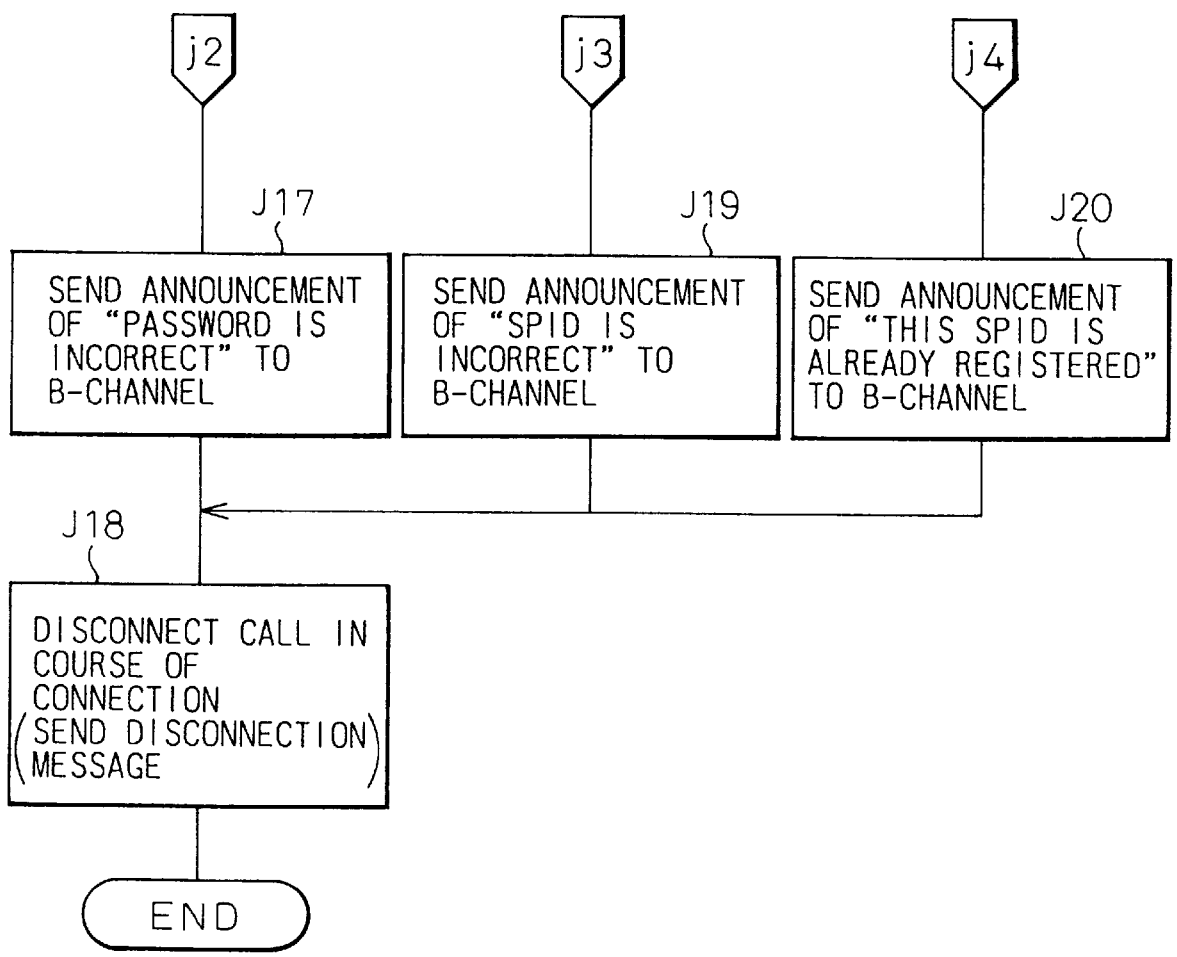
Figure 42A:
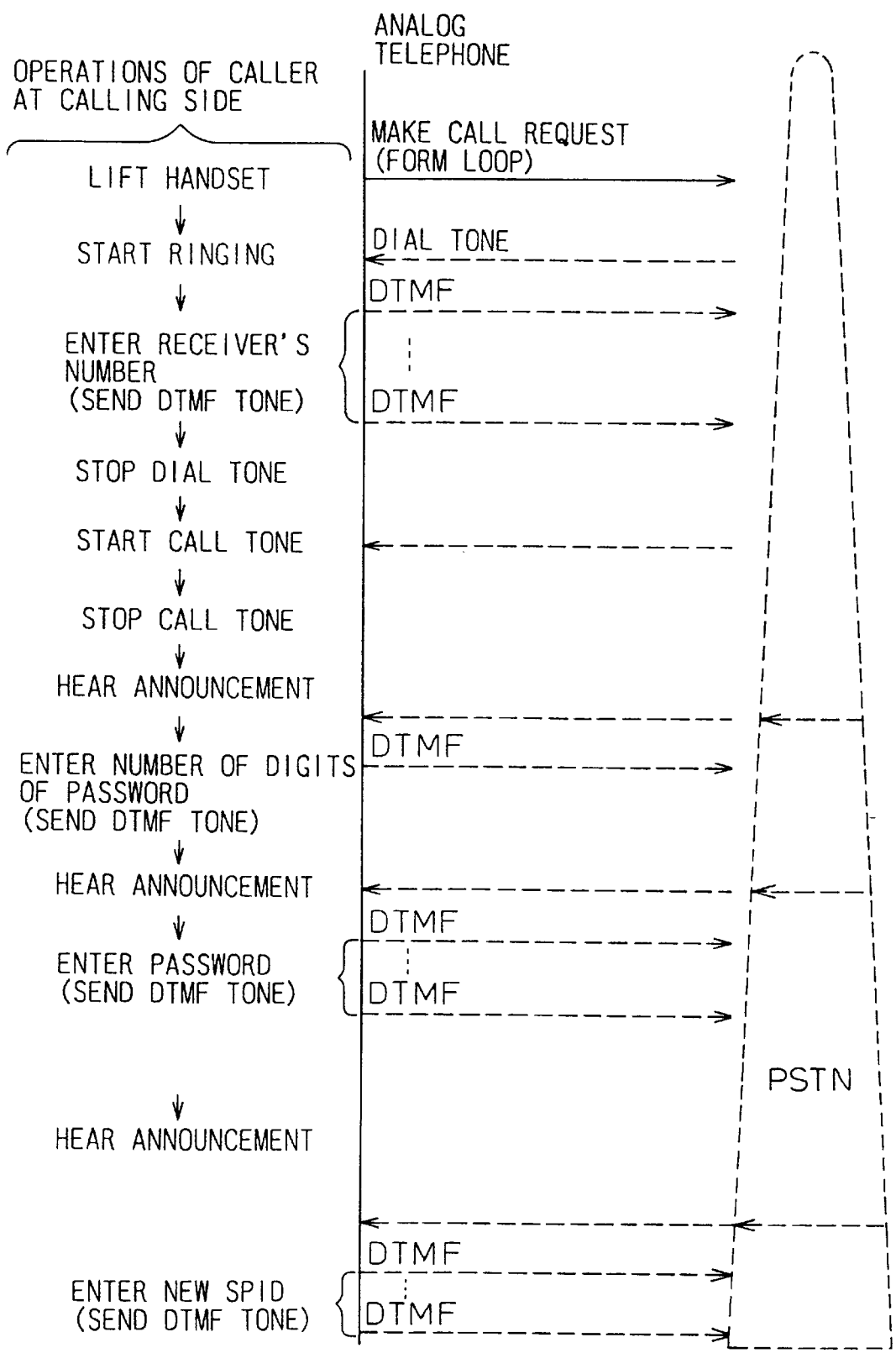
FIGS. 42A and 42B show a sequence of correctly registering an SPID to a remote terminal with a DTMF signal according to an embodiment of the present invention.
Figure 42B:
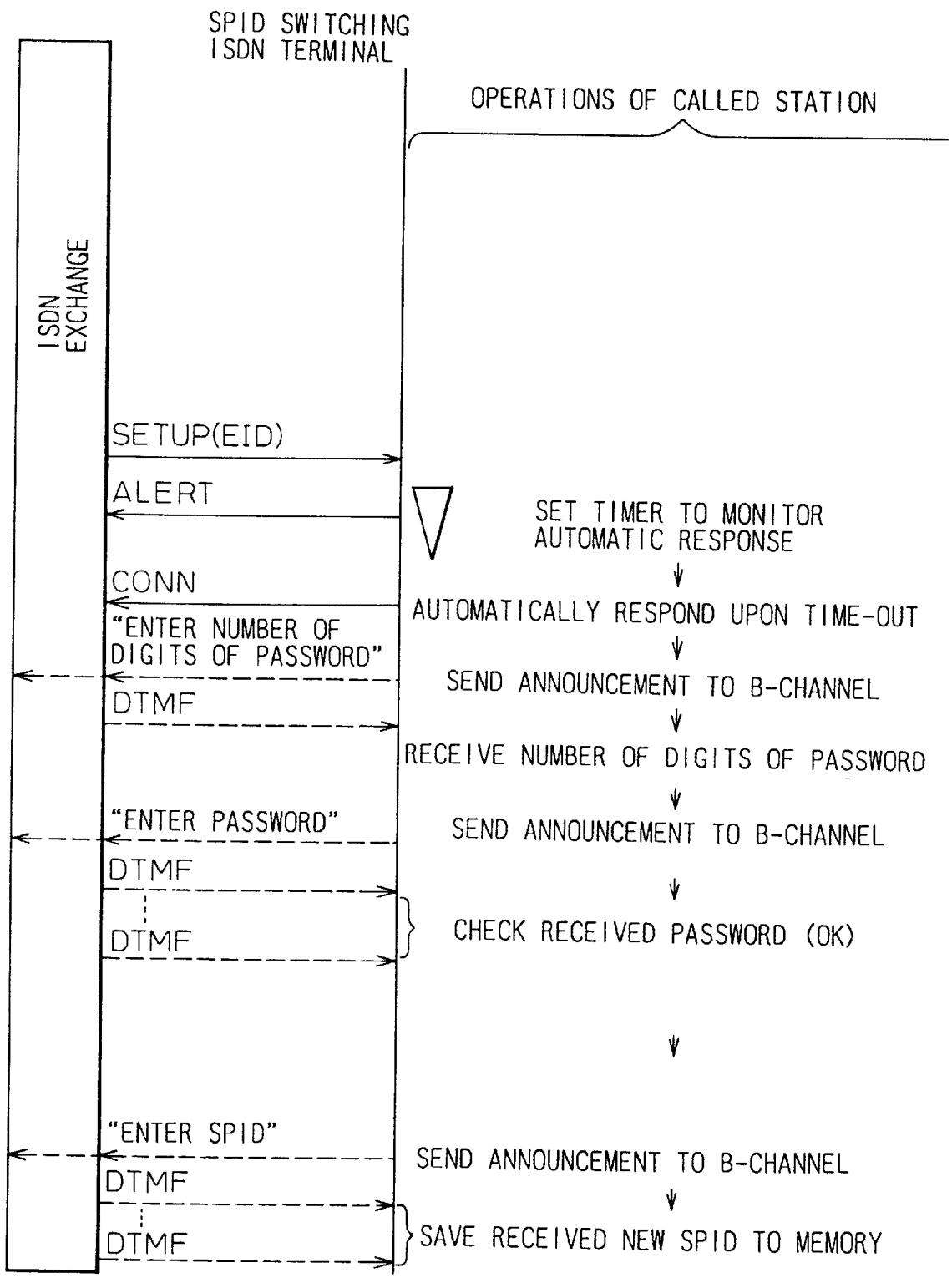
Figure 43B:
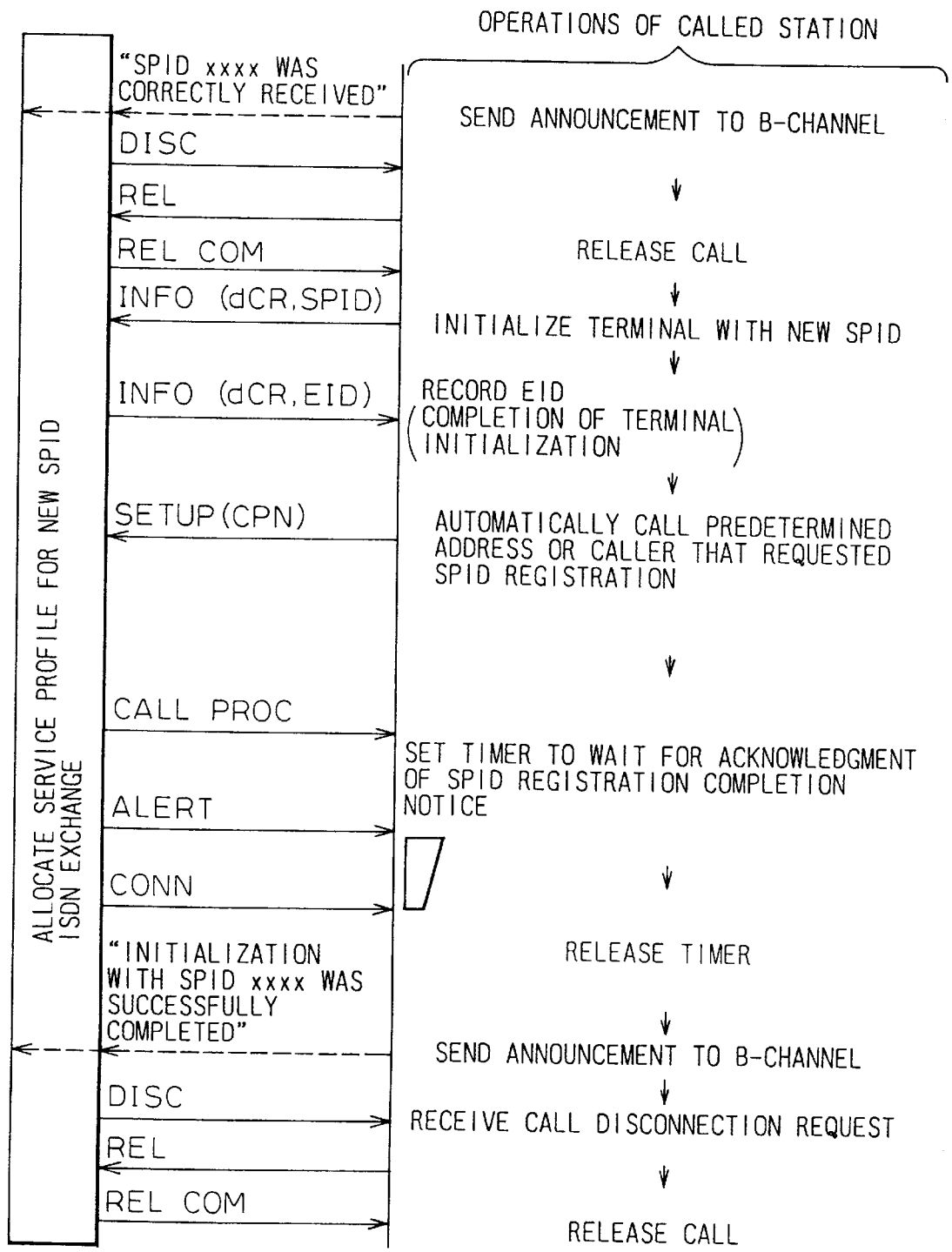

In FIGS. 38A and 38B, step I47 corresponds to step I9. When step I48 receives an acknowledgment CONN-ACK, step I49 connects the B-channel. Step I50 determines whether or not a received password length is equal to that stored in the terminal apparatus. If they are equal, step I51 determines whether or not the password length is zero. If it is not zero, step I52 determines whether or not the password is equal to that stored in the terminal apparatus. If they are equal, step I53 determines whether or not the SPID length stored in the received user—user information is 20 or below (when the maximum SPID length is set to 20). If it is below 20, step I54 determines whether or not the SPID is numeric. If it is numeric, step I55 determines whether or not the SPID is equal to that stored in the terminal apparatus. If they are not equal to each other, step I56 saves the present SPID in the old SPID storage area, and step I57 saves the new SPID in the new SPID storage area. Step I58 sends an announcement of "SPID xxxx was normally received" to the B-channel.

If step I59 receives a disconnection message DISC, it is displayed. If the received password disagrees with the stored password in step I52, step I60 sends an announcement of "password is incorrect" to the B-channel, and step I63 sends a disconnection message DISC. If the SPID length in the user—user information is over 20 in step I53, or if the received SPID is not numeric in step I54, step I61 sends an announcement of "SPID is incorrect" to the B-channel, and step I63 sends a disconnection message DISC. If the received SPID is equal to that stored in the terminal apparatus in step I55, step I62 sends an announcement of "the SPID is already registered" to the B-channel, and step I63 sends a disconnection message.

After step I41, step I64 of FIG. 39 provides a release completion indication REL-IND, and step I65 releases the B-channel. Step I66 sends a release message REL. When step I67 receives a release completion message REL-COM, step I68 releases CRV. Step I69 determines whether or not the SPID sent from the remote terminal is being registered. If it is being registered, step I70 makes an initialization request INIT-REQ. If it is not being registered, the flow ends. After step I63, step I71 receives a release message REL, and step I72 sends a release completion message REL-COM. Step I73 releases the B-channel, and step I74 releases CRV.

FIGS. 40A, 40B, 41A and 41B are flowcharts showing the steps of checking user—user information. Step J1 reads a protocol identifier from the user—user information, and step J2 determines whether or not the protocol identifier is IA.5. If it is IA.5, step J3 sends an acknowledgment to the B-channel.

Step J4 reads a password length stored in the memory of the terminal apparatus. Step J5 reads a password length from the user—user information. Step J6 determines whether or not the password lengths are equal to each other. If they are equal, step J7 determines whether or not the password length is zero. If it is not zero, step J8 reads a password out of the user—user information, and step J9 reads a password out of the memory of the terminal apparatus. Step J10 determines whether or not the passwords are equal to each other. If they are equal, step J11 reads an SPID length out of the user—user information, and step J12 determines whether or not the SPID length is shorter than 20. In this example, the maximum length of an SPID is set to 20.

If the SPID length is less than 20, step J13 reads an SPID out of the user—user information, and step J14 determines whether or not the SPID is numeric. If it is numeric, step J15 reads an SPID out of the memory of the terminal apparatus, and step J16 determines whether or not the SPIDs are equal to each other. If they differ from each other, the flow branches to an end point initialization process.

If the password lengths are not equal to each other in step J6, or if the passwords disagree with each other in step J10, step J17 sends an announcement of "password is incorrect" to the B-channel, and step J18 sends a disconnection message DISC to disconnect the call. If the SPID length is over 20 in step J12, or if the SPID is not numeric in step J14, step J19 sends an announcement of "SPID is incorrect" to the B-channel, and step J18 disconnects the call. If the SPIDs are equal to each other in step J16, step J20 sends an announcement of "the SPID is already registered" to the B-channel, and step J18 disconnects the call.

FIGS. 42A, 42B, 43A and 43B are sequences of normally registering an SPID according to a remote request sent with a DTMF signal, according to an embodiment of the present invention. These figures show the operations of an analog telephone serving as a caller in a PSTN and the operations of an ISDN terminal serving as a receiver connected to an ISDN exchange. The caller lifts a handset and enters a called party number in response to a dial tone from the PSTN. The dial number is transmitted with a DTMF signal.

In response to the called party number, the ISDN exchange sends a call setup message SETUP including an end point identifier EID. Upon receiving the message, the ISDN terminal sends a calling message ALERT and sets an automatic response monitor timer. When a time-out error occurs, the ISDN terminal automatically sends an acknowledgment CONN. In response to the calling message ALERT, the caller generates a calling sound, and in response to the acknowledgment CONN, the calling sound stops.

The receiver sends a message of "enter the number of digits of a password" to a B-channel. In response to this announcement, the caller enters the number of digits of a password. The receiver receives the number with a DTMF signal and sends an announcement of "enter a password" to the B-channel. In response to this announcement, the caller enters a password. The receiver receives the password with a DTMF signal and checks the same. If the password is acceptable, the receiver sends an announcement of "enter an SPID" to the B-channel.

In response to this announcement, the caller enters a new SPID. The receiver receives the SPID with a DTMF signal and saves the SPID in a memory. The receiver sends an announcement of "the SPID xxxx was correctly received" to the B-channel. Upon hearing this announcement, the caller recognizes that the SPID entered into the analog telephone has been accepted by the ISDN terminal. The caller puts down the handset and releases the call. Between the ISDN exchange and the receiver, messages are transmitted according to a call release sequence.

After the call is released, the receiver starts a terminal initialization sequence according to the new SPID similar to FIGS. 24A and 24B, and the ISDN exchange allocates a service profile for the SPID. The receiver automatically calls a predetermined address or the address of the remote caller that made the SPID registration request. The receiver (ISDN terminal) sends an announcement of "initialization with the SPID xxxx was correctly completed" to the B-channel and carries out a call release sequence. In response to the call, the caller lifts the handset and hears the announcement. Accordingly, the caller (remote analog telephone) recognizes that the registration of the SPID has been correctly made. In this way, the remote analog telephone can switch the service profile of the ISDN terminal to another profile.

Figure 44B:
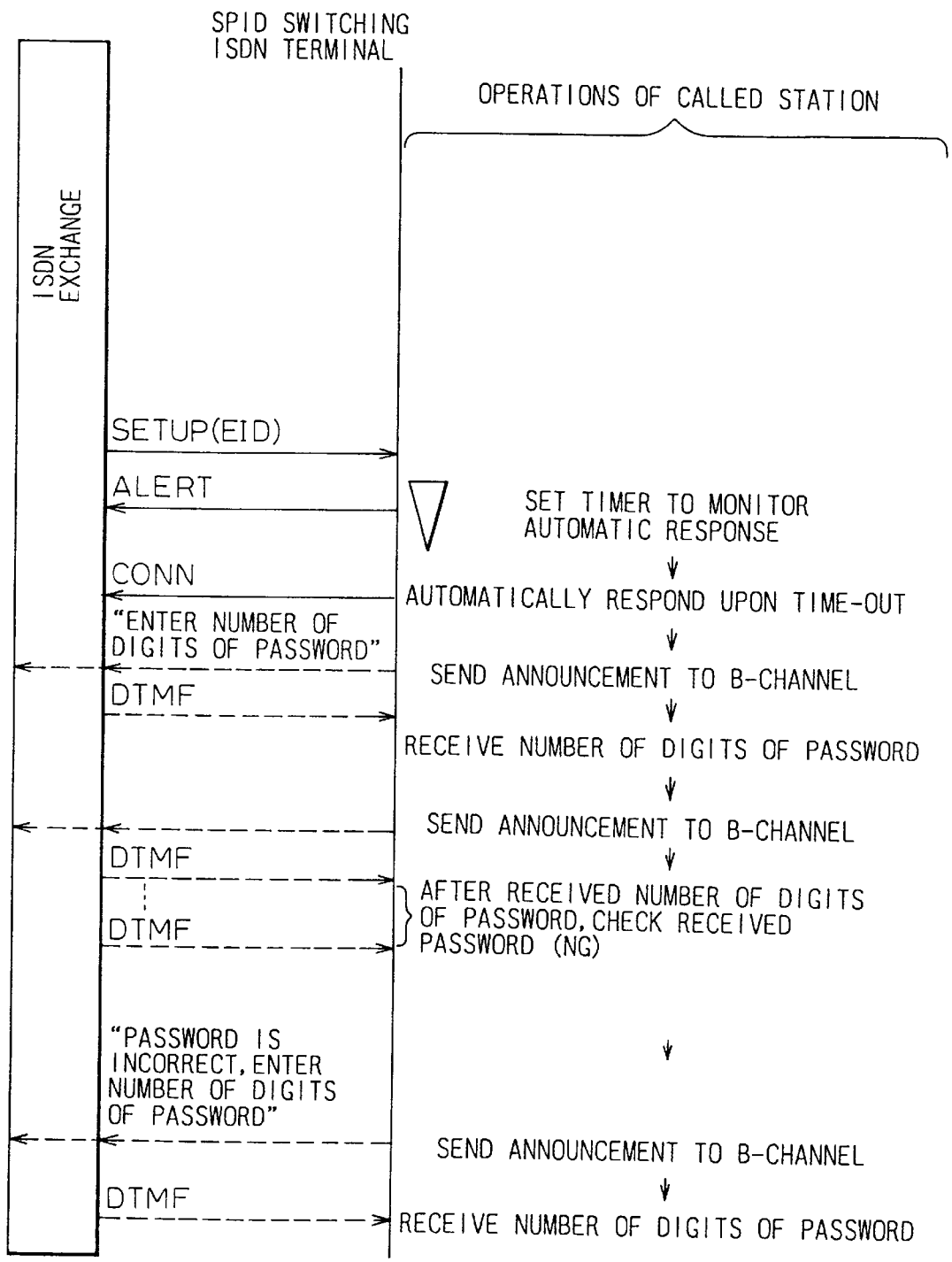
Figure 45B:
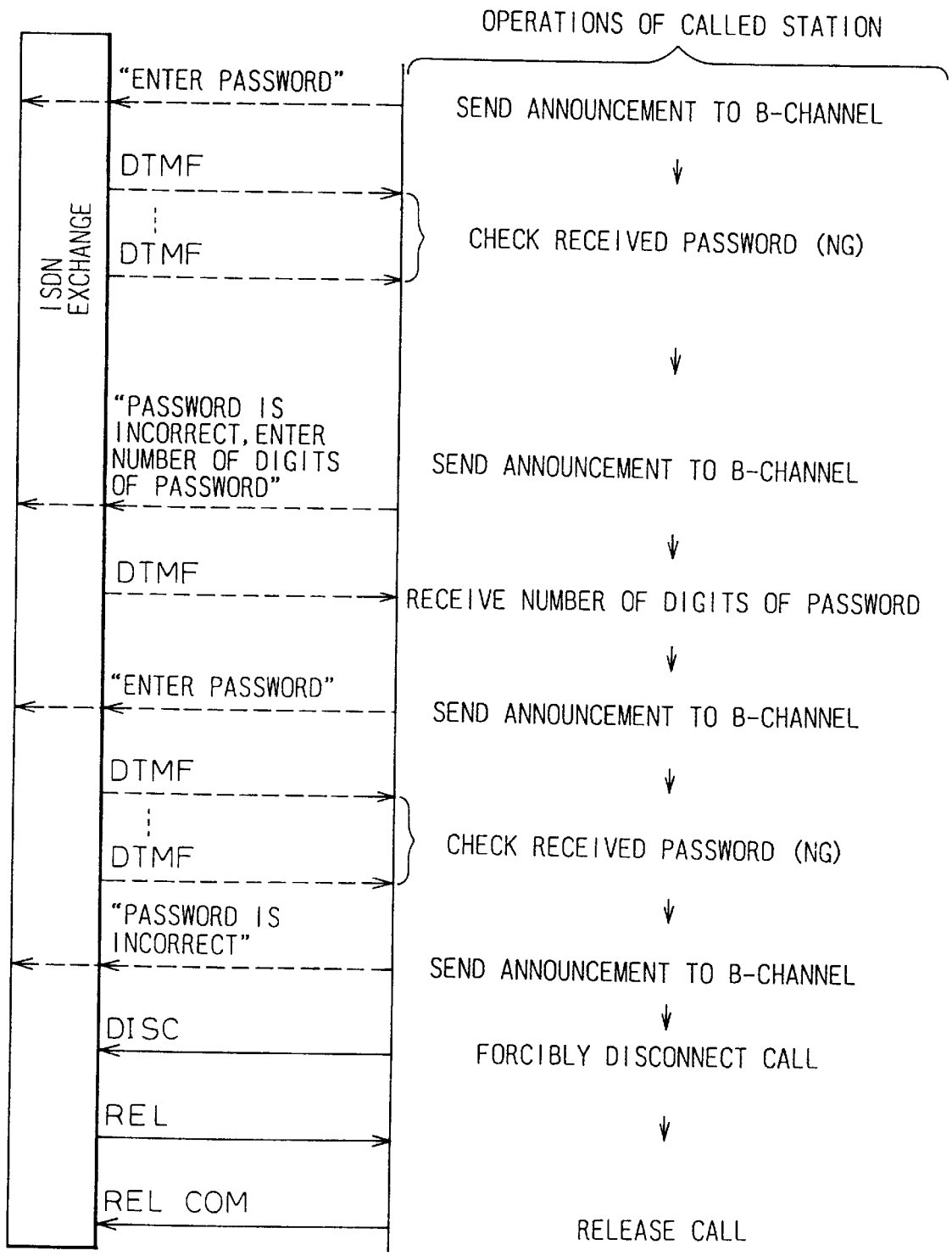

FIGS. 44A and 45B show sequences when an illegal password is entered, according to an embodiment of the present invention. A caller calls an ISDN terminal (receiver) and enters a password. The receiver receives the password. The sequence up to this stage is the same as that of FIGS. 42A and 42B. The receiver checks the password, and if it is incorrect, sends an announcement of "the password is incorrect, enter the number of digits of a password" to the B-channel.

Upon hearing the announcement, the caller again enters the number of digits of a password. The receiver sends an announcement of "enter a password" to the B-channel. In response to this announcement, the caller again enters a password. The receiver checks the password, and if it is again incorrect, sends the announcements instructing the caller to enter the number of digits of a password as well as the password. These processes are repeated a predetermined number of times. If the password is still incorrect, the receiver sends an announcement of "the password is incorrect" to the B-channel and forcibly disconnects the call as shown in FIGS. 25A and 25B.

Figure 46A:
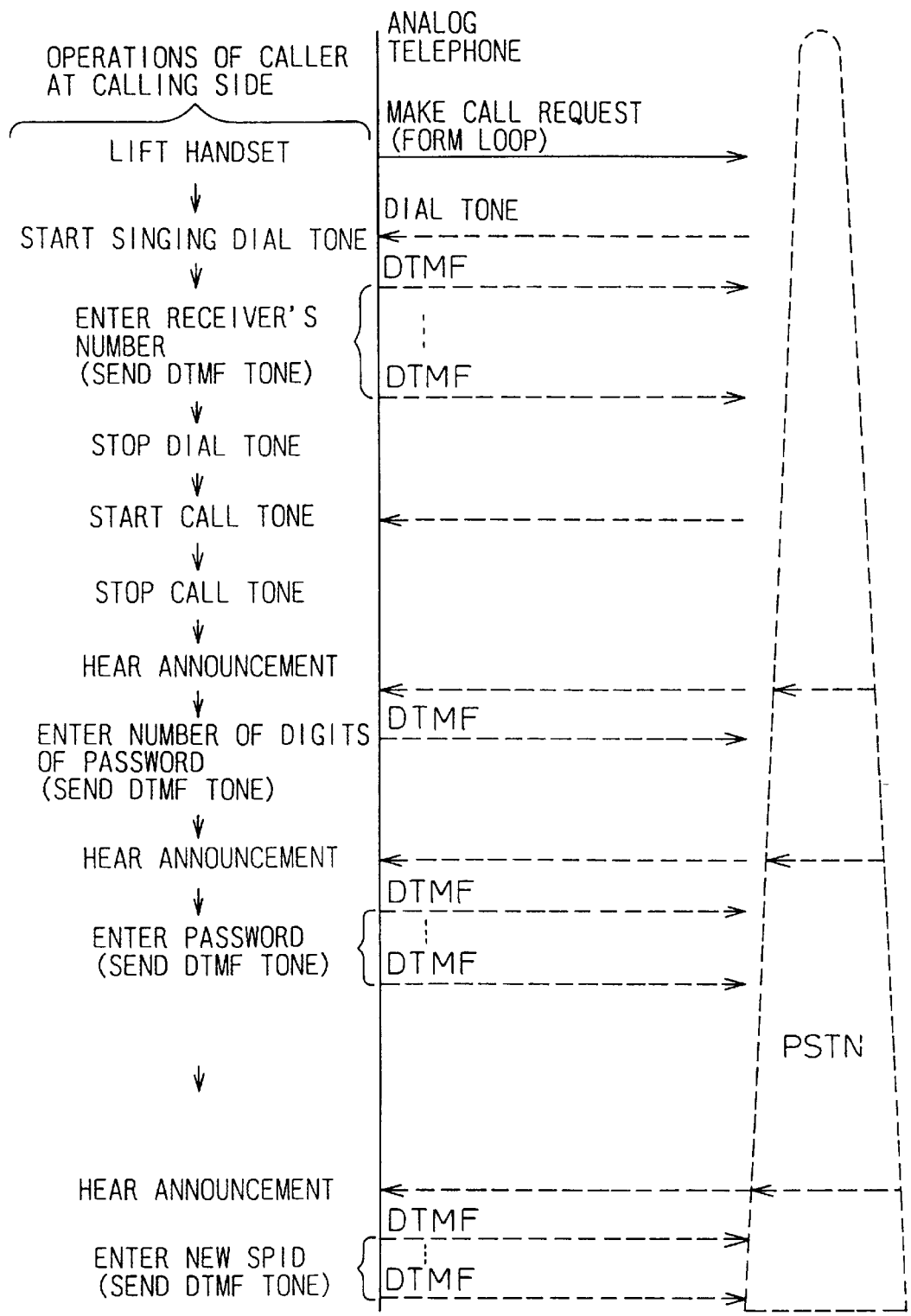

FIGS. 46A, 46B, 47A, 48A and 48B show sequences of restoring an old SPID according to an embodiment of the present invention. The operations of caller and receiver of FIGS. 46A and 46B are the same as those of FIGS. 42A and 42B, and therefore, they are not explained again.

Figure 47B:
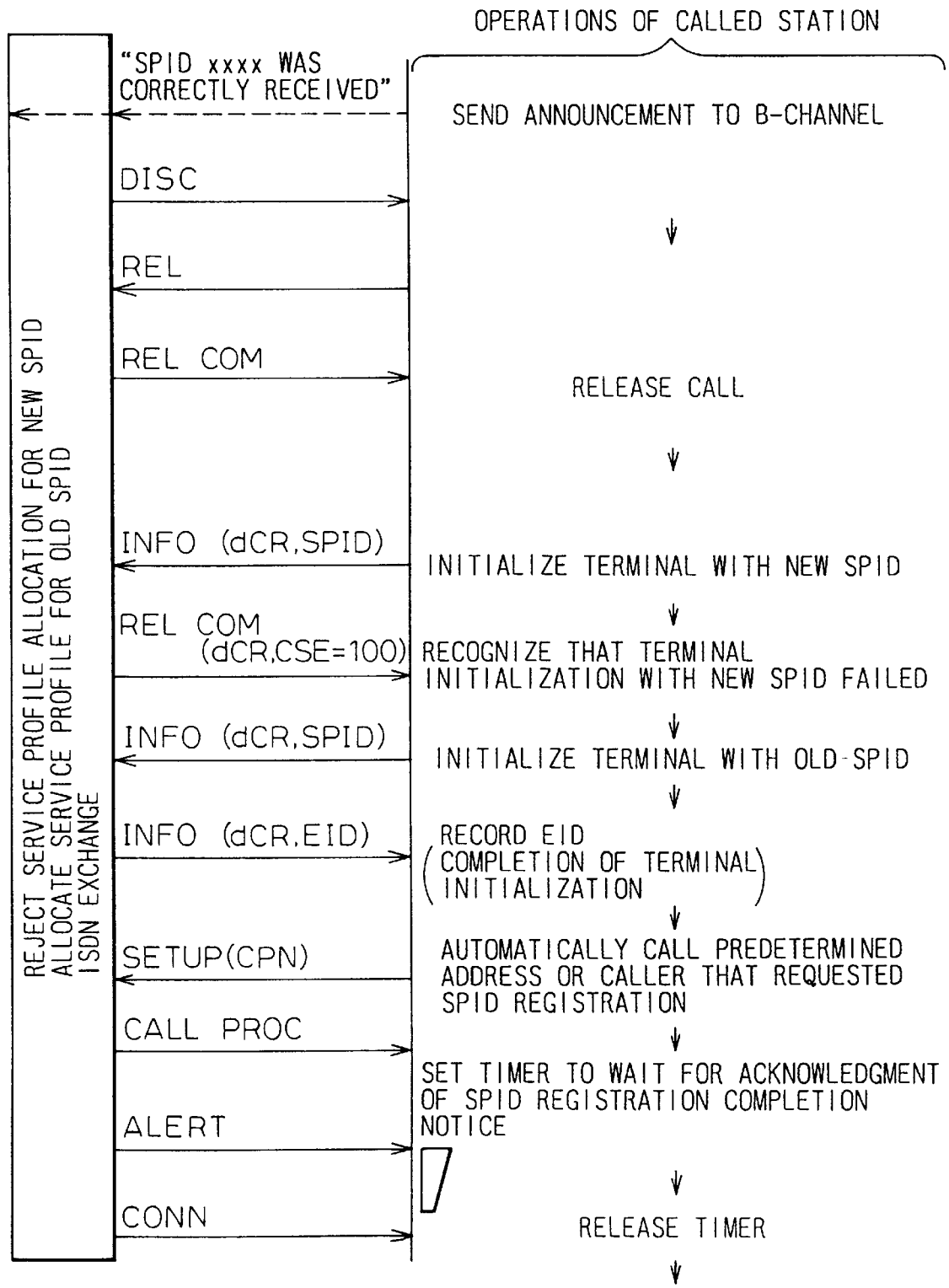

In FIGS. 47A and 47B, the receiver sends an announcement of "the SPID xxxx was correctly received" to the caller, and releases the call. The receiver starts a terminal initialization sequence with the new SPID and sends an information message INFO (dCR, SPID) to the ISDN exchange. If the ISDN exchange rejects the request to allocate a service profile for the new SPID, the exchange sends a release completion message REL-COM (dCR, CSE=100) to the receiver. The receiver starts a terminal initialization sequence with an old SPID and sends an information message INFO (dCR, SPID) to the exchange.

Figure 48B:
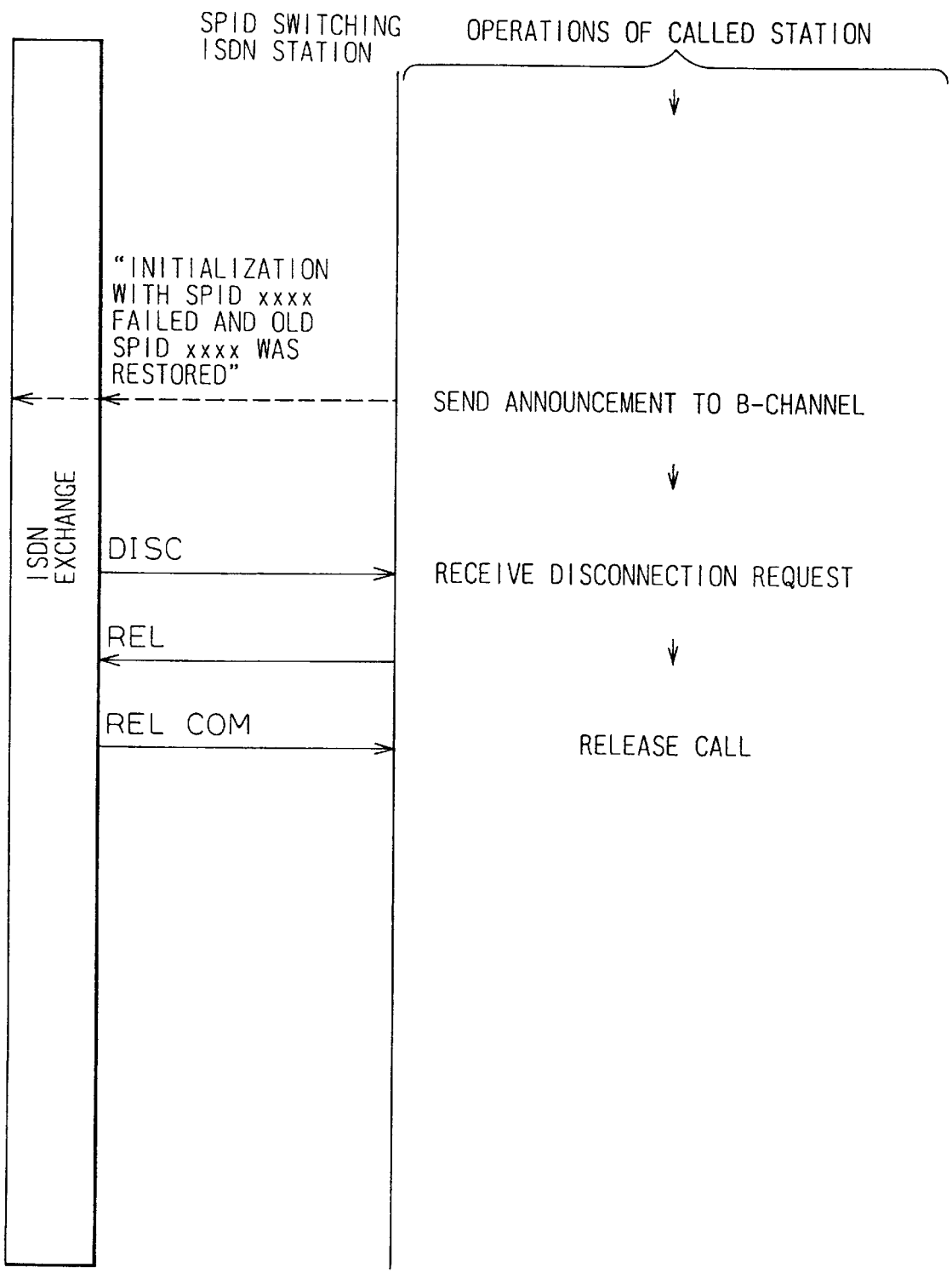

The ISDN exchange allocates a service profile for the old SPID and sends an information message INFO (dCR, EID) including a dummy call number dCR and an end point identifier EID. This completes the initialization sequence. The receiver automatically calls a predetermined address or the address of the remote caller that made the SPID request. The receiver sends an announcement of "initialization with the SPID xxxx failed, and the old SPID xxxx was restored" to the B-channel as shown in FIGS. 48A and 48B. The receiver then carries out a call release sequence. Upon hearing the announcement, the caller recognizes that the new SPID was not registered.

Figure 49A:
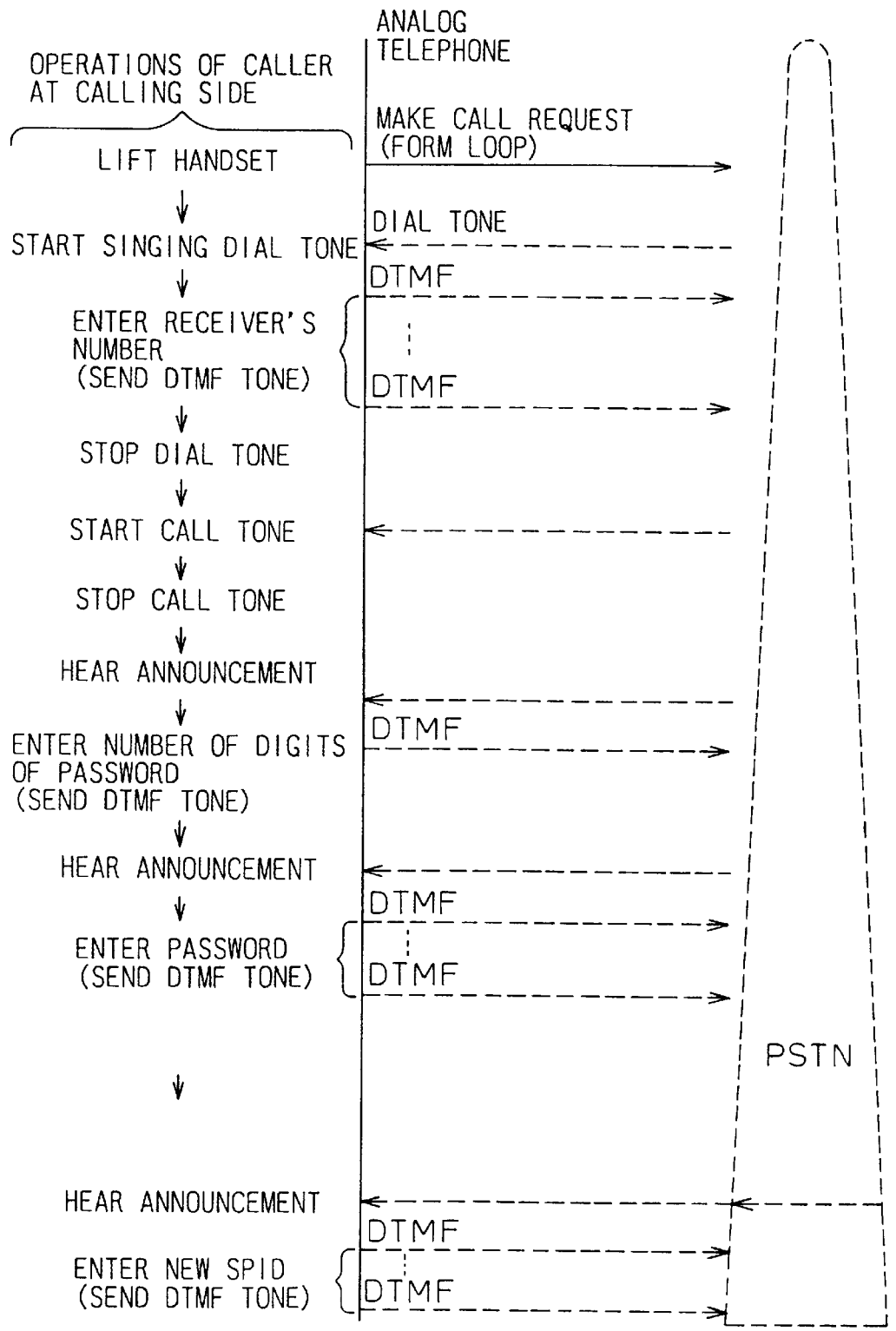
Figure 50A:
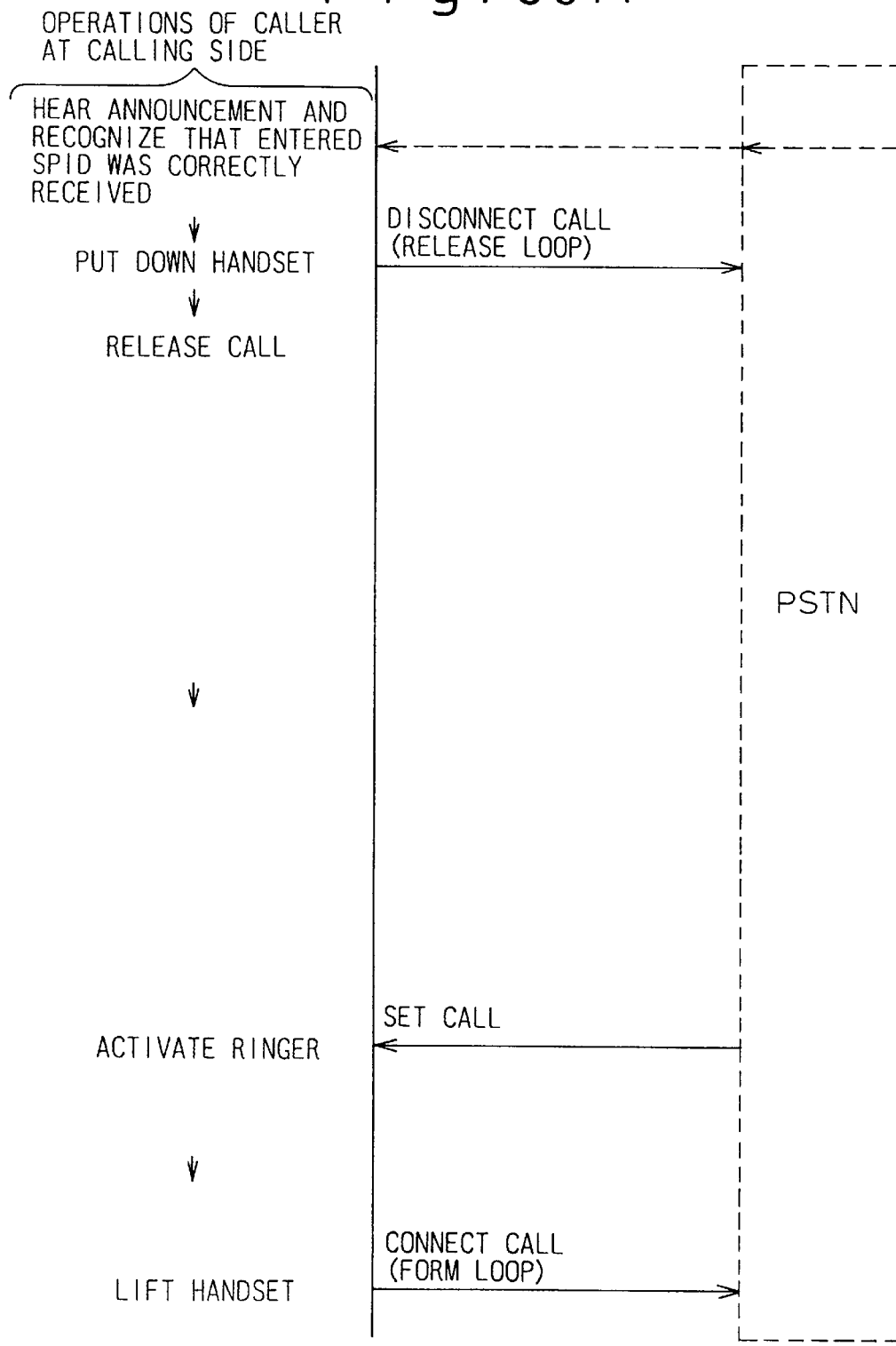
FIGS. 50A and 50B show a continuation of the sequence of FIGS. 49A and 49B.
Figure 50B:
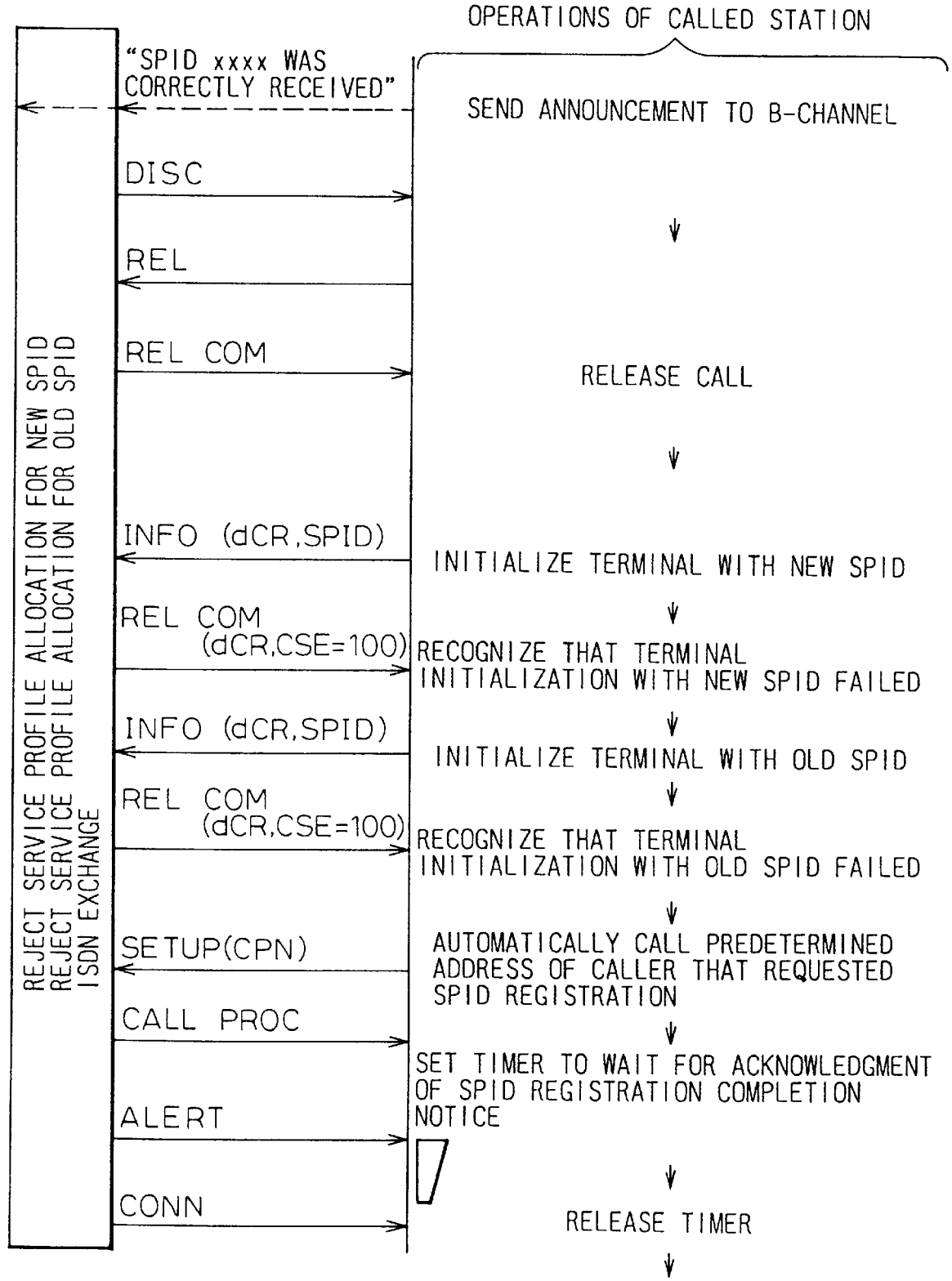

FIGS. 49A, 49B, 50A, 50B, 51A and 51B are sequences to be taken when the restoration of an old SPID is unsuccessful, according to an embodiment of the present invention. A caller is an analog telephone connected to a PSTN, and a receiver is an ISDN terminal connected to an ISDN. In FIGS. 49A and 49B, the caller enters a new SPID, and the receiver receives the SPID with a DTMF signal and stores the SPID in a memory. These processes are the same as those of FIGS. 46A and 46B. In FIGS. 50A and 50B, an allocation of a service profile for the new SPID is rejected, and therefore, a terminal initialization with an old SPID is started similar to FIGS. 47A and 47B. These are not explained again.

Figure 51A:
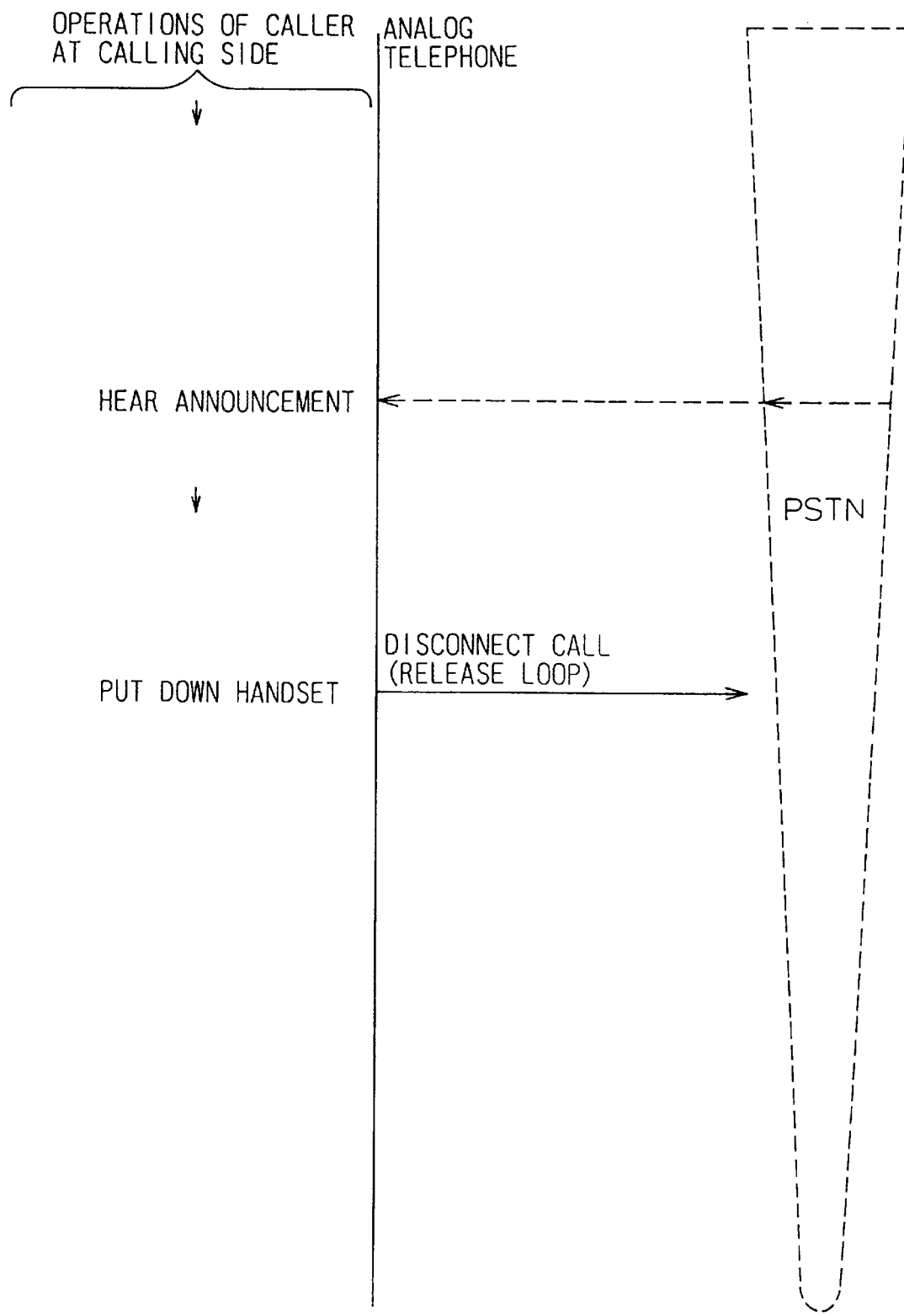
FIGS. 51A and 51B show a continuation of the sequence of FIGS. 50A and 50B.
Figure 51B:
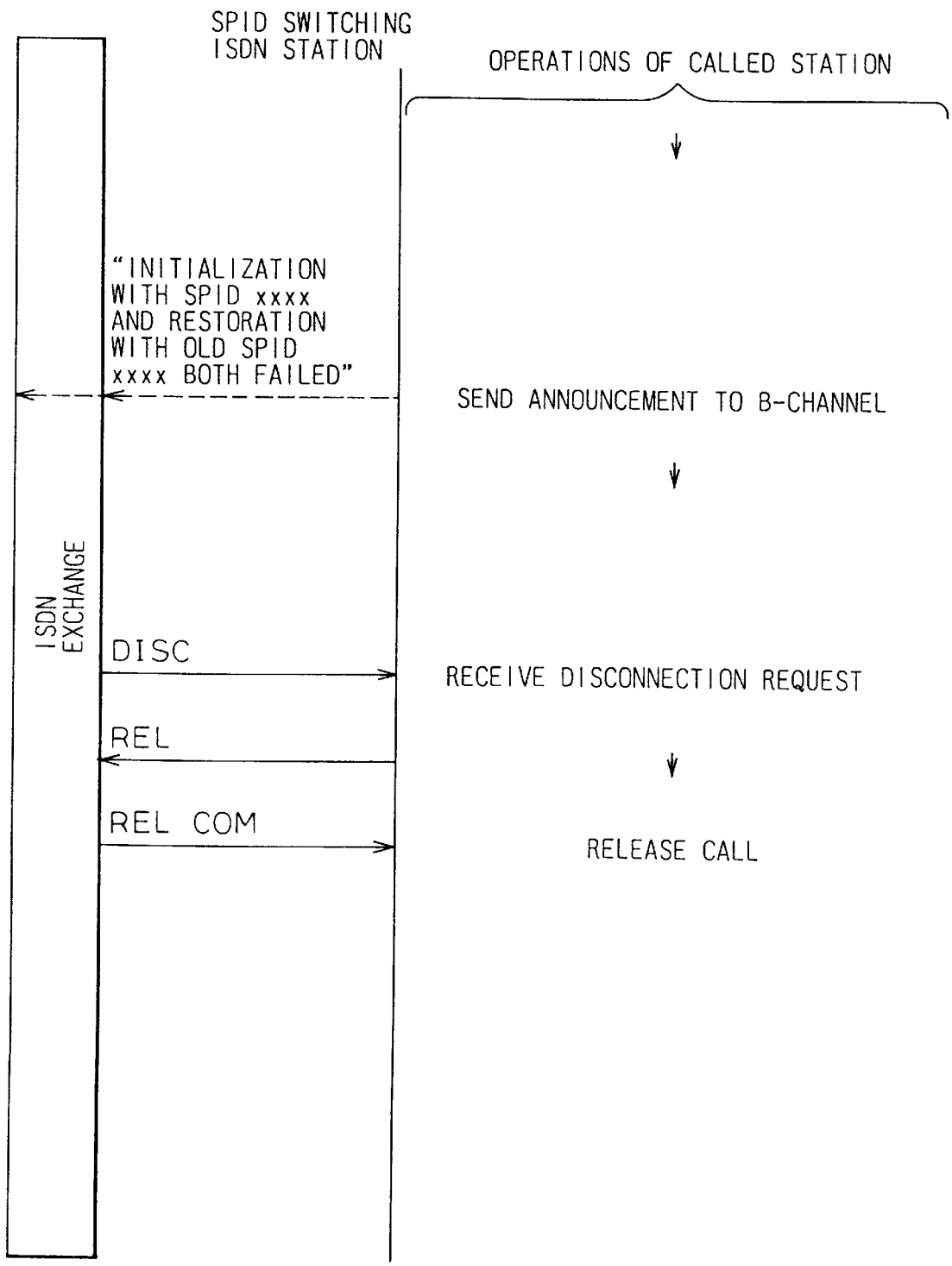

The ISDN exchange rejects a request to allocate a service profile for the old SPID and sends a release completion message REL-COM (dCR, CSE=100) to the ISDN terminal. The ISDN terminal recognizes that the terminal initialization with the old SPID has failed. The ISDN terminal calls a predetermined address or the address of the remote caller, which requested the registration of the new SPID, with a call setup message SETUP (CPN). In response to the message, the caller lifts the handset. The ISDN terminal sends an announcement of "initialization with SPID xxxx and restoration of old SPID xxxx both failed" to the B-channel as shown in FIGS. 51A and 51B. Upon hearing the announcement, the caller puts down the handset. Thereafter, a call release sequence is carried out between the ISDN exchange and the ISDN terminal.

Figure 52A:
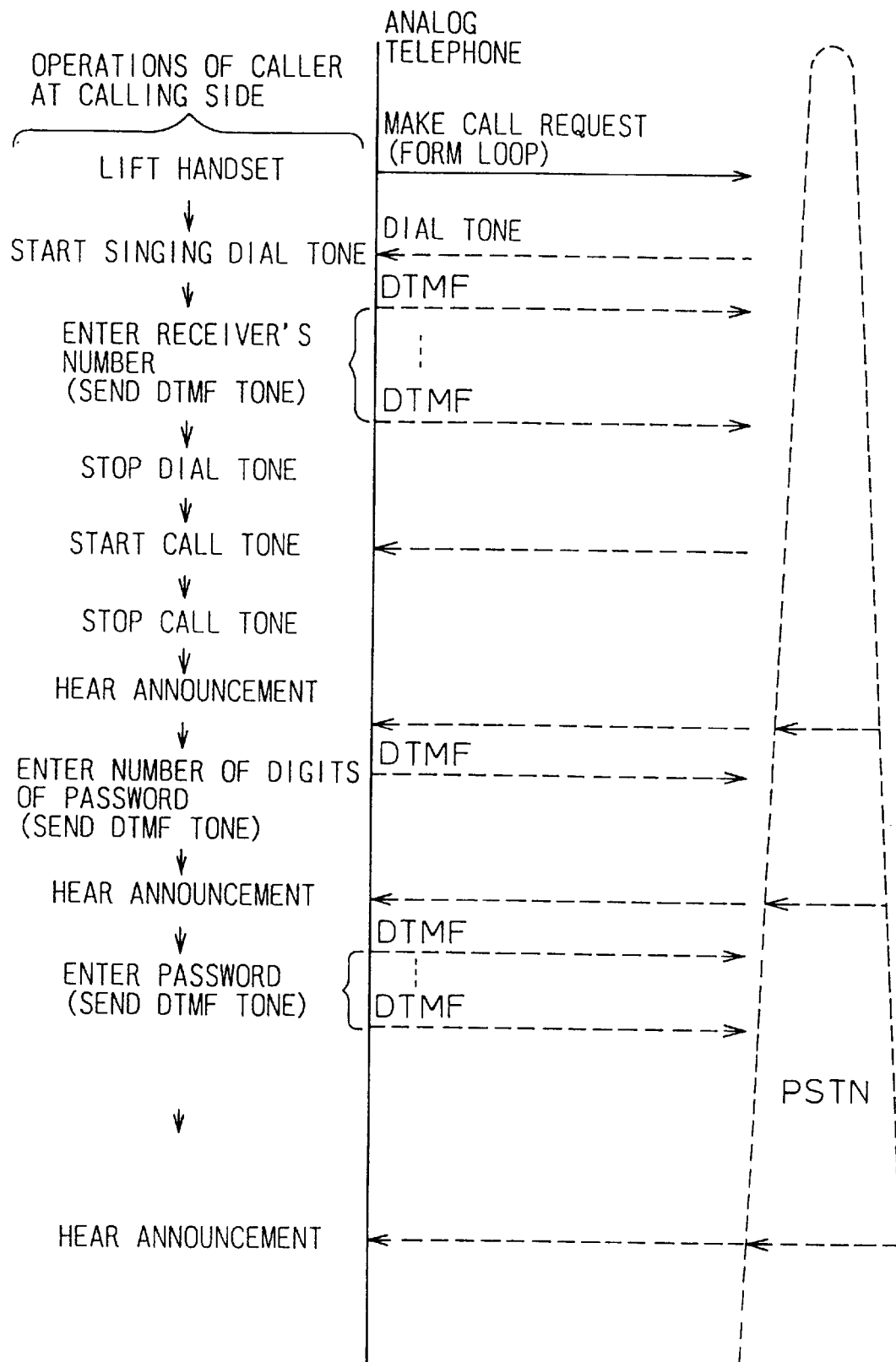
FIGS. 52A and 52B show a sequence of reading an SPID from a remote terminal according to an embodiment of the present invention.
Figure 52B:
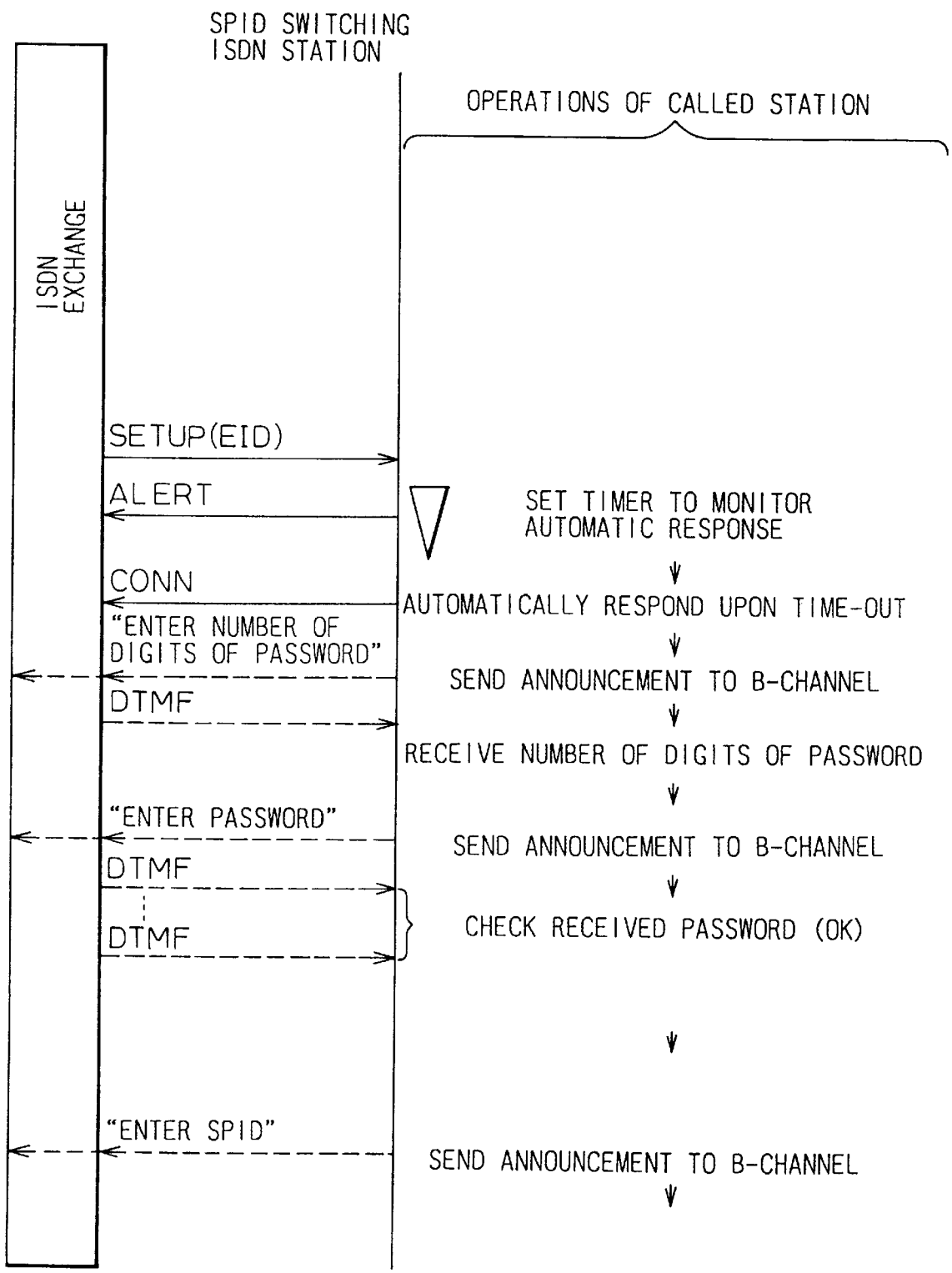
Figure 53A:
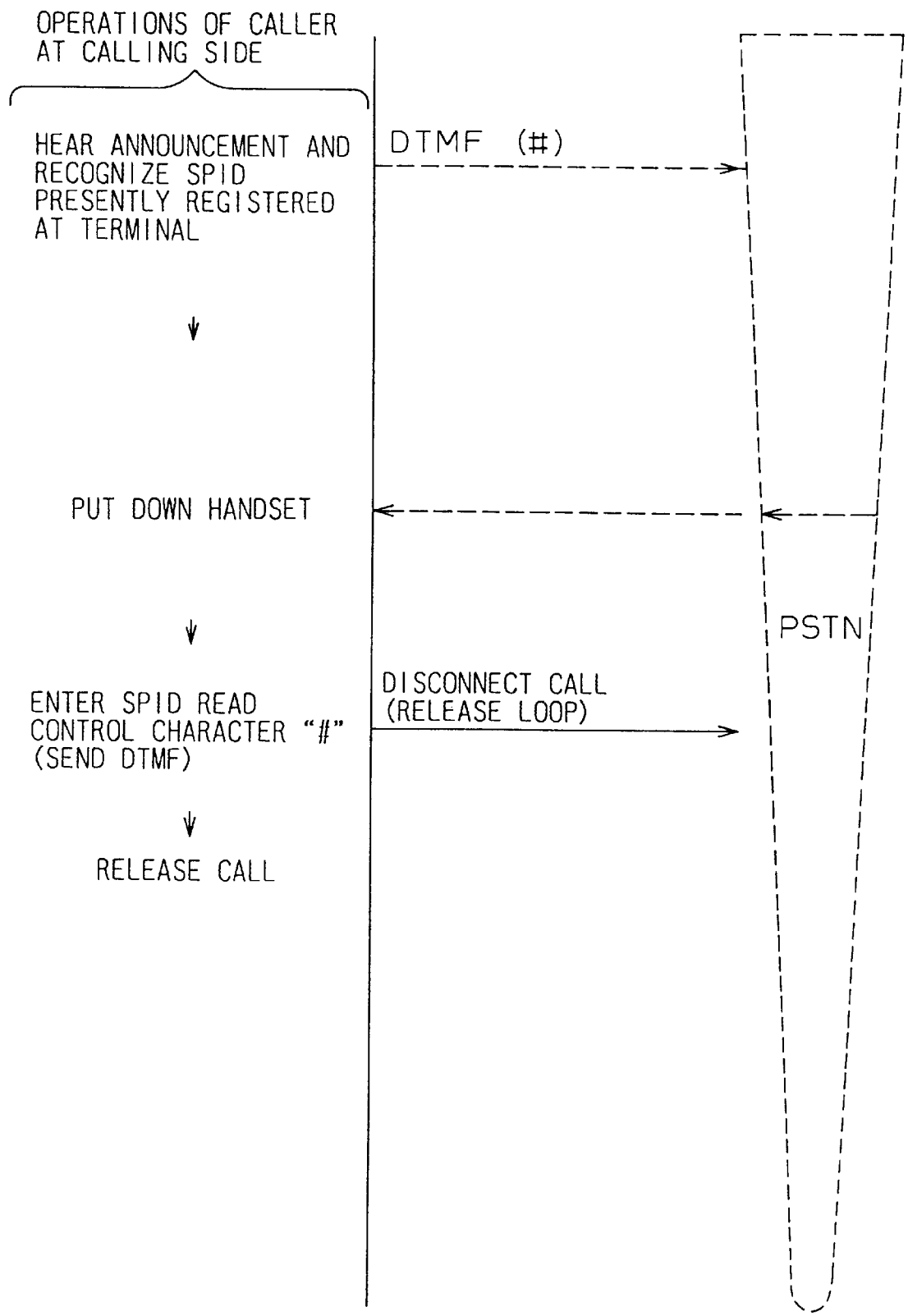
FIGS. 53A and 53B show a continuation of the sequence of FIGS. 52A and 52B.
Figure 53B:
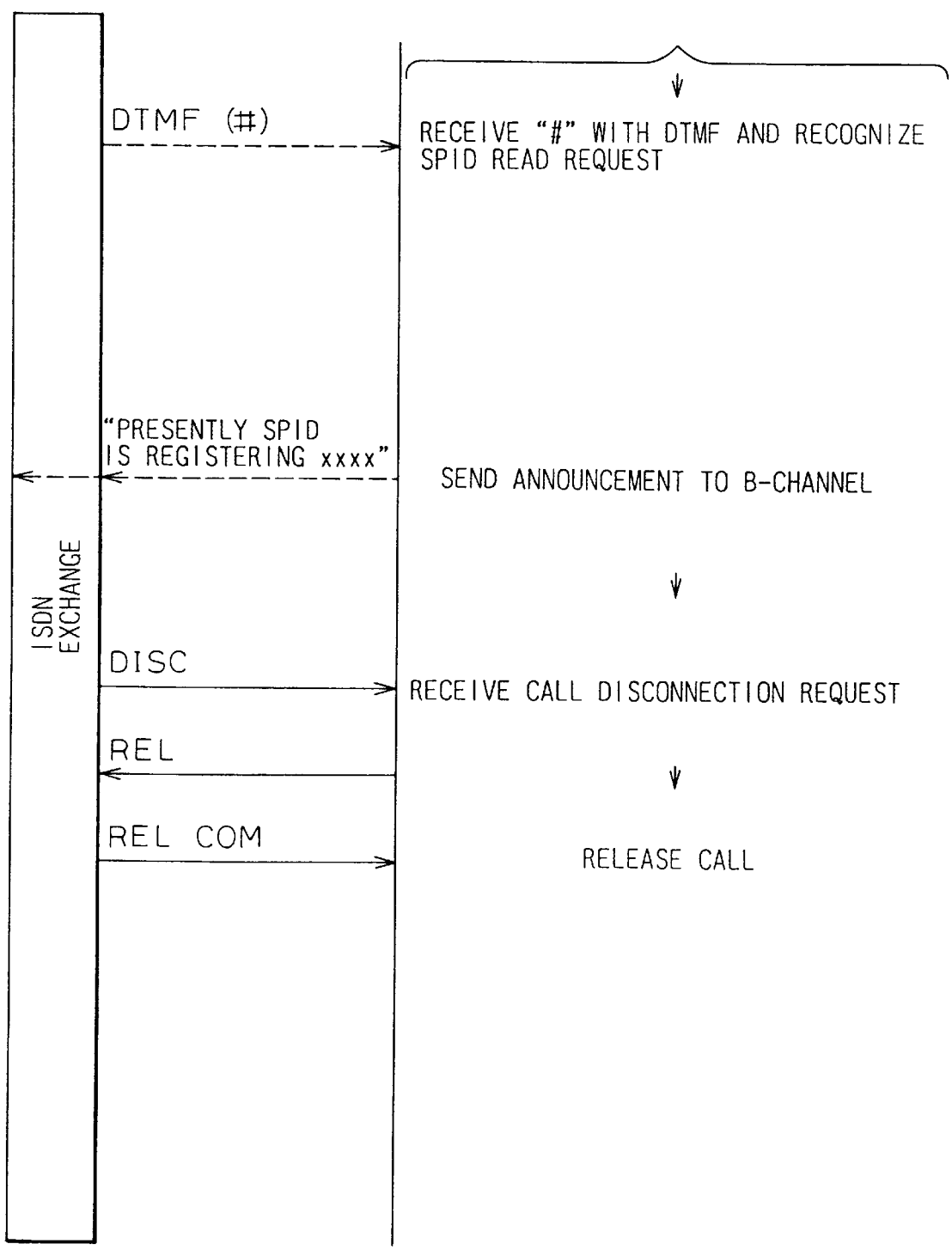
Figure 54B:
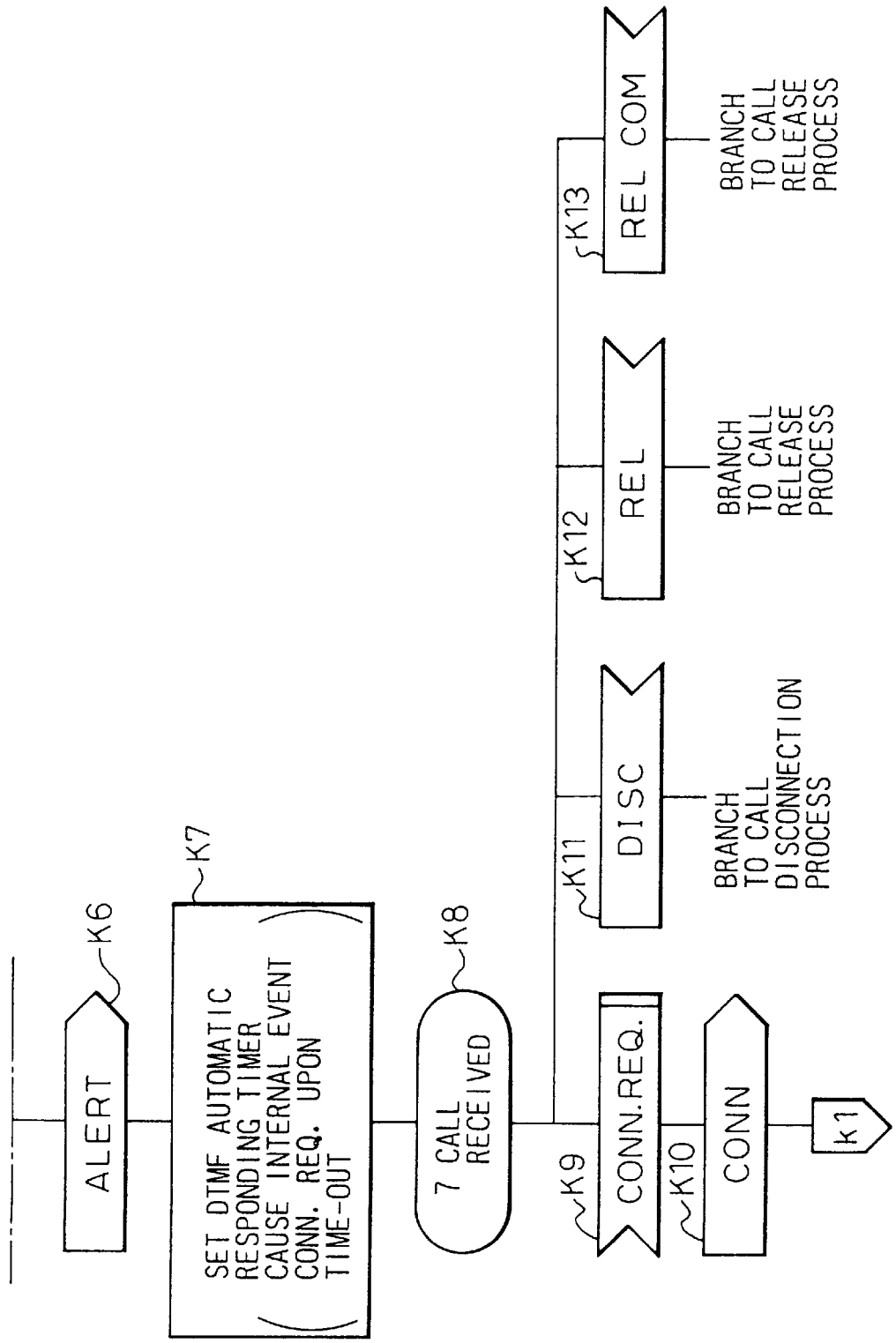

FIGS. 52A, 52B, 53A and 53B show sequences of reading an SPID from a remote terminal, according to an embodiment of the present invention. In FIGS. 52A and 52B, a caller calls a receiver and the receiver sends an announcement of "enter the number of digits of a password." In response to the announcement, the caller enters the number of digits of a password. The receiver sends an announcement of "enter a password," and the caller enters a password. The receiver sends an announcement of "enter an SPID." These steps are the same as those of FIGS. 42A, 42B, 46A, 46B, 49A and 49B.

In response to the announcement, the caller enters an SPID read control character "#." The receiver recognizes, from a DTMF signal representing "#," that it is an SPID read request. The receiver sends an announcement of "presently registered SPID is xxxx" to the B-channel. Accordingly, the caller recognizes the SPID presently registered in the ISDN terminal. The caller puts down the handset to release the call. Then, a caller release sequence is carried out between the ISDN exchange and the ISDN terminal.

FIGS. 54A, 54B, 55A, 55B, 56A and 56B are flowcharts showing the steps of registering an SPID from a remote terminal, according to an embodiment of the present invention. A remote analog telephone connected to a PSTN sends a DTMF signal to register an SPID. Step K1 receives a call setup message SETUP. Step K2 determines whether or not an end point identifier contained in the message SETUP agrees with an end point identifier stored in a terminal apparatus. If they agree with each other, step K3 saves a value CR, and step K4 determines whether or not transmission capacity information is voice or 3.8-kHz audio. Step K5 determines whether or not there is user—user information. If each of steps K4 and K5 provides an affirmative answer, step K6 sends a calling message ALERT.

Step K7 sets a DTMF automatic response timer. When this timer causes a time-out event, an internal event of a response request CONN-REQ is made. Step K8 sets a reception state. When a response request is generated in step K9, a response message CONN is sent. When step K11 receives a disconnection message DISC, the flow branches to a call disconnection process. When step K12 receives a release message REL, the flow branches to a call release process. When step K123 receives a release completion message REL-COM, the flow branches to a call release process.

Figure 55B:
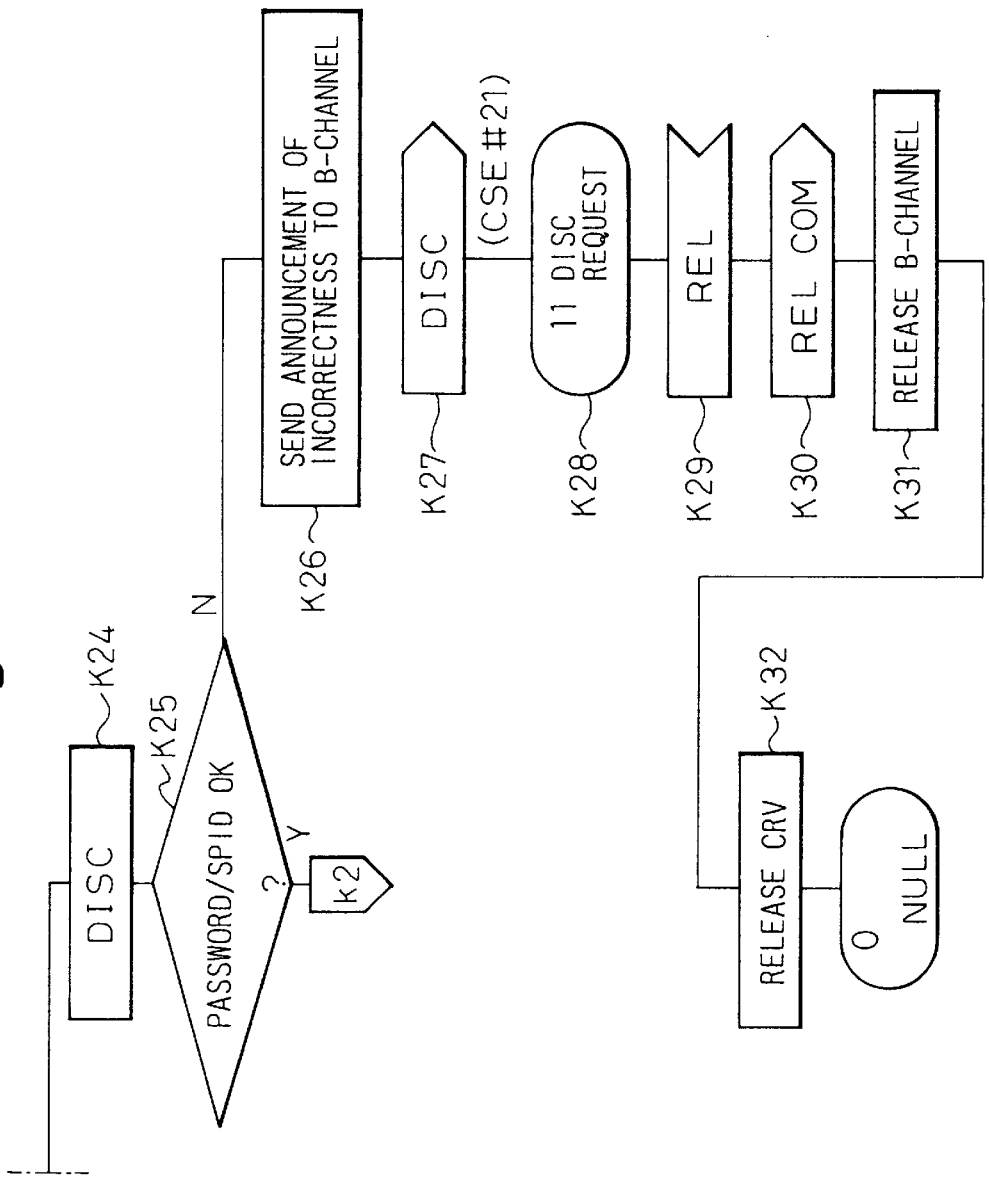

After step K10 sends the response message CONN, step K14 is in a connection request state as shown in FIGS. 55A and 55B. When step K15 receives an acknowledgment CONN-ACK, step K16 connects a B-channel, and step K17 sets a conversation state. When step K21 receives a disconnection message DISC, the flow branches to the call disconnection process. When step K22 receives a release message REL, the flow branches to the call release process. When step K23 receives a release completion message REL-COM, the flow branches to the call release process.

Step K18 receives an in-band tone during the conversation state, step K19 collates passwords or SPIDs with each other, and step K20 continues the conversation state. When step K24 receives a disconnection message DISC, step K25 determines whether or not the password or SPID is acceptable. If it is not acceptable, step K26 announces, through the B-channel, that the password or SPID is incorrect. Step K27 sends a disconnection message DISC, and step K28 is in a disconnection request state. Step K29 receives a release message REL, and step K30 sends a release completion message REL-COM. Step K31 releases the B-channel, and step K32 releases CRV.

If the password or SPID is acceptable in step K25, step K33 releases the B-channel as shown in FIGS. 56A and 56B, step K34 sends a release message REL, and step K35 establishes a release request state. Step K36 receives a release completion message REL-COM, step K37 releases CRV, and step K38 is in a non-operation state. Step K39 determines whether or not there is another call, and step K40 determines whether or not there is an active feature. If there is another call or an active feature, step K45 waits until the call or feature ends.

If there is no other call or active feature, or when the call or feature ends, step K41 sends an information message INFO (dCR, SPID) including a dummy call number dCR and the new SPID, and step K342 is in a non-operation state. Step K43 receives an information message INFO (dCR, EID) including the dummy call number dCR and an end point identifier EID, and step K44 saves the EID in the memory. This completes the registration of the SPID from the remote terminal, and the flow branches to an SPID registration completion notice process.

Step K46 receives a release completion message REL-COM. Step K47 fetches an SPID from an old SPID storage area and saves it in the new SPID storage area. Step K48 sends an information message INFO (dCR, SPID) including a dummy call number dCR and the SPID, and step K49 is in a non-operation sate. Step K50 receives an information message INFO (dCR, EID) including the dummy call number dCR and an end point identifier EID. Step K51 stores the EID in a storage region. This completes the restoration of the old SPID, and the flow branches to the completion notice process. Step K52 receives a release completion message REL-COM, and a non-operation state is established.

In this way, a remote ISDN telephone or analog telephone can register a service profile identifier (SPID) to an ISDN terminal apparatus such as an ISDN telephone, to switch the service profile of the terminal apparatus to another profile for the newly registered SPID. Namely, the user of a remote terminal may switch the service profile of a terminal apparatus installed in an office and register the user's SPID to the remote terminal, to provide the remote terminal with the same telephone number and functions as those of the terminal apparatus in the office.

As explained above, the present invention automatically switches service profiles from one to another according to switching conditions such as specific times, specific days, unused periods, the number of times of use, etc. The present invention enables a terminal apparatus to switch the service prifle of a remote terminal apparatus to another. The present invention improves the versatility of terminal apparatuses.

The present invention sets retry and restoration conditions to automatically deal with a switching failure or a rejection of a service profile switching request. When a service profile is switched to another, corresponding information must be downloaded. If this information is already in a memory, the present invention omits the downloading process, to shorten a period of holding a line and quickly start communication with the new service profile.

According to information downloaded from a network to a terminal apparatus, functions are allocated to physical keys of the terminal apparatus. A key that is frequently used by a user is set as a fixed key. The function of the fixed key is unchanged even after information is downloaded from the network. This makes the user of the terminal apparatus more convenient. A feature that has been active with the preceding service profile may be automatically activated when the service profile is switched to another profile. A feature activated with a given service profile is stored and is automatically activated when the given service profile is resumed.

What is claimed is:

1. A terminal apparatus for carrying out a method of switching service profiles controlled by networks, said apparatus comprising a call control processing portion connected to networks; a storage portion for registering correspondingly a plurality of service profile identifiers and a condition of switching for use in a plurality of communication terminals in said network; a data registration processing portion for carrying out a control for said storage portion to register other data including said service profile identifiers; and an initialization processing portion for carrying out an end point initialization processing by a service profile identifier selectively designated according to the service profile identifiers registered in said storage portion or said condition of the switching of the plurality of registered service profile identifiers, one said service profile identifier being optically made available respectively by user selection from said communication terminals.

2. A terminal apparatus according to claim 1, wherein said storage portion comprises regions for storing the condition of the switching and information of downloading in correspondence with a plurality of service profile identifiers.

3. A terminal apparatus according to claim 1, wherein said storage portion comprises regions for storing the condition of the switching based on a predetermined time for allowing the continuation of the unused state or the frequency of uses in correspondence with a plurality of service profile identifiers, and said terminal apparatus.

4. A terminal apparatus according to claim 1, further comprising a card reader for inputting said service profile identifiers.

5. A terminal apparatus according to claim 1, further comprising a receiving and processing portion for receiving a request of registration or selection of said service profile identifiers through said networks and controlling said storage portion, and a pass-word comparison portion for comparing pass-words used in relation with the request of registration or selection of said service profile identifiers.

6. A method of switching service profiles controlled by a network from one to another, comprising the steps of:
   selecting one of service profile identifiers stored in a memory in a terminal apparatus according to switching conditions,
   switching to the service profile corresponding to the selected profile identifier; and
   using the same service profile dynamically in different locations by a switching operation from a remote place, depending on temporal information, or depending on use frequency, in accordance with a user's option.

* * * * *

UNITED STATES PATENT AND TRADEMARK OFFICE
CERTIFICATE OF CORRECTION

PATENT NO. : 6,219,702 B1  
DATED : April 17, 2001  
INVENTOR(S) : Tetsuo Ikehara, et al.

Page 1 of 1

It is certified that error appears in the above-identified patent and that said Letters Patent is hereby corrected as shown below:

<u>Title page,</u>
Inventors: Add Hideyuki, Koike, Nagano, Japan & Masayuki, Shimada, Aichi, Japan.

Signed and Sealed this

Thirtieth Day of October, 2001

Attest:

NICHOLAS P. GODICI  
Attesting Officer     Acting Director of the United States Patent and Trademark Office

UNITED STATES PATENT AND TRADEMARK OFFICE
CERTIFICATE OF CORRECTION

PATENT NO.     : 6,219,702 B1
DATED          : April 17, 2001
INVENTOR(S)    : Tetsuo Ikehara et al.

It is certified that error appears in the above-identified patent and that said Letters Patent is hereby corrected as shown below:

The Certificate of Correction issued October 30, 2001 is hereby being vacated, the number was erroneously mentioned and should be deleted since the Certificate of Correction was cancelled.

Signed and Sealed this

Twenty-sixth Day of November, 2002

*Attest:*

*Attesting Officer*

JAMES E. ROGAN
*Director of the United States Patent and Trademark Office*